US007142564B1

(12) United States Patent
Parruck et al.

(10) Patent No.: US 7,142,564 B1
(45) Date of Patent: Nov. 28, 2006

(54) MULTI-SERVICE SEGMENTATION AND REASSEMBLY DEVICE WITH A SINGLE DATA PATH THAT HANDLES BOTH CELL AND PACKET TRAFFIC

(75) Inventors: Bidyut Parruck, Cupertino, CA (US); Chulanur Ramakrishnan, Saratoga, CA (US)

(73) Assignee: Cortina Systems, Inc., Mountain View, CA (US)

( * ) Notice: Subject to any disclaimer, the term of this patent is extended or adjusted under 35 U.S.C. 154(b) by 1000 days.

(21) Appl. No.: 09/976,522

(22) Filed: Oct. 12, 2001

Related U.S. Application Data

(60) Division of application No. 09/851,565, filed on May 8, 2001, which is a continuation-in-part of application No. 09/823,667, filed on Mar. 30, 2001, which is a continuation-in-part of application No. 09/779,381, filed on Feb. 7, 2001.

(51) Int. Cl.
*H04L 12/54* (2006.01)
(52) U.S. Cl. ...................................... 370/474; 370/476
(58) Field of Classification Search ............ 370/395.5, 370/395.51, 395.52, 400, 401, 474, 476, 370/469, 360, 386, 389, 465, 466
See application file for complete search history.

(56) References Cited

U.S. PATENT DOCUMENTS

| 5,666,353 A | 9/1997 | Klausmeier et al. ........ 370/230 |
| 5,715,250 A | 2/1998 | Watanabe |
| 5,742,765 A | 4/1998 | Wong et al. ................ 395/200 |
| 5,764,645 A | 6/1998 | Bernet et al. |
| 5,781,549 A * | 7/1998 | Dai ............................ 370/398 |
| 5,787,255 A | 7/1998 | Parlan et al. ............... 395/200 |
| 5,796,736 A | 8/1998 | Suzuki |
| 5,802,052 A | 9/1998 | Venkataraman ............. 370/395 |
| 5,802,287 A | 9/1998 | Rostoker et al. ............ 395/200 |
| 5,809,021 A | 9/1998 | Diaz et al. .................. 370/364 |
| 5,838,915 A | 11/1998 | Klausmeier et al. ........ 395/200 |
| 5,859,835 A | 1/1999 | Varma et al. ............... 370/229 |
| 5,867,480 A | 2/1999 | Thomas et al. ............. 370/230 |
| 5,870,394 A | 2/1999 | Oprea ........................ 370/392 |

(Continued)

FOREIGN PATENT DOCUMENTS

WO    WO 97/43869    11/1997

(Continued)

OTHER PUBLICATIONS

U.S. Appl. No. 09/528,802, filed Mar. 20, 2000, "Circuits for Combining ATM and Packet Data on an Optical Fiber and Methods Therefor," by Parruck, Nguyen, Ramakrishnan.

(Continued)

*Primary Examiner*—Huy D. Vu
*Assistant Examiner*—Duc Duong

(57) ABSTRACT

A multi-service segmentation and reassembly (MS-SAR) integrated circuit is disposed on a line card in a router or switch. The MS-SAR can operate in an ingress mode so that it receives packet and/or cell format data and forwards that data to either a packet-based or a cell-based switch fabric. The MS-SAR can also operate in an egress mode so that it receives data from either a packet-based or a cell-based switch fabric and outputs that data in packet and/or cell format. The MS-SAR has a data path through which many flows of different traffic types are processed simultaneously. Each flow is processed by functional blocks along the data path in accordance with one of several application types, the application type for a flow being predetermined by the host processor of the router or switch. Segmentation, reassembly and partitioning techniques are disclosed that reduce costs and facilitate high-speed operation.

6 Claims, 45 Drawing Sheets

U.S. PATENT DOCUMENTS

| | | | |
|---|---|---|---|
| 5,898,688 A | 4/1999 | Norton et al. | 370/362 |
| 5,905,725 A | 5/1999 | Sindhu et al. | 370/389 |
| 5,917,820 A | 6/1999 | Rekhter | 370/392 |
| 5,917,828 A | 6/1999 | Thompson | 370/474 |
| 5,920,705 A | 7/1999 | Lyon et al. | 395/200 |
| 5,946,313 A | 8/1999 | Allan et al. | 370/397 |
| 5,963,541 A | 10/1999 | Koga et al. | 370/229 |
| 5,987,034 A | 11/1999 | Simon et al. | 370/465 |
| 6,026,086 A | 2/2000 | Lancelot et al. | 370/353 |
| 6,034,945 A | 3/2000 | Hughes et al. | 370/230 |
| 6,052,379 A | 4/2000 | Iverson et al. | 370/442 |
| 6,088,355 A | 7/2000 | Mills et al. | 370/392 |
| 6,091,725 A | 7/2000 | Cheriton et al. | 370/392 |
| 6,101,188 A | 8/2000 | Sekine et al. | 370/401 |
| 6,111,877 A | 8/2000 | Wilford et al. | 370/392 |
| 6,115,373 A | 9/2000 | Lea | |
| 6,134,217 A | 10/2000 | Stiliadis et al. | 370/232 |
| 6,144,662 A | 11/2000 | Colmant et al. | 370/390 |
| 6,147,999 A | 11/2000 | Honda et al. | 370/396 |
| 6,154,446 A | 11/2000 | Kadambi et al. | 370/239 |
| 6,157,641 A | 12/2000 | Wilford | 370/389 |
| 6,160,793 A | 12/2000 | Ghani et al. | 370/236 |
| 6,167,027 A | 12/2000 | Aubert et al. | 370/230 |
| 6,169,739 B1 | 1/2001 | Isoyama | 370/395 |
| 6,175,570 B1 | 1/2001 | Cukier et al. | 370/414 |
| 6,185,212 B1 | 2/2001 | Sakamoto et al. | 370/395 |
| 6,188,671 B1 | 2/2001 | Chase et al. | 370/232 |
| 6,259,699 B1 * | 7/2001 | Opalka et al. | 370/398 |
| 6,330,239 B1 | 12/2001 | Suzuki | |
| 6,424,662 B1 | 7/2002 | Miki et al. | |
| 6,463,063 B1 * | 10/2002 | Bianchini et al. | 370/395.53 |
| 6,522,667 B1 | 2/2003 | Oda et al. | |
| 6,535,513 B1 * | 3/2003 | Kao et al. | 370/395.1 |
| 6,553,030 B1 * | 4/2003 | Ku et al. | 370/390 |
| 6,611,522 B1 | 8/2003 | Zheng et al. | |
| 6,615,358 B1 | 9/2003 | Dowd et al. | |
| 6,631,128 B1 | 10/2003 | Lemieux | |
| 6,680,933 B1 * | 1/2004 | Cheesman et al. | 370/352 |
| 6,741,585 B1 | 5/2004 | Monoz et al. | |
| 6,751,224 B1 * | 6/2004 | Parruck et al. | 370/395.6 |
| 6,795,445 B1 | 9/2004 | Kabie et al. | |
| 6,826,196 B1 * | 11/2004 | Lawrence | 370/466 |
| 6,963,572 B1 * | 11/2005 | Carr et al. | 370/401 |
| 2002/0101263 A1 | 8/2002 | Endo | |
| 2002/0101871 A1 | 8/2002 | Takase et al. | |
| 2003/0128688 A1 | 7/2003 | Kim | |
| 2004/0015590 A1 | 1/2004 | Nagami et al. | |
| 2004/0028067 A1 | 2/2004 | Chong et al. | |

FOREIGN PATENT DOCUMENTS

| | | |
|---|---|---|
| WO | WO 99/17182 | 4/1999 |
| WO | WO 00/56012 | 9/2000 |

OTHER PUBLICATIONS

U.S. Appl. No. 09/539,479, filed Mar. 30, 2000, "Devices for Aggregating ATM Cells and Packets for Transmission Over the Same Channel," by Parruck, Nguyen, Ramakrishnan.

U.S. Appl. No. 09/539,306, filed Mar. 30, 2000, "Devices for Employing SONET Frames for Transporting both ATM Cells and Packets Over in the Same Channel in an Optical Fiber," by Parruck, Nguyen, Ramakrishnan.

U.S. Appl. No. 09/539,478, filed Mar. 30, 2000, "Methods and Apparatus for Dynamically Allocating Bandwidth Between ATM Cells and Packets," by Parruck, Nguyen, Ramakrishnan.

U.S. Appl. No. 09/539,461, filed Mar. 30, 2000, "Routers for Switching ATM Cells in a Packet-like manner Using a Packet Switch," by Parruck, Nguyen, Ramakrishnan.

U.S. Appl. No. 09/539,476, filed Mar. 30, 2000, "Processor-based Architecture for Facilitating Integrated Data Transfer between both ATM and Packet Traffic with a Packet Bus or Packet Link, Including Bidirectional ATM-to-Packet Functionality for ATM Traffic," Parruck, Nguyen, Ramakrishnan.

U.S. Appl. No. 09/539,477, filed Mar. 30, 2000, "Integrated ATM/Packet Segmentation-and-Reassembly Engine for Handling both Packet and ATM Input Data and for Outputting both ATM and Packet Data," by Parruck, Nguyen, Ramakrishnan.

"Is the Bloom Off Jasmine" and other pages from 'Light READING' web site "www.lightreading.com", 2 pages (printed Mar. 26, 2001).

Chapter 3, Frame Relay Architecture, from "Frame Relay Technology and Practice" textbook, by Jeff T. Buckwalter, (copyright 2000).

Chapter 5, MPLS Core Protocols, from "MPLS Technology and Applications" textbook, by Bruce Davie and Yakov Rekhter, (copyright 2000).

"GenFlow Family of Traffic Management Co-Processors" and other pages from Acorn Networks' web site "www.Acorn-Networks.com", 5 pages (printed Mar. 30, 2001).

White Paper entitled "Wire-Speed Traffic Management Solutions Based On Coprocessors", by Joe Adler and Tam-Anh Chu, Acorn Networks, 14 pages (copyright 2000).

S19202 Advanced Summary Datasheet for "Ganges STS-192 POS/ATM Sonet/SDH Mapper", Applied Micro Circuits Corporation, revision 1.6, 2 pages (Jun. 2000).

"Product Guide—Ganges (S19202)" and other pages from Applied Micro Circuits Corporation's web site, 3 pages (printed Feb. 27, 2001).

"ZettaCom—Powering Tomorrow's Network", pages from ZettaCom's web site "www.zetta.com/products", 2 pages (downloaded Jan. 31, 2001).

Ocular Networks' Metro Business Access Architecture, pages from Ocular Networks' web site "www.ocularnetworks.com/architecture", two pages (downloaded Jan. 31, 2001).

* cited by examiner

| SWITCH FABRIC | APPLICATION TYPE | INGRESS APPL TYPE | EGRESS APPL TYPE |
|---|---|---|---|
| CELL | ATM => ATM | 0 | 8 |
| | ATM => MPLS PACKET | 1 | 9 |
| | MPLS PACKET => ATM | 2 | 10 |
| | MPLS PACKET => MPLS PACKET | 3 | 11 |
| PACKET | ATM => PACKET | 4 | 14 |
| | PACKET => ATM | 6 | 12 |
| | AAL5 => PACKET | 5 | 14 |
| | PACKET => AAL5 | 6 | 13 |
| | PACKET => PACKET | 6 | 14 |
APPLICATION TYPES
FIG. 6
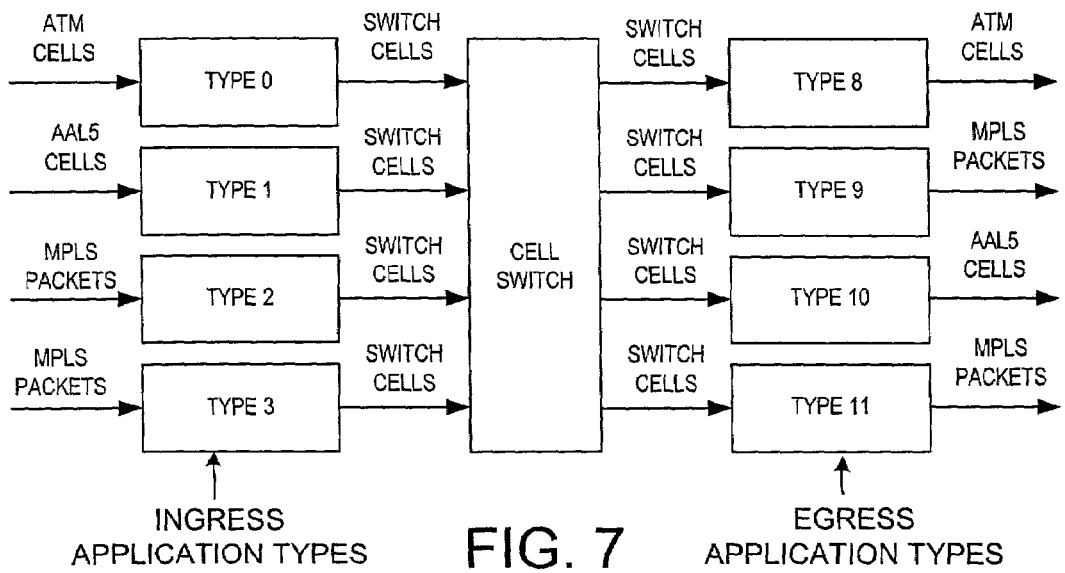
FIG. 7
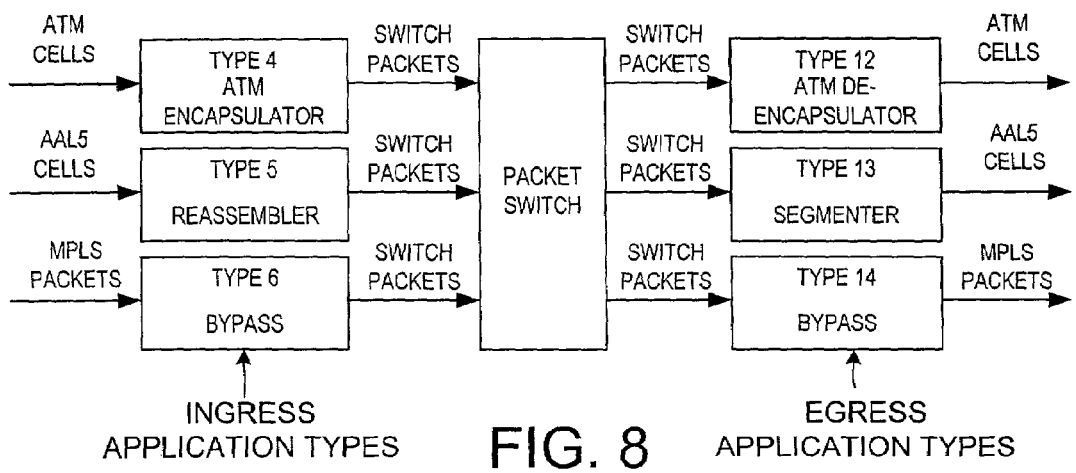
FIG. 8

INGRESS MODE

PORT TABLE IN LOOKUP BLOCK

| NAME | NO BITS | RANGE | WR | DESCRIPTION |
|---|---|---|---|---|
| BID HEAD | 23 | 22:0 | H | HEAD POINTER. FIRST BUFFER TO BE ENQUEUED, AND FIRST BUFFER TO BE DEQUEUED. IF NULL, THE QUEUE IS EMPTY. |
| HD EOP PKT | 1 | 23 | H | IF SET, THE HEAD BID IS THE EOP. |
| HD SOP PKT | 1 | 23 | H | IF SET, THE HEAD BID IS THE SOP. |
| HD EFCI | 1 | 25 | H | EFCI BIT. |
| CLP | 1 | 26 | H | CLP BIT. CAN BE MODIFIED BY DBS. |
| OAM | 1 | 27 | H | OAM BIT. |
| SPARE | 1 | 28 | H | |
| CLASS | 3 | 31:29 | H | CLASS OF FID. |
| FID TYPE | 4 | 35:32 | H | APPLICATION TYPE INDICATES THE PROCESSING THAT THE MS-SAR WILL TAKE ON THIS FLOW. WILL BE SENT TO MEMORY MANAGER. TYPE IS WRITTEN WITH THE HEAD POINTER. |

FID DEQUEUE MEMORY LOCATION

FIG. 16

| NAME | NO BITS | RANGE | WR | DESCRIPTION |
|---|---|---|---|---|
| BID TAIL | 23 | 22:0 | H | TAIL POINTER. LAST BUFFER TO BE ENQUEUED, AND LAST BUFFER TO BE DEQUEUED. IF NULL, THE QUEUE IS EMPTY. |
| BID PRV PKT TAIL | 23 | 45:23 | H | BID OF PREVIOUS PACKET'S TAIL BID. SAVED ON EOP. |
| TTL | 1 | 46 | H | WHEN 1, DISCARD AND DEACTIVATE THE FID. |
| OUTPUT PORT# | 7 | 53:47 | S | OUTPUT PORT NUMBER THAT THE FID WILL BE TRANSMITTED ON. |
| Q SIZE | 18 | 71:54 | H | SIZE OF THE QUEUE IN BIDS. INCREMENTED ON ENQUEUE. DECREMENTED ON EVERY DEQUEUE OPERATION. |

FIRST FID ENQUEUE MEMORY LOCATION

FIG. 17

| NAME | NO BITS | RANGE | WR | DESCRIPTION |
|---|---|---|---|---|
| VALID | 1 | 0 | S | IF SET, THEN ENQUEUE. IF NOT, THEN SETUP CONNECTION COMMAND AS NEEDED BEFORE ENQUEUE STARTS. |
| SPARE | 8 | 8:1 | | |
| DROP UNTIL SOP | 1 | 9 | H | DROP UNTIL THE NEXT SOP. |
| SEL DROP COUNT ER | 1 | 10 | H | SEL THE COUNT FOR DROPPING. |
| SPARE | 2 | 12:11 | | |
| CURRENT TAIL PKT CELL CNT | 11 | 23:13 | H | REPRESENTS THE NUMBER OF CELLS IN THE TAIL PACKET THAT IS BEING ENQUEUED. |
| SPARE | 2 | 25:24 | | |
| ENQ NOT DISCARD RED PKT COUNT | 16 | 41:26 | H | THE NUMBER OF NOT DISCARDED PACKETS THAT HAVE ARRIVED SINCE LAST RED DISCARD. IT IS RESET ON THE NEXT RED DISCARD. |
| SPARE | 2 | 43:42 | | |
| AVG | 18 | 61:44 | H | THE AVE SIZE OF THE QUEUE. |

SECOND FID ENQUEUE MEMORY LOCATION

FIG. 18

| NAME | NO BITS | RANGE | WR | DESCRIPTION |
|---|---|---|---|---|
| BID LINK | 23 | 22:0 | H | BID OF THE NEXT BUFFER IN FID QUEUE. ALSO CAN BE A BID LINKED ON THE FREE BUFFER QUEUE. |
| EOP PKT | 1 | 23 | H | END OF PACKET FOR THIS BID BID. EOP BELONGS TO THE BID LINK. |
| SOP PKT | 1 | 24 | H | START OF PACKET FOR THE CORRESPONDING BID. SOP BELONGS TO THE BID LINK. |
| EFCI | 1 | 25 | H | EFCI PASS THROUGH BIT. |
| OAM | 1 | 26 | H | OAM BIT. |
| CLP | 1 | 27 | H | CLP |
| SPARE | 8 | 35:28 | | |

BID MEMORY LOCATION

FIG. 19

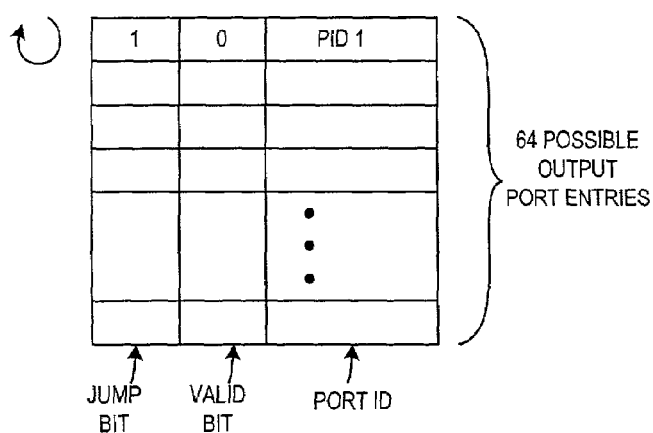
FIG. 24
FIG. 25
FIG. 26
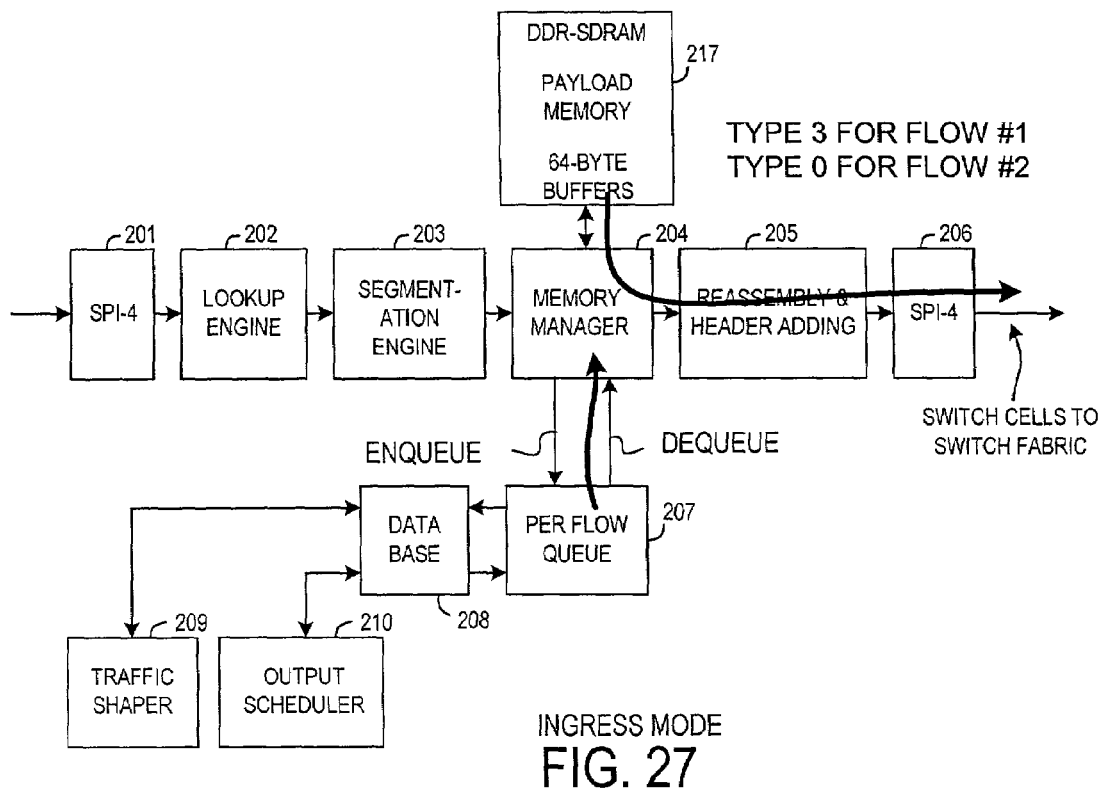
FIG. 27

EGRESS MODE

FORMAT OF ONE FID ENTRY
IN HEADER TABLE

64-BYTE CHUNKS FROM REASSEMBLY TO SPI-4

MPLS PACKET OUTPUT TO FRAMER

56-BYTE CHUNK FROM REASSEMBLY BLOCK

ATM CELL AS OUTPUT FROM SPI-4 INTERFACE

FLOW #1
INGRESS APPLICATION TYPE 5

FLOW #2
INGRESS APPLICATION TYPE 6

FLOW #1
EGRESS APPLICATION TYPE 14

FLOW #2
EGRESS APPLICATION TYPE 13

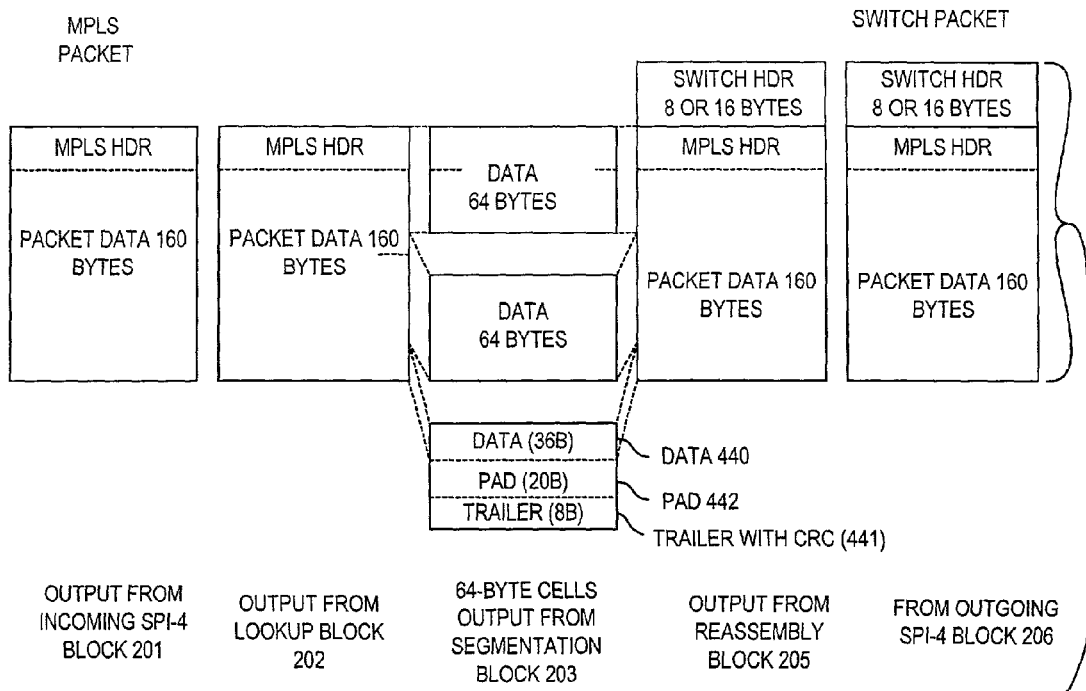
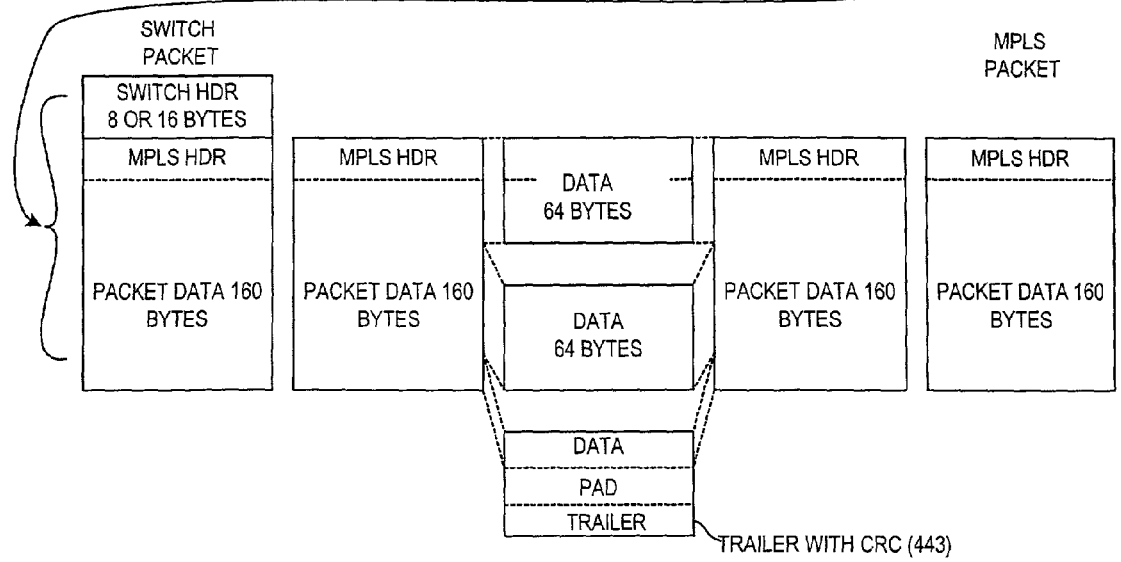
FIG. 47

PACKET QUEUE

PACKET QUEUE

INPUT CONTROL BLOCK

OUTPUT CONTROL BLOCK

SEGMENTATION BLOCK

MEMORY MANAGER BLOCK

MEMORY MANAGER BLOCK

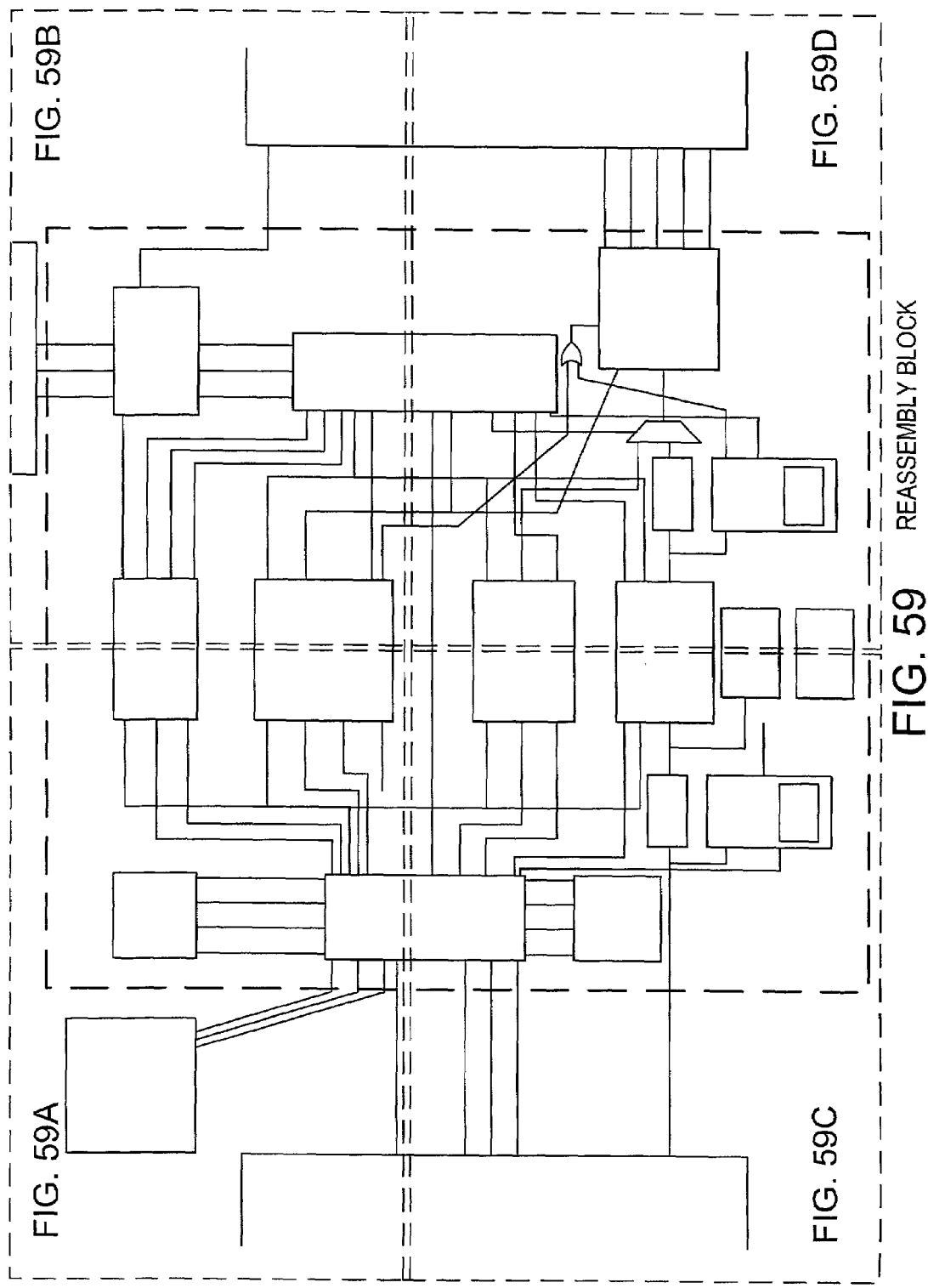

REASSEMBLY TYPE 1
(INGRESS APPLICATION TYPE 3)

REASSEMBLY TYPE 2
(INGRESS APPLICATION TYPE 4)

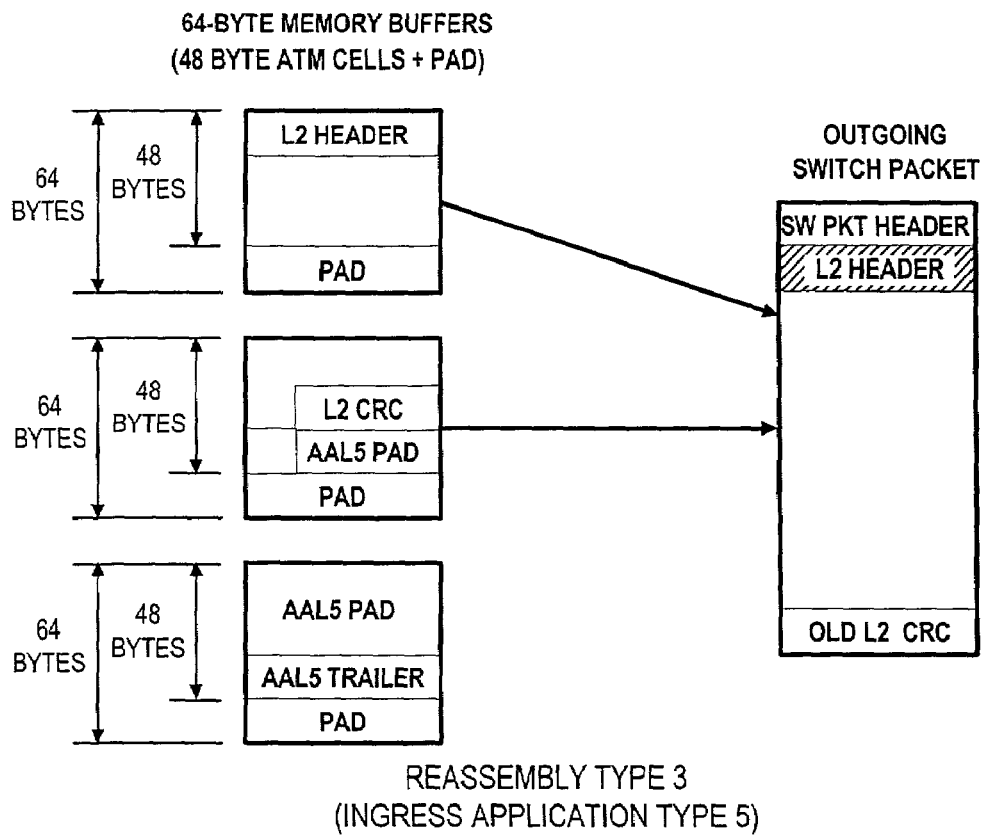
FIG. 60E REASSEMBLY TYPE 3 (INGRESS APPLICATION TYPE 5)
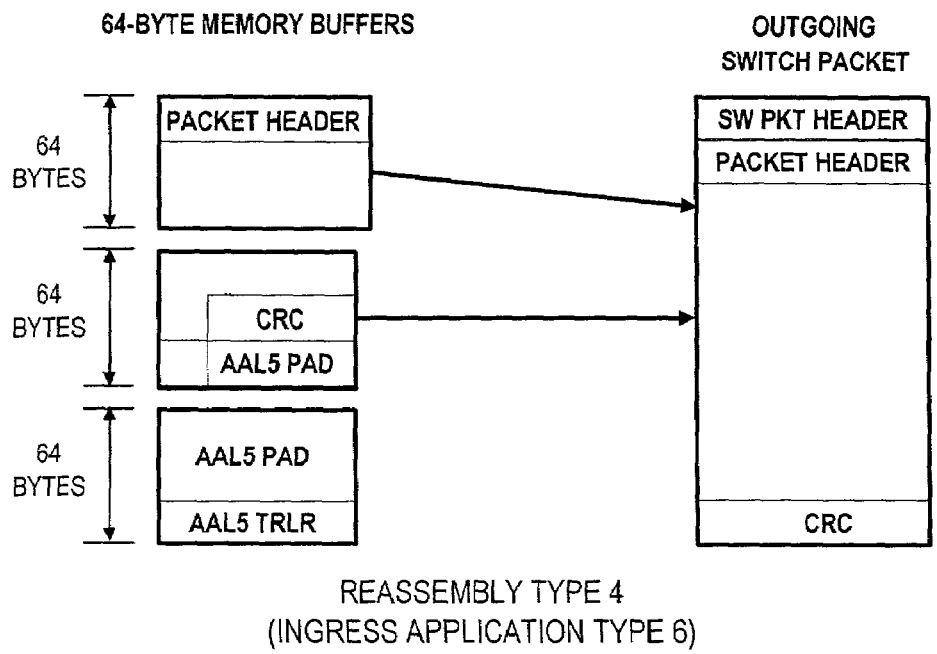
FIG. 60F REASSEMBLY TYPE 4 (INGRESS APPLICATION TYPE 6)

REASSEMBLY TYPE 5
(EGRESS APPLICATION TYPES 8 AND 12)

REASSEMBLY TYPE 6
(EGRESS APPLICATION TYPE 9)

REASSEMBLY TYPE 7
(INGRESS APPLICATION TYPES 10 AND 13)

REASSEMBLY TYPE 8
(INGRESS APPLICATION TYPES 11 AND 14)

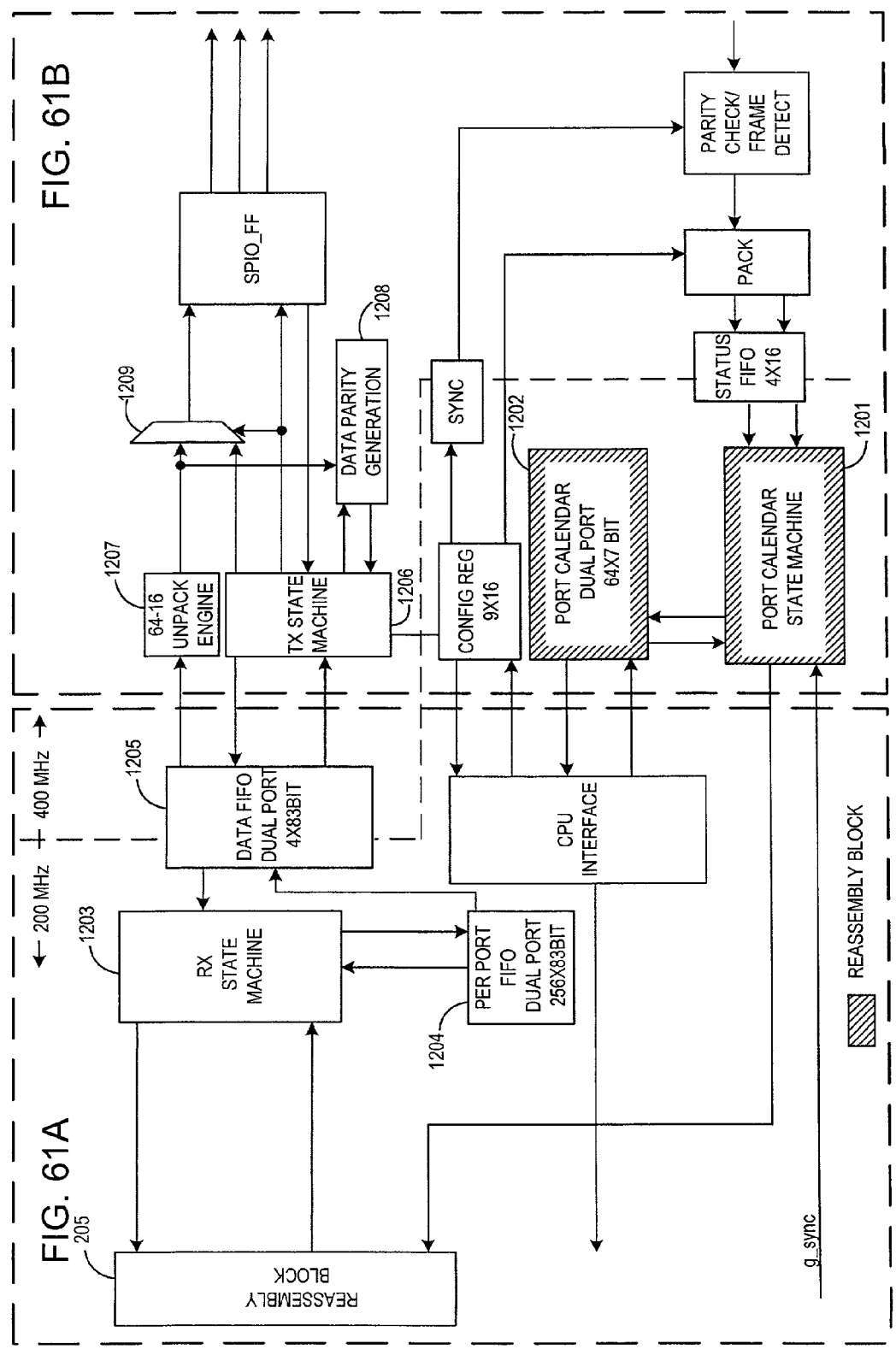
FIG. 61 OUTGOING SPI-4 INTERFACE BLOCK

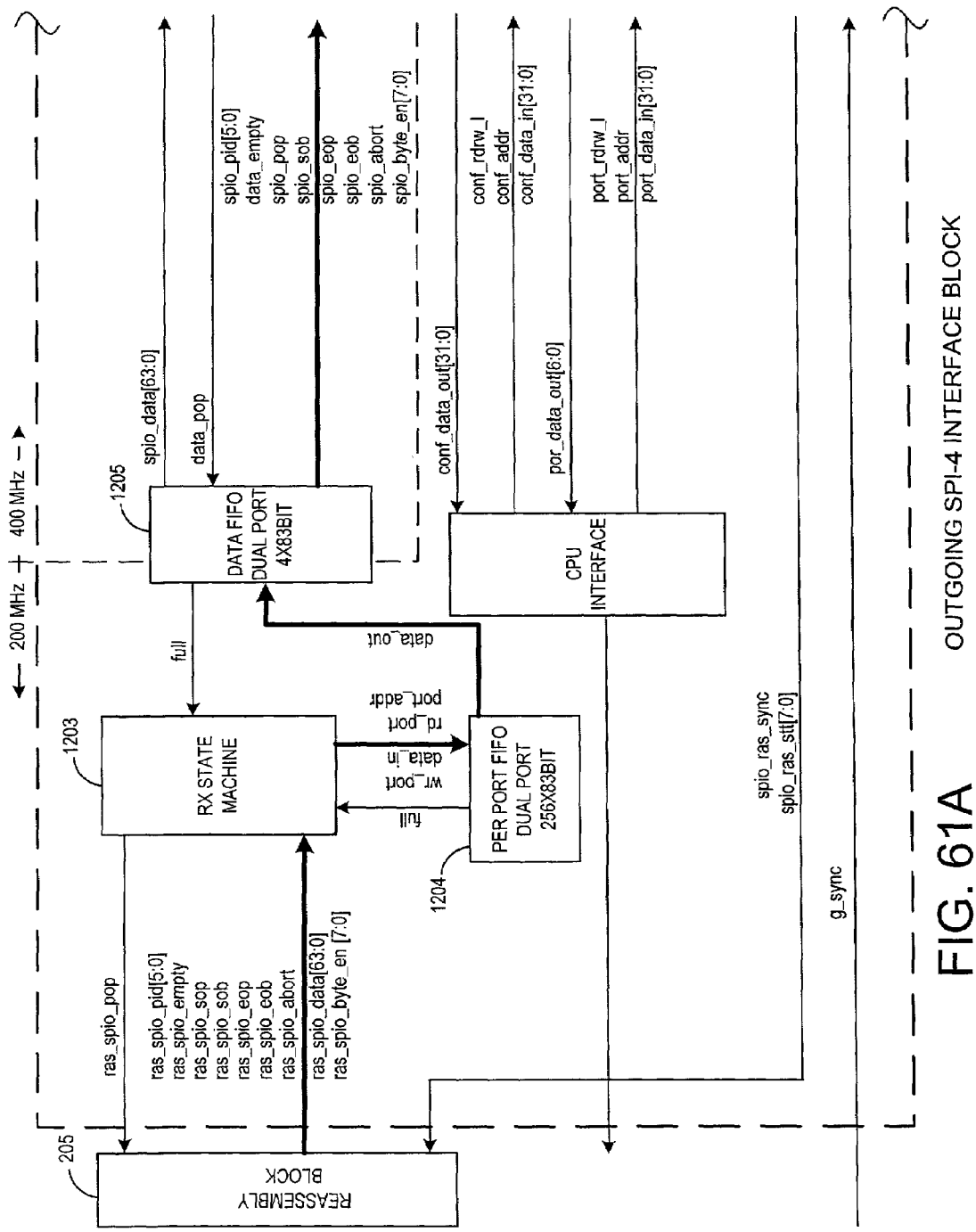
FIG. 61A    OUTGOING SPI-4 INTERFACE BLOCK

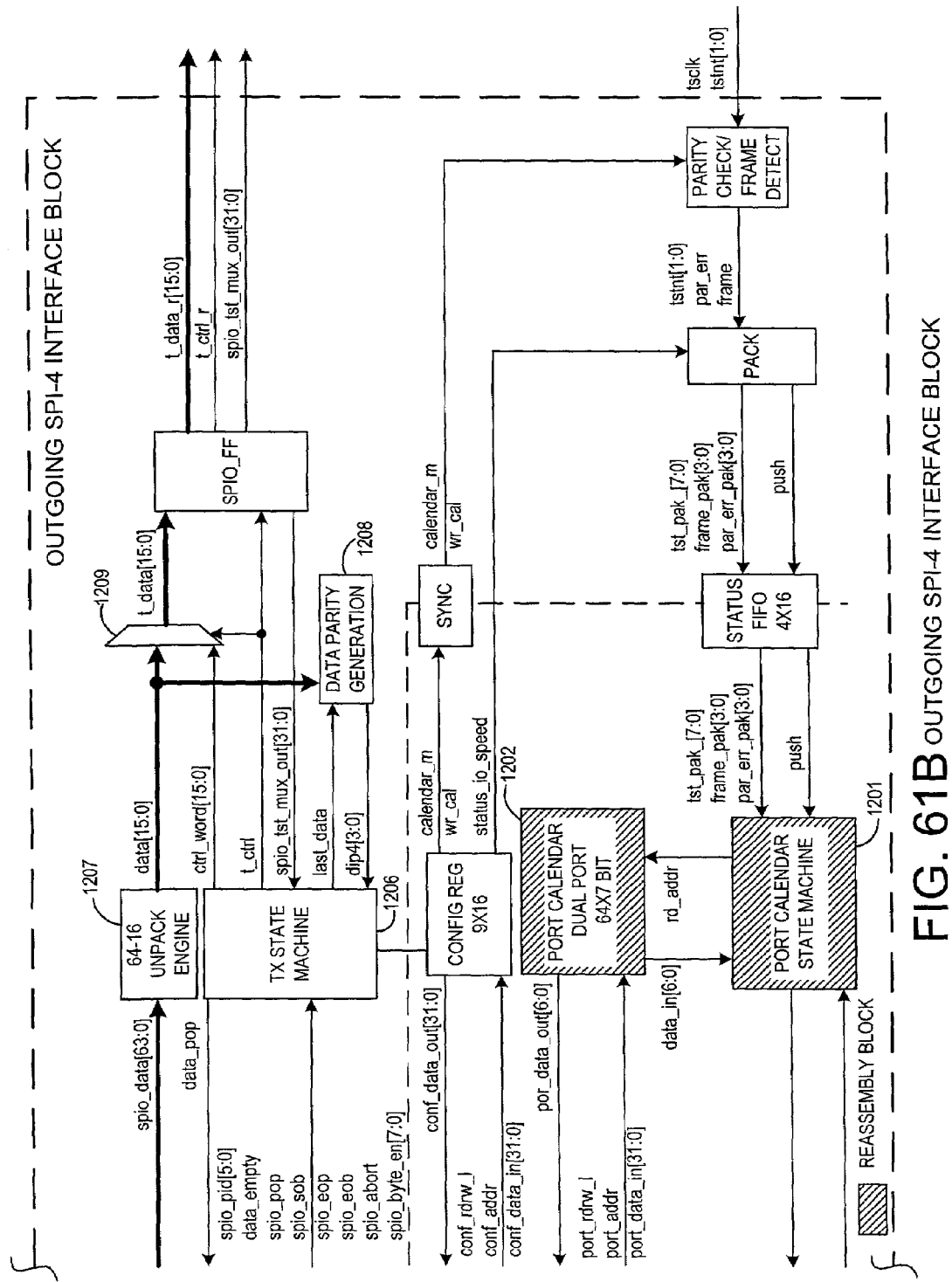
FIG. 61B OUTGOING SPI-4 INTERFACE BLOCK

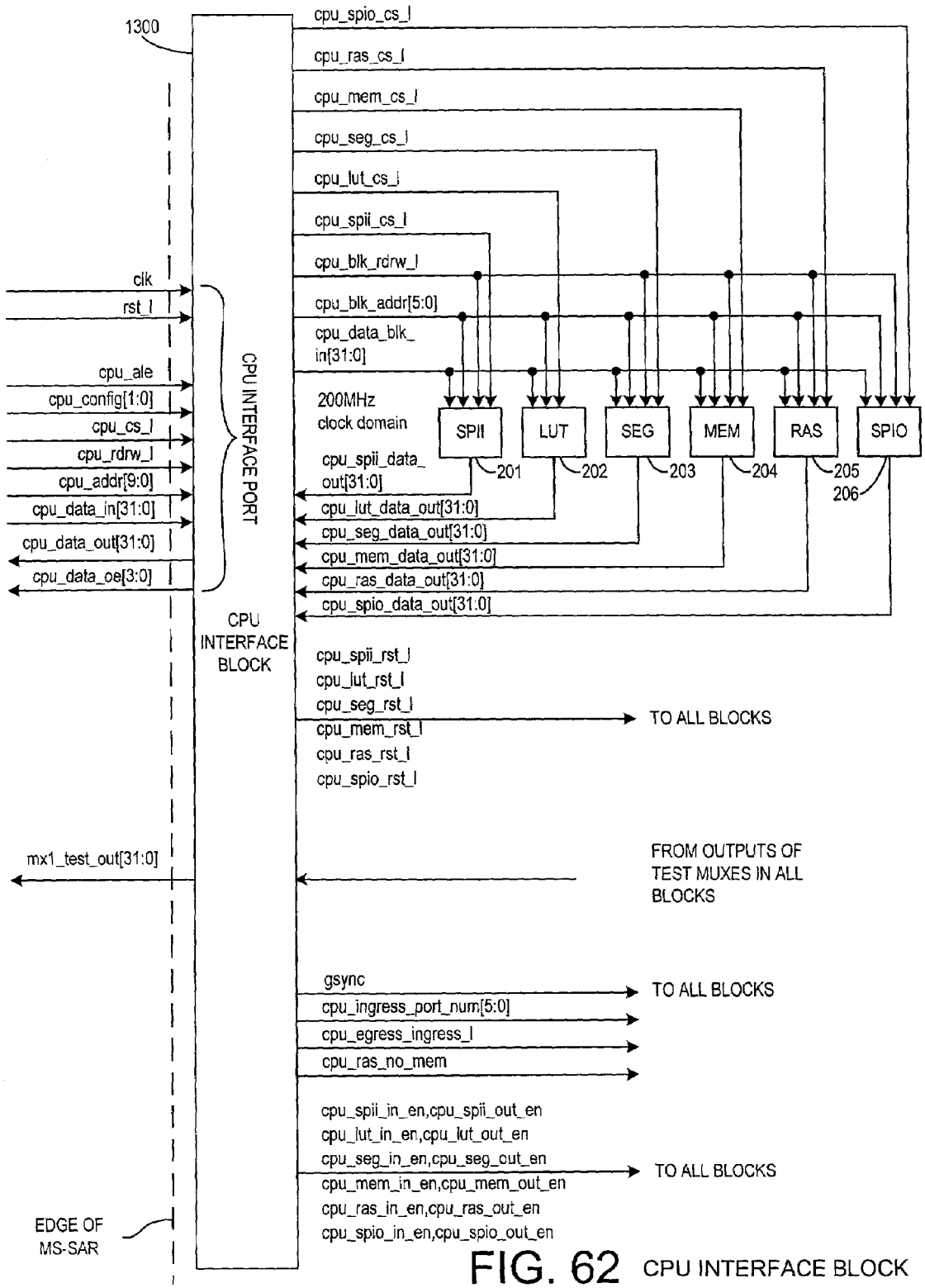
FIG. 62 CPU INTERFACE BLOCK

MULTI-SERVICE SEGMENTATION AND REASSEMBLY DEVICE WITH A SINGLE DATA PATH THAT HANDLES BOTH CELL AND PACKET TRAFFIC

CROSS-REFERENCE TO RELATED APPLICATIONS

This application claims the benefit under 35 U.S.C. § 120 of U.S. patent application Ser. No. 09/851,565, filed May 8, 2001, and is a divisional thereof. This application also claims the benefit under 35 U.S.C. § 120 of U.S. patent application Ser. No. 09/823,667, filed Mar. 30, 2001, of which U.S. patent application Ser. No. 09/851,565 is a continuation-in-part. This application also claims the benefit under 35 U.S.C. § 120 of U.S. application Ser. No. 09/779,381, filed Feb. 7, 2001 of which U.S. patent application Ser. No. 09/851,565 is also a continuation-in-part.

TECHNICAL FIELD

This invention relates to multi-service network communications, such as, for example, line card circuitry disposed within routers and switches.

BACKGROUND INFORMATION

FIG. 1 (Prior Art) is a diagram of a part of the Internet 1. The Internet, loosely defined, is a collection of networks that are interconnected by devices called "routers". In the illustration, the Internet 1 involves seven networks N1–N7 and five routers R1–R5. A protocol called the Internet Protocol (IP) is used to communicate a message from a source device (a node) on one network to a destination device (a node) on another network. The message is broken up into pieces and each of these pieces is packaged into what is called an "IP packet". These packets may be of varying lengths. The IP packets of the message are then sent from the source to the destination from one network to the next via the routers. The various IP packets can take different paths to get from the source to the destination. When all the IP packets arrive at the destination, they are reassembled to recreate the original message.

This high level IP message can be transported across an individual network using any one of many lower level protocols. Some of the protocols are packet-based protocols, whereas others of the protocols are cell-based protocols. One packet-based protocol used to transport IP is called Multi-Protocol Label Switching (MPLS). In MPLS, each packet is encapsulated with an MPLS label by the first MPLS device it encounters as it enters an MPLS network. The MPLS device is called an MPLS edge router. The MPLS edge router analyses the contents of the IP header and selects an appropriate MPLS label with which to encapsulate the packet. MPLS packets therefore have varying lengths in the same way that IP packets do. At all the nodes within the network subsequent to the edge router, the MPLS label (and not the IP header) is used to make the forwarding decisions for the packet. Paths through particular nodes in the network are setup from edge to edge, the label defining the particular path its packet will take. Finally, as an MPLS labeled packet leaves the network via an edge router, the edge router removes the MPLS label.

One cell-based lower level protocol used to transport IP over a network is the Asynchronous Transfer Mode (ATM) protocol. In ATM, all packets are of equal length. They are therefore called "cells". A large IP packet is transported over an ATM network by segmenting the large IP packet into a plurality of smaller pieces. Each of the smaller pieces is packaged to become an ATM cell. The ATM cells are then transported across the ATM network. When the ATM cells reach the edge of the ATM network, their payloads are reassembled to reform the large IP packet. In FIG. 1, networks N1, N5 and N3 are cell-based ATM networks. Networks N2, N6, N4 and N7 are packet-based MPLS networks.

In the example of FIG. 1, networks N3 and N4 are OC-192 high-speed networks adapted to carry traffic over long distances. Router R2 at one end of network N3 may, for example, be located in San Francisco whereas router R4 at the other end of network N3 may be located in New York. Such high-speed long distance networks are often called the "backbone" of the Internet.

In the example of FIG. 1, individual users U1–U10 are coupled to the Internet via local area networks. Networks N1, N2 and N7 are local area networks. In one example where the network is a corporate network serving an office building, the users are corporate employees in a building. In an example where the network is a network operated by an Internet Service Provider (ISP), the users are individual customers that pay the ISP to gain access to the Internet. Consider the situation where users on networks N1 and N2 issue IP messages that are destined to go to destinations to the right side of the backbone such that the messages should go through one of the two back bone networks N3 and N4. In such a case, the IP traffic from networks N1 and N2 is aggregated and supplied to the router access point on the appropriate backbone network. A portion of the Internet called the "Metropolitan Area" performs this function. In the illustration, the metro area includes a router R1 used for aggregating traffic from networks N1 and N2, and for routing that information to the appropriate one of backbone networks N3 and N4.

FIG. 2 (Prior Art) is a more detailed view of router R1. Router R1 includes line cards 2–3 for interfacing to ATM networks, other line cards 4 and 5 for interfacing to MPLS networks, and a switch fabric 11. ATM line card 3 is coupled to ATM network N5 such that router R1 can communicate with backbone network N3 via network N5. Similarly, MPLS line card 5 is coupled to MPLS network N6 such that router R1 can communicate with backbone network N4 via network N6. ATM line card 2 is coupled to ATM network N1 via OC-12 fiber optic link 6, SONET multiplexer 7, higher speed OC-48 fiber optic link 8, and SONET multiplexer 9. MPLS line card 4 is coupled to MPLS network N2 via OC-12 fiber optic link 10, SONET multiplexer 7, higher speed OC-48 fiber optic link 8, and SONET multiplexer 9. SONET multiplexer 7 performs time division multiplexing (TDM) to modulate both ATM traffic from network N1 as well as packet MPLS traffic from network N2 onto the same wavelength channel transmitted over the same fiber optic link 8. SONET multiplexer 9 performs the inverse function of time demultiplexing the signal on fiber optic link 8 to extract and separate the ATM traffic from the MPLS traffic.

Router R1, when it receives an IP message from one of networks N1 or N2, determines whether to forward the message on the message's "next hop" to router R2 or R3. In this way IP network information from the users is aggregated in the metro area and is directed to the correct backbone network for communication across long distances to the destination.

A problem may exist if one of the local area networks coupled to router R1 is disconnected or if the type of traffic on that network is changed from MPLS packet traffic to ATM cell traffic or visa versa. Consider the situation in which ATM network N1 ceases business operations. In that case, the operator of router R1 will likely want to disconnect network N1 from its SONET multiplexer 7 and to couple in the network of another paying customer. For example, the operator may want to disconnect ATM network N1 and to connect in its place MPLS network N7. If this is done, however, MPLS traffic would be received on ATM line card 2. ATM line card 2 is not suitable for coupling to an MPLS network. Consequently, ATM line card 2 may have to be disconnected and a suitable MPLS line card substituted in its place. With the expansion of the Internet and with advances in IP switching technology, it appears that the proportion of packet networks to ATM networks is increasing. Accordingly, as more and more of the networks coupled to a router such as router R1 migrate from one type of traffic to the other, more and more of the line cards of the router will have to replaced. This is undesirable. A solution is desired whereby a smooth and easy migration from one type of traffic to the next is possible without the removal of line cards or the physical manipulation of the router.

FIG. 3 is a diagram of one possible approach to the problem involving a line card 12 that handles both ATM and packet traffic. Line card 12 is coupled to a switch fabric of a router by interface 13. Cell and packet traffic received from fiber optic cable 14 and transmitted on fiber optic cable 15 are time division multiplexed/demultiplexed by TDM device 16. Cell traffic is handled by integrated circuit device 17. Packet traffic is handled by integrated circuit device 18. As the relative amounts of cell traffic to packet traffic change, the same line card can be used.

SUMMARY

Although the line card set forth in FIG. 3 is satisfactory for some applications, the general approach of FIG. 3 involves substantial cost. The non-recurring engineering costs associated with developing an integrated circuit can be quite high. Even though the development of a particular integrated circuit may make technical sense for a given application, it may be economically unreasonable to do so where production volumes of the integrated circuit would be low. For each line card of FIG. 3, there is one integrated circuit for handling ATM traffic and one integrated circuit for handling packet traffic. Developing a single integrated circuit having the functionality of both the ATM device and the packet device might involve less non-recurring engineering costs than developing two different integrated circuits, but the integration would likely result in an undesirably large integrated circuit. Parts of such a single integrated circuit may see little use in certain circumstances. Consider the situation in which the mix of ATM traffic to packet traffic shifts to where there is little or no ATM traffic. The single integrated circuit would involve a data path and associated circuitry for handling ATM traffic that is underutilized or is not used at all. Providing this extra unnecessary circuitry on the single integrated circuit would constitute an unnecessary expense. It would therefore make the line card solution afforded by the single integrated circuit unnecessarily expensive. It would be preferable to get more use out of the circuitry provided on the integrated circuit in order to reduce costs.

Not only might some circuitry be underutilized, but also so might other circuitry become overburdened. In the above situation, for example, more and more processing responsibilities would be required of the packet handling circuitry. If the processing capability of the packet handling circuitry is sized to accommodate a particular load, then increasing the load beyond that load by more and more of the traffic shifting to packet traffic may result in the line card being inadequate to handle the required traffic.

In one novel aspect, the same circuitry on a single Multi-Service Segmentation And Reassembly (MS-SAR) integrated circuit handles both cell traffic and packet traffic. Rather than there being a first data path through the integrated circuit for cell processing, and another data path through the integrated circuit for packet processing, functional blocks along a single data path process cell and/or packet information that passes through the integrated circuit though the single data path. Individual flows passing through the single data path are processed in accordance with the traffic type of the individual flow. Any mix of cell to packet traffic can be accommodated, thereby enabling a smooth migration from one traffic type to another. The MS-SAR can handle dynamic changes in the relative amounts of cell and packet traffic. Production costs associated with the integrated circuit are reduced because the same functional blocks are used, albeit in different ways, to process different types of flows.

In another novel aspect, production volumes may be increased in order to realize economies of scale and to reduce per part cost. To allow production volumes to be increased, the very same MS-SAR integrated circuit is usable not only both as an ingress device and an egress device, but also with either a packet-based switch fabric or a cell-based switch fabric. By providing a single MS-SAR integrated circuit that functions as either an ingress device or an egress device as compared to a device that can function as just one or the other, the number of applications for the MS-SAR integrated circuit is increased. By providing a single MS-SAR integrated circuit that can work with either a packet-based switch fabric or a cell-based switch fabric, the number of applications for the single MS-SAR integrated circuit is increased as compared to the same device that could only function with one type of switch fabric.

In another novel aspect, a single MS-SAR integrated circuit involves a lookup block, a segmentation block, and a reassembly block, wherein traffic flows through a single data path through the lookup block, and then through the segmentation block, and then through the reassembly block. By using two identical such MS-SAR devices, one in an ingress mode and another in an egress mode, information received onto the ingress MS-SAR in either ATM or packet format can be communicated through either a packet-based or a cell-based switch fabric, and can be output from the egress MS-SAR in either ATM or packet format. Information communicated in AAL5 adaptation cells received onto the ingress MS-SAR can be reassembled and output in packet format on the egress MS-SAR. Packet format information received onto the ingress MS-SAR Can be segmented and output in the form of AAL5 adaptation cells from the egress MS-SAR. The versatility of the single MS-SAR to handle many different traffic types using the same circuitry further increases the number of applications for which the integrated circuit can be used.

In another novel aspect, individual flows are processed in different ways by an egress MS-SAR. An indication of the type of egress processing to be done by an MS-SAR on a flow is embedded into the flow that is received from a switch fabric onto the egress MS-SAR. The egress MS-SAR reads the embedded indication and performs the type of egress processing indicated. In one embodiment, the indication of the type of egress processing is contained in a switch header (the switch header can be either a switch header for a cell-based switch fabric or for a packet-based switch fabric), the switch header being added by a first MS-SAR functioning in an ingress mode, the first MS-SAR and the second MS-SAR being substantially identical integrated circuits. In one embodiment, information on how to locate the indication of the type in the information coming into the egress MS-SAR is provided to the egress MS-SAR for each logical input port of the egress MS-SAR. The egress MS-SAR uses: 1) the input port number of the flow, and 2) the information on how to locate the indication for a given input port, to locate the indication in the information coming in from the switch fabric.

In accordance with known ATM adaptation layer protocols, packet data can be transmitted over an ATM network by segmenting the packet into smaller pieces and then transmitting each smaller piece over the ATM network in the form of an ATM cell. After transmission across the ATM network, the data payloads of the individual ATM cells are recovered and are reassembled into the original packet. This segmentation and reassembly process has been traditionally performed on a line card by reassembling packets as the individual ATM cells are received onto the line card. A reassembly context is maintained for each packet being reassembled. This reassembly context may, for example, include a composite cyclic redundancy check (CRC) value that is modified as each ATM cell carrying a portion of the packet is received and processed. The CRC value calculated on the data portions received is checked against a CRC transmitted in a trailer of the last ATM cell to verify that the data carried by the numerous ATM cells has not been corrupted in the segmentation and reassembly process. Once a packet has been checked and reassembled, is it buffered into a payload memory on the line card. If, for example, the line card were to support the simultaneous reassembly of one million packets, then the line card would have to be able to store one million reassembly contexts. This would involve a large amount of memory.

In another novel aspect, packets to be reassembled on the line card in such an adaptation layer process are not reassembled before being buffered on the line card. Rather, the payloads of the individual cells are buffered in payload memory as cells. The line card does not maintain a reassembly context for each such packet being buffered. When the buffered packet information is to be output from the line card, the cell payloads corresponding to the packet are read out of payload memory and the cell payloads are reassembled to form the packet. In this way, a large number of packets being received onto the line card do not need to be simultaneously reassembled, but rather the number of packets being simultaneously reassembled can be set to have a smaller maximum. In one embodiment, one million flows to be reassembled can be received at one time onto a line card, but only one packet per active line card output port is reassembled at a time. By reducing the maximum number of packets being simultaneously reassembled, the maximum number of reassembly contexts to be stored on the line card is reduced. Reducing the number of reassembly contexts to be stored reduces the amount of memory necessary and thereby reduces line card costs.

Not only is a reassembly context involved the reassembly process, but a segmentation context is also traditionally involved in the segmentation process. Traditionally, packets to be segmented on a line card in accordance with an adaptation layer process are received and stored into payload memory as packets. When a packet is to be output, it is retrieved from payload memory and is segmented into segments such that each of the segments forms the data payload of an ATM cell. To be able to check the integrity of the data when the segments are reassembled, a CRC is calculated on the packet at the time of segmentation and is transmitted in a trailer that is included in the last ATM cell. For each such segmentation process that is going on at the same time, a segmentation context including a partial CRC value is maintained. If a large number such as a million simultaneous output flows is to be supported by the line card, then the large number of segmentation contexts must be stored on the line card. This involves a lot of memory and consequently increases line card cost.

In another novel aspect, packets to be segmented in accordance with an adaptation layer protocol are segmented on a per input port basis as they are received onto the line card and prior to being buffered on the line card. The packets are not buffered on the line card, but rather segments are buffered. Because only one segmentation is performed at a time for a given line card input port, the maximum number of simultaneous segmentations is limited to the number of input ports. By limiting the maximum number of simultaneous segmentations to be performed, the memory required to store the associated segmentation contexts is reduced. In one embodiment, one million simultaneous flows can be processed, but there are only sixty-four input ports. The amount of memory required for storing segmentation contexts is therefore significantly reduced.

In another novel aspect, an MS-SAR involves a data path such that data received onto the MS-SAR passes through the data path and to a memory manager that stores the data into payload memory. The data is then read out of the payload memory and passes through the remainder of the data path to be output from the MS-SAR. How and when the data is read out of payload memory is controlled by control circuitry. The control circuitry controls the memory manager so that the memory manager retrieves data from payload memory so that it will be output from the MS-SAR in a manner controlled by the control circuitry. In one novel aspect, the MS-SAR is partitioned into two integrated circuits such that the data path circuitry is disposed on one integrated circuit and such that the control circuitry is disposed on another integrated circuit. Partitioning the MS-SAR in this way facilitates future increasing of data throughput rates without redesigning the MS-SAR. To increase data throughput, for example from OC-192 rates to OC-768 rates, multiple data path integrated circuits are disposed in parallel, each of the data path integrated circuits being controlled by the same control integrated circuit. The control integrated circuit has multiple control interfaces, one such interface for coupling to and controlling each of the data path integrated circuits.

In another novel aspect, a router involves a first line card and a second line card. Each of the first and second line cards involves an MS-SAR operating in the ingress mode and an MS-SAR operating in the egress mode. The egress MS-SAR on the second line card can become endangered of being overloaded if, for example, the ingress MS-SAR on the first line card continues to send network information for a flow to the egress MS-SAR on the second line card, but the egress MS-SAR on the second line card is prevented from outputting that information, for example due to congestion at the framer. Consequently, more and more of the network information for the flow will end up having to be buffered by the egress MS-SAR of the second line card. In one novel aspect, the ingress and egress MS-SAR devices of the first line card are linked by a serial bus on the first line card, and the ingress and egress MS-SAR devices of the second line card are linked by a serial bus on the second line card. If the egress MS-SAR of the second line card is in danger of becoming overloaded, then the egress MS-SAR of the second line card sends an indication of this situation to the ingress MS-SAR of the second line card via the serial bus on the second line card. The ingress MS-SAR of the second line card relays that information to the first line card by outputting a special status switch cell. The special status switch cell is transported across the switch fabric to the egress MS-SAR of the first line card. The egress MS-SAR of the first line card detects the special status switch cell, and relays the indication of the situation to the ingress MS-SAR of the first line card via the serial bus on the first line card. In response to receiving this indication from the serial bus, the ingress MS-SAR on the first line card slows or stops outputting the information that is overburdening the egress MS-SAR on the second line card.

In another novel aspect, an integrated circuit includes a reassembly circuit, wherein in an ingress mode the reassembly circuit uses a flow ID to lookup a switch header in an memory, and wherein in an egress mode the reassembly circuit uses a flow ID to lookup a network protocol header (for example, ATM header or MPLS header) in the memory.

These are but some of the novel aspects. Other novel structures and methods are disclosed in the detailed description below. This summary does not purport to define the invention. The invention is defined by the claims.

BRIEF DESCRIPTION OF THE DRAWINGS

FIG. 6 is a diagram that sets forth various application types that the router of FIG. 4 (involving a pair of MS-SAR devices, one operating in an ingress mode, and the other operating in an egress mode) can carry out.

FIG. 7 is a diagram illustrating ingress and egress application types involving a cell-based switch fabric. These application types can be carried out by the router of FIG. 4.

FIG. 8 is a diagram illustrating ingress and egress application types involving a packet-based switch fabric. These application types can be carried out by the router of FIG. 4.

FIG. 16 is a diagram of a dequeue memory location (stores the header pointer) for one FID.

FIGS. 17 and 18 are diagrams of the first and second enqueue memory 32 locations (store the tail pointer) for one FID.

FIG. 19 is a diagram of a memory location (stores a pointer to a buffer in the body of a queue) for an intermediate BID in a linked list.

FIG. 24 is a diagram of the port calendar in the reassembly block in the MS-SAR.

FIGS. 25 and 26 are diagrams of the port empty and port full registers in the reassembly block in the MS-SAR.

FIG. 27 is a diagram that illustrates information flow from payload memory out of the ingress MS-SAR in the example of FIG. 9.

FIG. 47 illustrates an example wherein a flow is processed on an ingress MS-SAR in accordance with ingress application type 6 and is processed on an egress MS-SAR in accordance with egress application type 14.

FIG. 59 is a block diagram of one particular embodiment of reassembly block 205 of FIG. 10.

FIG. 61 is a diagram of one particular embodiment of outgoing SPI-4 interface block 206 of FIG. 10. FIGS. 61A and 61B together form a more detailed version of FIG. 61.

FIG. 62 is a diagram of CPU interface block 211 of FIG. 10.

DETAILED DESCRIPTION

Figure 1:
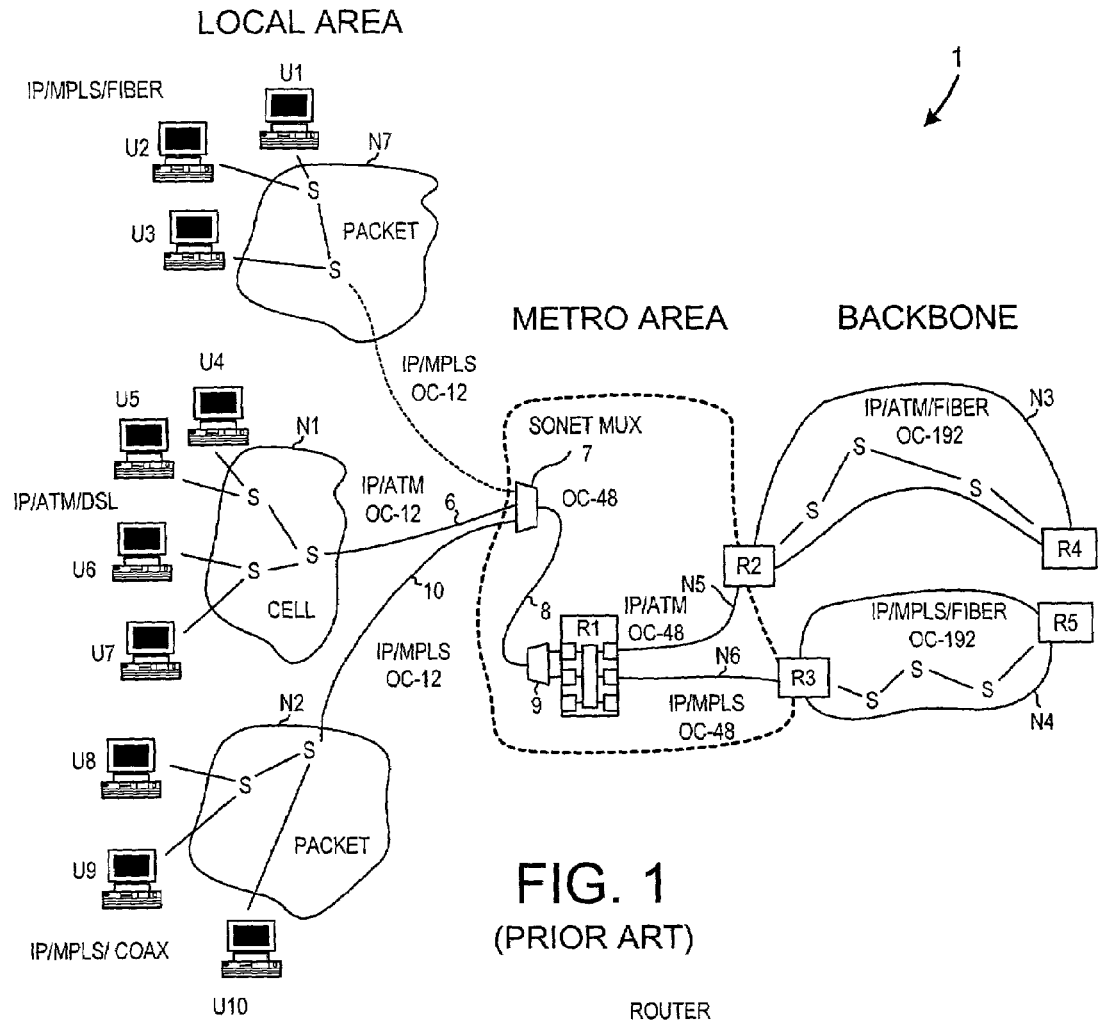
FIG. 1 (Prior Art) illustrates a part of the Internet where different traffic types are aggregated.
Figure 2:
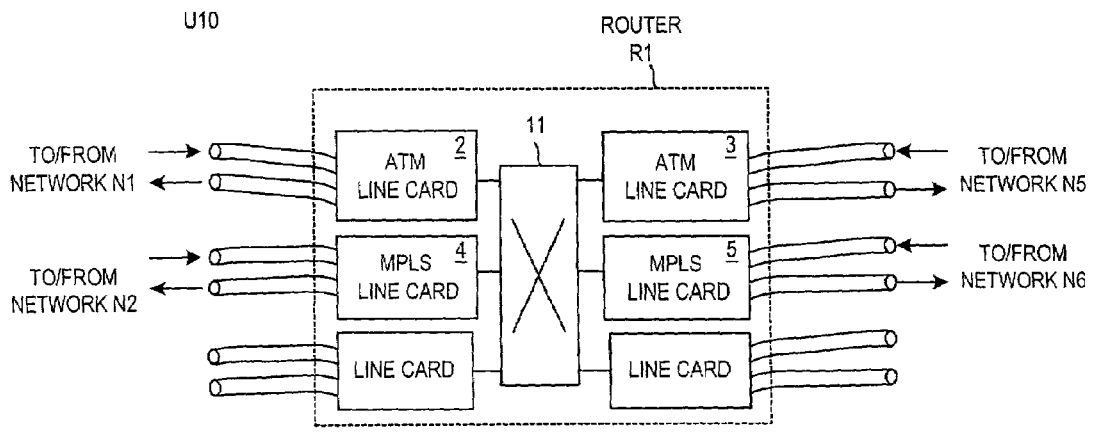
FIG. 2 (Prior Art) is a diagram of a router in the part of the Internet illustrated in FIG. 1.
Figure 3:
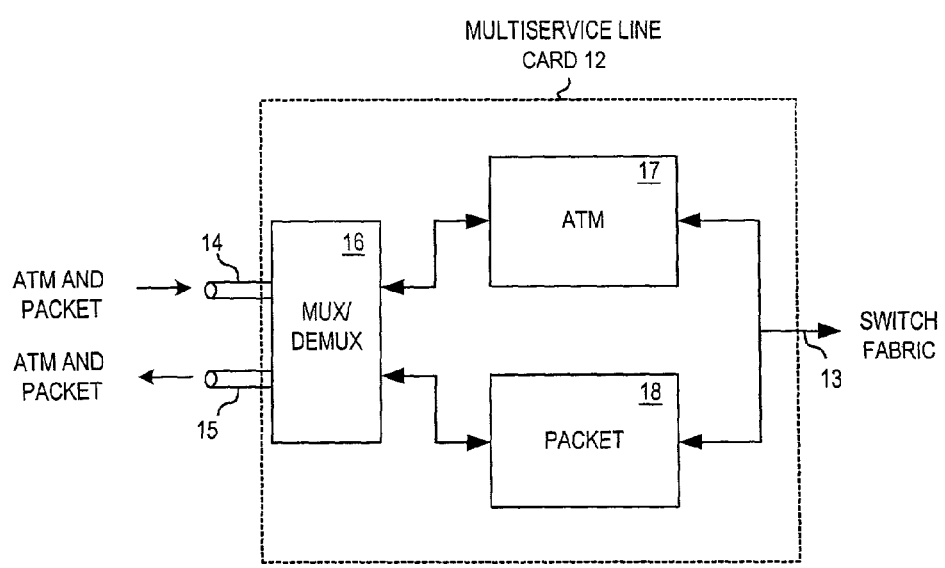
FIG. 3 is a diagram illustrative of an approach to solving a problem associated with the network structure of FIG. 1. Although the line card as illustrated may and is intended to reflect a product designed by or being designed by Northern Telecom Ltd., adequate details about this line card are not available to the inventors or the assignee to state here in this patent document that what is shown in FIG. 3 is prior art.
Figure 4:
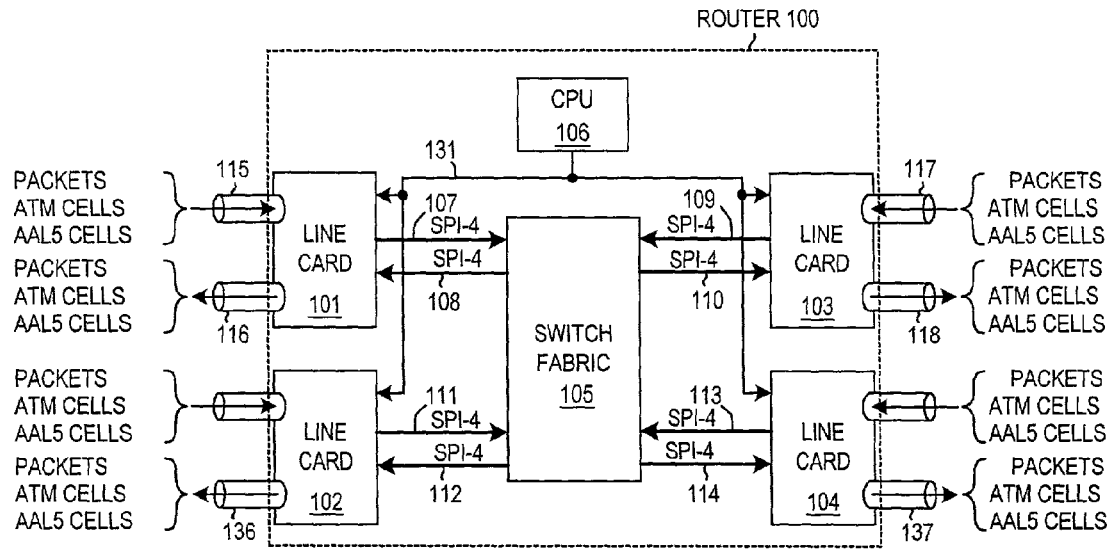
FIG. 4 is a diagram of a switching device (in this case a router) in accordance with an embodiment of the present invention.

FIG. 4 is a simplified diagram of a router 100 in accordance with an embodiment of the present invention. Router 100 includes a plurality of line cards 101–104, a switch fabric 105 and a central processing unit (CPU) 106. The line cards 101–104 are coupled to switch fabric 105 by parallel buses 107–114. In the present example, each of parallel buses 107–114 is a 16-bit SPI-4, Phase II, LVDS parallel bus operating at 400 MHz at a double data rate (DDR). CPU 106 is coupled to line cards 101–104 by another parallel bus 131. In the present example, parallel bus 131 is a 32-bit PCI bus. In this example, each of the line cards can receive network communications in multiple formats. For example, line card 101 is coupled to a fiber optic cable 115 such that line card 101 can receive from cable 115 network communications at OC-192 rates in packets, ATM cells, and/or AAL5 cells. AAL5 cells are considered a type of ATM cell.

Line card 101 is also coupled to a fiber optic cable 116 such that line card 101 can output onto cable 116 network communications at OC-192 rates in packets, ATM cells, and/or AAL5 cells. The fiber optic cables 117 and 118 across which line card 103 communicates are also labeled in the diagram. All the line cards 101–104 in this example have substantially identical circuitry.

Figure 5:
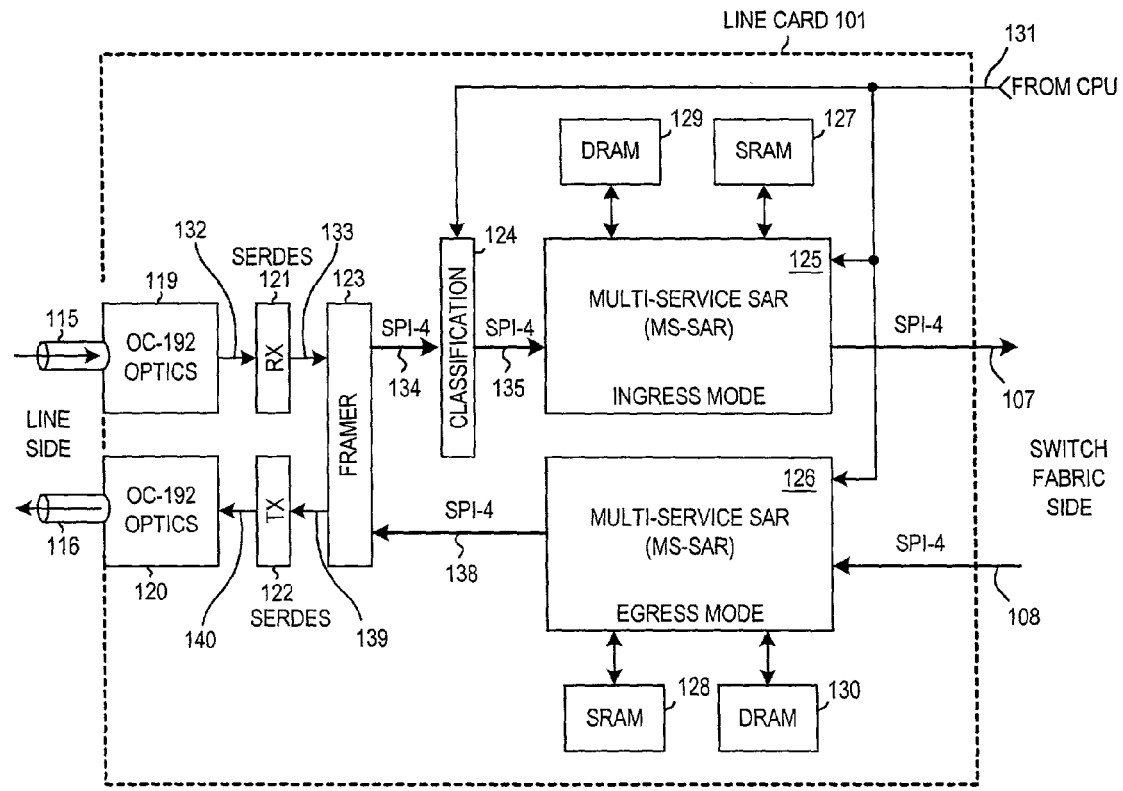
FIG. 5 is a diagram of a line card in the router of FIG. 4.

FIG. 5 is a more detailed diagram of representative line card 101. Line card 101 includes OC-192 optical transceiver modules 119 and 120, two serial-to-parallel devices (SERDES) 121 and 122, a framer integrated circuit 123, a IP classification engine 124, two multi-service segmentation and reassembly devices (MS-SAR devices) 125 and 126, static random access memories (SRAMs) 127 and 128, and dynamic random access memories (DRAMs) 129 and 130. MS-SAR devices 125 and 126 are identical integrated circuit devices, one of which (MS-SAR 125) is configured to be in an "ingress mode", the other of which (MS-SAR 126) is configured to be in an "egress mode". Each MS-SAR device includes a mode register that is written to by CPU 106 via bus 131. When router 100 is configured, CPU 106 writes to the mode register in each of the MS-SAR devices on each of the line cards so as to configure the MS-SAR devices of the line cards appropriately.

Router and Line Card:

Fiber optic cable 115 of FIG. 4 can carry information modulated onto one or more of many different wavelengths (sometimes called "colors"). Each wavelength can be thought of as constituting a different communication channel for the flow of information. Accordingly, optics module 119 converts optical signals modulated onto one of these wavelengths into analog electrical signals. Optics module 119 outputs the analog electrical signals in serial fashion onto a high-speed analog bus 132. Serdes 121 receives this serial information and outputs it in parallel form to framer 123 via high-speed parallel bus 133. Framer 123 receives the information from bus 133, frames it, and outputs it to classification engine 124 via another SPI-4 bus 134. Classification engine 124 performs IP classification and outputs the information to the ingress MS-SAR 125 via another SPI-4 bus 135. The ingress MS-SAR 125 processes the network information in various novel ways (explained below), and outputs the network information to switch fabric 105 (see FIG. 4) via SPI-4 bus 107. All the SPI-4 buses of FIGS. 4 and 5 are separate SPI-4, phase II, 400 MHz DDR buses having sixteen bit wide data buses.

Switch fabric 105, once it receives the network information, supplies that information to one of the line cards of router 100. Each of the line cards is identified by a "virtual output port" number. Router 100 can include up to 256 line cards. Accordingly, the virtual output port number has a range of from 0 to 255.

In the example of FIG. 4, switch fabric 105 may supply network information received on fiber optic cable 115 to any one of fiber optic cables 116, 118, 136 or 137. It is one of the primary functions of router 100 to determine, based on the certain information such as the intended destination of the network information, how to route the information. In the case where the network information is in the IP packet format, the router makes its decision on where to route the network information based on an intended IP destination address present in the IP header of each packet. In the case where the network information is in the ATM cell format, the router makes its decision on where to route the network information based on a virtual path identifier and virtual channel identifier (VPI/VCI) information in the ATM header of each ATM cell.

If, for example, the network information received from fiber optic cable 115 is to be output from fiber optic cable 118, then switch fabric 105 would direct that network information to the "virtual output port" of line card 103. If, on the other hand, the network information received from fiber optic cable 110 is to be output from fiber optic cable 137, then switch fabric 105 would direct that network information to the "virtual output port" of line card 104. To facilitate the rapid forwarding of such network information through the switch fabric 105, network information passed to the switch fabric 105 for routing is provided with a "switch header". The "switch header" may be in a format specific to the manufacturer of the switch fabric of the router. The switch header identifies the "virtual output port" to which the associated network information should be routed. Switch fabric 105 uses the virtual output port number in the switch header to route the network information to the correct line card.

It is, however, generally the router 100 that determines to which of the multiple line cards particular network information will be routed. Accordingly, the router's CPU 106 provisions lookup information in (or accessible to) the ingress MS-SAR 125 so that the MS-SAR 125 will append an appropriate switch header onto the network information before the network information is sent to the switch fabric 105 for routing. The ingress MS-SAR 125 uses header information in the network information to lookup the particular switch header specified by CPU 106 for the particular network information. Once the MS-SAR 125 has found the switch header that it is to append to the network information, MS-SAR 125 appends this switch header to the network information and sends the network information with the switch header on to the switch fabric 105 via SPI-4 bus 107.

Switch fabric 105 receives the network information and forwards it to the line card identified by the particular "virtual output port" in the switch header. Consider the example in which the network information is forwarded to the virtual output port of line card 103 so that the network information from fiber optic cable 115 will be output onto fiber optic cable 117. Because the structures of the various line cards are identical in this example, the flow of network information through line card 103 is explained as passing through the egress MS-SAR 126 of FIG. 5. The network information and switch header is received onto the egress MS-SAR 126 of the line card that is identified by the virtual output port number in the switch header. The egress MS-SAR 126 receives the network information, removes the switch header, performs other novel processing (explained below) on the network information, and outputs the network information to framer 123 via SPI-4 bus 138. Framer 123 outputs the network information to serdes 122 via high-speed parallel bus 139. Serdes 122 converts the network information into serial analog form and outputs it to output optics module 120 via high-speed analog bus 140. Output optics module 120 converts the information into optical signals modulated onto one wavelength channel. This optical information is transmitted through fiber optic cable 116 (which corresponds to cable 118).

Although each line card in the example of FIG. 4 outputs to only one fiber optic cable (i.e., has only one physical output port), this need not be the case. If, for example, a high speed OC-192 optical transceiver and cable is coupled to a line card, then the line card may only have one physical output port. If, on the other hand, two lower speed optical transceivers (for example, OC-48 transceivers) and cables are coupled to the line card, then the line card may have two physical output ports (one being the first OC-48 transceiver and cable, the other being for the second OC-48 transceiver and cable). The egress MS-SAR 126 outputs onto SPI-4 bus 138 network information to be transmitted along with an output port number from 0 to 63. (This "output port number" is not to be confused with the "virtual output port number" used to identify line cards.) Groups of these 64 output port numbers are mapped by framer 123 to the physical output ports provided on the line card. For example, output ports 0–31 on SPI-4 bus 138 may be mapped to a first physical output port (a first OC-48 output transceiver), whereas output ports 32–63 on SPI-4 bus 138 may be mapped to a second physical output port (a second OC-48 output transceiver). In accordance with the SPI-4 bus protocol, there are 64 logical output ports that egress MS-SAR 126 can specify on SPI-4 bus 138.

In a similar way, a line card may receive network information from more than one optical input transceiver module and more than one fiber optic cable. Information coming into a first optical input transceiver module (i.e., a first physical port) would be supplied onto SPI-4 bus 134 by framer 123 with a logical input port number that maps to the first optical input transceiver module onto which the information was received. Similarly, information coming into a second optical input transceiver module (i.e., a second physical port) would be supplied onto SPI-4 bus 134 by framer 123 with a logical input port number that maps to the second optical input transceiver module onto which the information was received. In accordance with the SPI-4 bus protocol, there are 64 logical input ports that framer 123 can specify on SPI-4 bus 134. The logical input port information on SPI-4 bus 134 flows through classification engine 124 to appear on SPI-4 bus 135.

Application Types:

A flow is a sequence of one or more packets or cells transmitted between a selected source and a selected destination, the flow generally representing a single session using a protocol. Each packet or cell in a flow is expected to have the same routing information according to the dictates of the protocol. The specific embodiment of the MS-SAR device described here can process up to one million flows simultaneously. Each of these one million flows is processed in accordance with any one of several "application types". In each application type, the ingress MS-SAR processes the flow in accordance with one of several "ingress application types" and the egress MS-SAR processes the flow in accordance with one of several "egress application types". FIG. 6 sets forth, for each application type, the related ingress application type and the related egress application type. FIG. 7 sets forth the ingress and egress application types when the switch fabric is a cell-based switch fabric. FIG. 8 sets forth the ingress and egress application types when the switch fabric is a packet-based switch fabric.

Example of Application Types 0, 3, 8 and 11:

FIGS. 9–37 illustrate an example of how two flows of different traffic types (flow #1 is an MPLS packet, flow #2 is an ATM cell) are received onto a first line card (in this example, line card 101), simultaneously pass through the ingress MS-SAR 125 on the first line card, pass through switch fabric 105 (in this case switch fabric 105 is a cell-based switch fabric), pass onto a second line card (in this example, line card 103), simultaneously pass through an egress MS-SAR 200 on the second line card 103, and are output by the second line card 103. In this example, flow #1 and flow #2 are both communicated to first line card 101 on the same wavelength channel transmitted on the same fiber optic cable 115. Similarly, flow #1 and flow #2 are both communicated from second line card 103 on the same wavelength channel transmitted on the same fiber optic cable 118.

Figure 9:
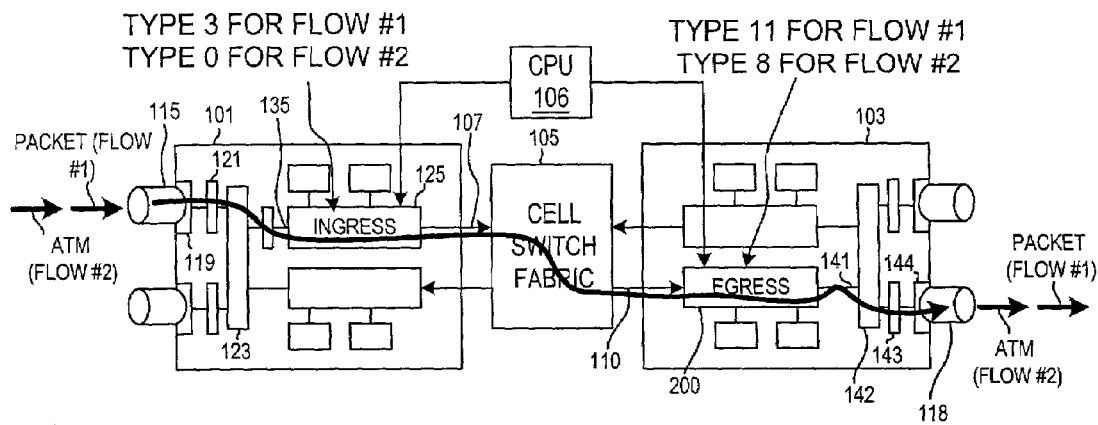
FIG. 9 is a diagram of an example in accordance with an embodiment of the present invention wherein a first flow is processed in accordance with ingress application type 3 and egress application type 11, and wherein a second flow is processed in accordance with ingress application type 0 and egress application type 8.

In FIG. 9, flow #1 is an MPLS packet flow passing into an ingress line card, where the ingress line card supplies switch cells to the switch fabric. As indicated by the lower left example of FIG. 7, this type of flow is identified as ingress application type 3. Ingress MS-SAR 125 therefore performs processing on flow #1 in accordance with ingress application type 3. In FIG. 9, flow #2 is an ATM cell flow passing into an ingress line card, where the ingress line card supplies switch cells to the switch fabric. As indicated by the upper left example of FIG. 7, this type of flow is identified as ingress application type 0. Ingress MS-SAR 125 therefore performs processing on flow #2 in accordance with ingress application type 0.

Figure 10:
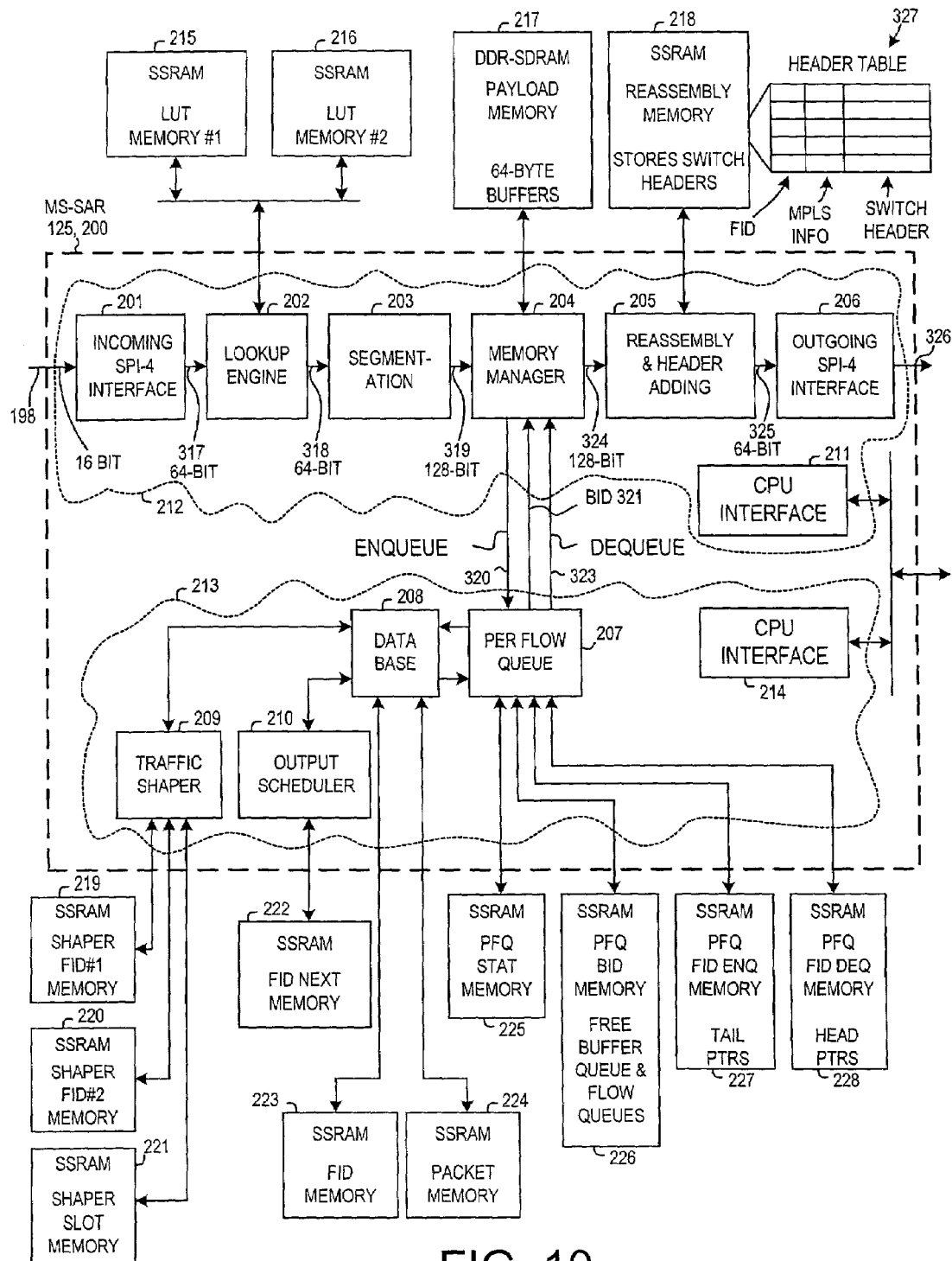
FIG. 10 is a diagram illustrating an MS-SAR and associated memories in accordance with an embodiment of the present invention.

FIG. 10 is a more detailed diagram of the MS-SAR devices 125 and 200 present on line cards 101 and 103. Each MS-SAR device includes an incoming SPI-4 interface block 201, a lookup engine block 202, a segmentation block 203, a memory manager block 204, a reassembly and header-adding block 205, an outgoing SPI-4 interface block 206, a per flow queue block 207, a data base block 208, a traffic shaper block 209, an output scheduler block 210, and a CPU interface block 211. In one embodiment, the blocks within dashed line 212 are realized on a first integrated circuit and the blocks within dashed line 213 are realized on a second integrated circuit. In the event the functionality of the MS-SAR is broken into two integrated circuits, a second CPU interface block 214 is provided so that CPU 106 can communicate with both integrated circuits. The MS-SAR interfaces to and uses numerous other external memory integrated circuit devices 215–228 that are disposed on the line card along with the MS-SAR.

In the example of FIG. 9, the MPLS packet of flow #1 is received onto input optics module 119 from fiber optic cable 115. The MPLS packet passes through (see FIGS. 5 and 9) the input optics module 119, through serdes 121, and to multi-service SONET framer 123. Framer 123 is a framer that includes a demapper for separating ATM cells and MPLS packets that are received on the same wavelength via input optics module 119. Framer 123 in one embodiment is a Ganges S19202 STS-192 POS/ATM SONET/SDH Mapper available from Applied Micro Circuits Corporation, 200 Brickstone Square, Andover, Mass. 01810. Framer 123 outputs the MPLS packet information of flow #1, along with a logical input port number indicative of the physical input module from which the information was received, in 16-bit pieces, onto SPI-4 bus 134. Classification engine 124 performs IP (Internet Protocol) classification in the case where router 100 performs IP lookup. Classification engine 124 may, in one embodiment, be a classification engine available from Fast-Chip Incorporated, 950 Kifer Road, Sunnyvale, Calif. 94086. In the particular example of FIG. 9, the packet traffic (flow #1) comes into the router in MPLS form and exits the router in MPLS form. Consequently, IP classification is not performed in this embodiment.

Figure 11:
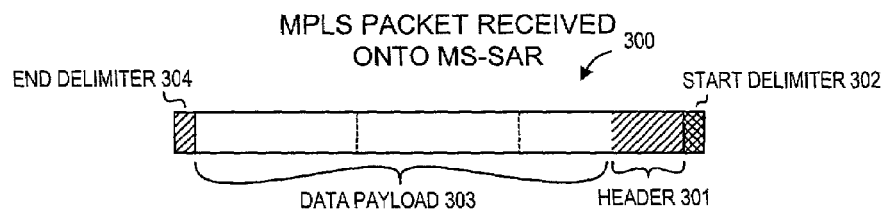
FIG. 11 is a simplified representation of an MPLS packet of flow #1 in the example of FIG. 9.

FIG. 11 is a simplified diagram of the MPLS packet 300 of flow #1 as it is received onto ingress MS-SAR 125. MPLS packet 300 contains an MPLS header 301, and a data payload 303. An SPI-4 start delimiter 302 and an SPI-4 end delimiter 304 frame the packet. MPLS header 301 includes the 20-bit MPLS label. The MPLS header 301 is disposed in the packet between the layer two (L2) header and the layer three (L3) IP header. The L2 header was removed by framer 123 such that beginning of the packet as received onto ingress MS-SAR 125 is the MPLS header.

Ingress MS-SAR 125 (see FIG. 10) receives the packet information in multiple sixteen-byte bursts, sixteen bits at a time, via sixteen input terminals 198. When incoming SPI-4 interface block 201 accumulates 64 bytes (block 201 accumulates 64 bytes in ingress mode and up to 80 bytes in egress mode), it sends the 64-byte chunk to lookup block 202 via 64-bit wide data bus 317. In this way incoming SPI-4 interface block 201 breaks the packet up into 64-byte chunks and communicates the chunks to lookup block 202.

Figure 12:
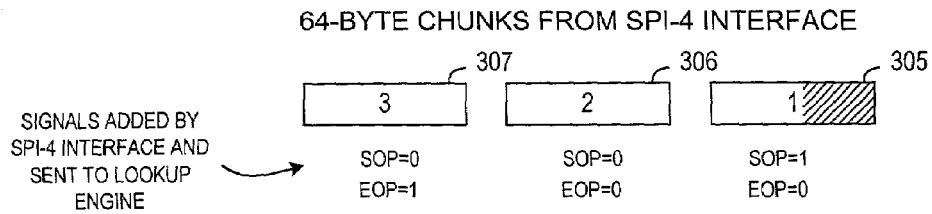
FIG. 12 is a simplified diagram of chunks of flow #1 that are output by the incoming SPI-4 interface block in the example of FIG. 9.

FIG. 12 illustrates the three 64-byte chunks into which this particular MPLS packet 300 is broken as output from incoming SPI-4 interface block 201 to lookup block 202. The incoming SPI-4 interface block 201 uses the start delimiter 302 and the end delimiter 304 to identify the beginning and ending of the packet 300. The incoming SPI-4 interface block 201 outputs two additional signals (an end-of-packet signal and a start-of-packet signal) along with each of the 64-byte chunks. FIG. 12 shows the end-of-packet (EOP) and start-of-packet (SOP) bits for each of the three 64-byte chunks.

Figures 13, 14:
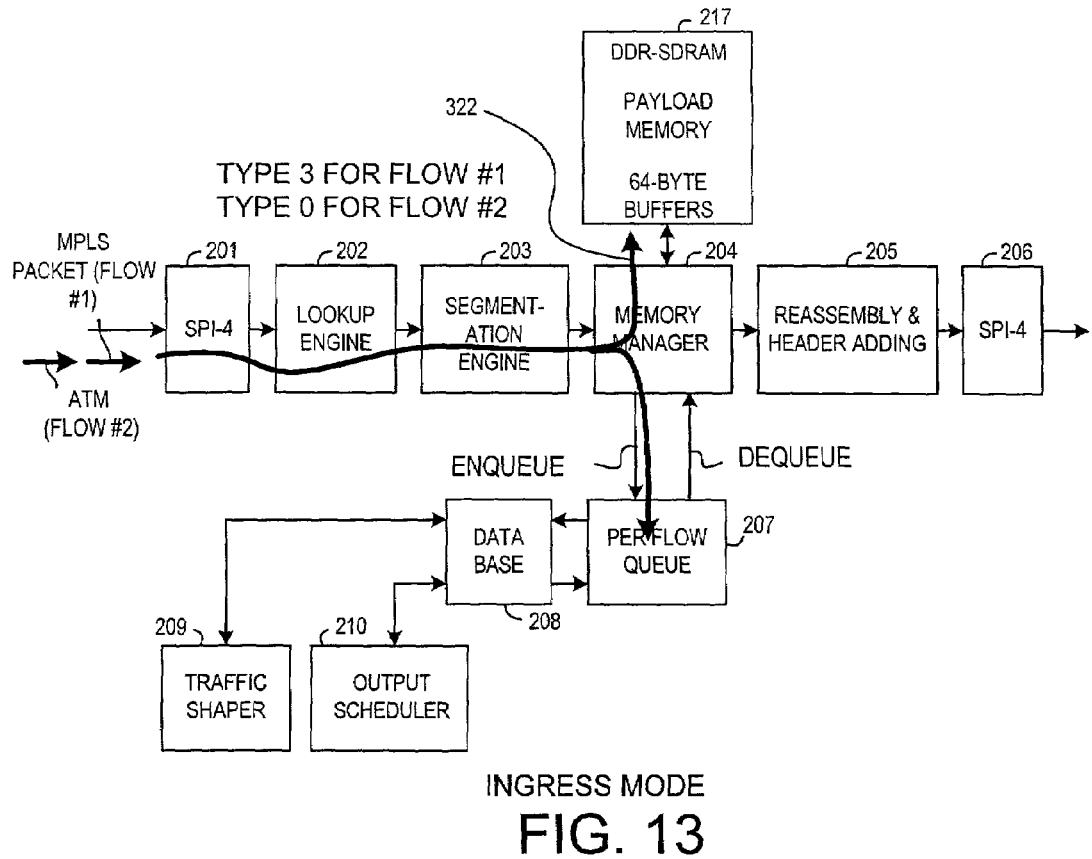
FIG. 13 is a diagram that illustrates information flow into an ingress MS-SAR in the example of FIG. 9.
FIG. 14 is a representation of a port table in the lookup engine.

FIG. 13 shows information flow through ingress MS-SAR 125. CPU 106 has previously placed lookup information into ingress MS-SAR 125 so that the information in each MPLS packet header can be used by lookup block 202 to find: 1) a particular flow ID (FID) for the flow that was specified by CPU 106, and 2) the ingress application type. The ingress application type, once determined, is used by other blocks of the ingress MS-SAR 125 to configure themselves in the appropriate fashion to process the network information appropriately.

Only one traffic type (for example, MPLS packet or ATM cell) is permitted on each logical input port of SPI-4 bus 135. The traffic type is assigned by CPU 106, but there can only be one traffic type assigned at a given time for a given logical input port. A "port table" in lookup block 202 contains, for each of the sixty-four logical input ports, the allowed traffic type as specified by CPU 106. This allowed traffic type information is provisioned in the port table before the flow starts by CPU 106.

FIG. 14 is a conceptual diagram that shows the relationship of the information in the "port table" in lookup block 202. For each logical input port there is a traffic type defined. Lookup block 202 uses the incoming logical port number supplied by framer 123 to lookup the traffic type allowed on the logical input port that packet 300 was received on. Each traffic type has a known format. Accordingly, once the traffic type is known, the lookup block can locate in the header of the incoming flow the particular information that will be used to lookup an associated FID found in a "FID hash table". This "FID hash table" is stored in external memories 215 and 216 (see FIG. 10).

In the present example of FIG. 9, packet 300 is an MPLS packet. Lookup block 202 uses the traffic type found in the "port table" to locate the 20-bit MPLS label within the first chunk of the packet. The MPLS label contains information similar to source and destination addressing information. A hash generator in the lookup block 202 uses the 20-bit MPLS label as a "hash key" to generate a "hash index". This "hash index" is used as an address for the "FID hash table". The content of the FID hash table location addressed contains both the FID and the ingress application type.

The FID and ingress application type, once determined, are passed via 64-bit wide data bus 318 (see FIG. 10), one at a time, to segmentation block 203 along with the consecutive 64-byte chunks of data. Segmentation block 203 stores these 64-bytes chunks on a per port basis. Each 64-byte chunk is stored in a buffer in SRAM within segmentation block 203, and a pointer to the buffer is pushed onto a FIFO of pointers for the input port. The FID and traffic type is also pushed onto the FIFO with the pointer. In the present example, there are three 64-byte chunks in flow #1. Segmentation block 203 calculates a cyclic redundancy check (CRC) value for the data portion of the entire packet, and adds a trailer including this CRC such that the trailer is at the end of the last 64-byte chunk. Segmentation block 203 adds any pad that might be necessary between the end of the data of the last 64-byte chunk and the trailer. Memory manager block 204 pops the FIFO of pointers such that segmentation block 203 forwards the 64-byte chunks one at a time to memory manager block 204 via a 128-bit wide bus 319.

Payload memory 217 contains a large number of 64-byte buffers, each buffer being addressed by a buffer identifier (BID). Some of the 64-byte buffers of payload memory 217 may be used and storing data, whereas others may not be storing data (i.e., are "free"). Per flow queue block 207 maintains a linked list of the BIDs of available buffers, called the "free buffer queue". The "free buffer queue" is stored in external SSRAM 226 (see FIG. 10). When memory manager block 204 receives the first 64-byte chunk 305 of data associated with packet 300, memory manager block 204 issues an "enqueue" command via enqueue command line 320 to per flow queue block 207. This constitutes a request for the BID of a free buffer. Per flow queue block 207 pops the free buffer queue to obtain the BID of a free buffer, and forwards that BID to memory manager block 204 via lines 321. Memory manager block 204 then stores the 64-byte chunk 305 (see FIG. 12) of data for packet 300 in the buffer in payload memory 217 identified by the BID. The writing of the 64-byte chunk of data is indicated in FIG. 13 by the upward pointing heavy arrow 322 that extends toward payload memory block 217.

Figure 15A:
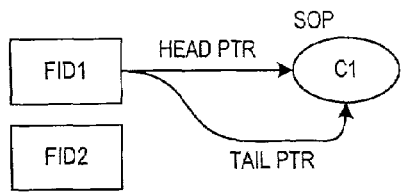
FIGS. 15A–15C are diagrams of the building of a per flow queue for flow #1 in the example of FIG. 9.

Per flow queue block 207 also maintains a linked list (i.e., a "queue") of the BIDs for the various 64-byte chunks of each flow that are stored in payload memory 217. Such a linked list is called a "per flow queue". FIG. 15A illustrates how per flow queue block 207 builds the linked list for flow #1. Each linked list has a head pointer and a tail pointer. A list of the head pointers for the one million possible FIDs is stored in external SRAM 228 (see FIG. 10). A list of the tail pointers for the one million possible FIDs is stored in external SRAM 227.

The head pointer for the FID of flow #1 is set to point to the memory location that stores the BID where the first chunk 305 is stored in payload memory 217. Because there is only one chunk (C1) in the linked list for flow #1, the tail pointer is set to point to the same location. This first chunk 305 of flow #1 is the start of packet 300 as identified by an SOP bit.

Figure 15B:
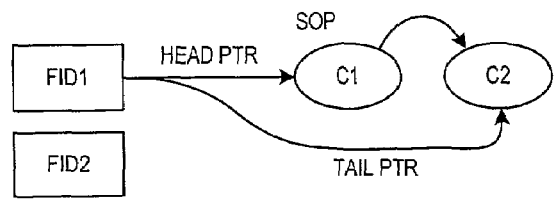

Next, the second 64-byte chunk 306 is received by the memory manager block 204. The memory manager block 204 again issues an enqueue command to per flow queue block 207, again obtains a BID of a free buffer, and then writes the second chunk 306 into the payload memory at the location identified by the BID. The per flow queue block 207 pops the free buffer queue to remove the now-used BID from the free buffer queue, and adds the BID for the second chunk 306 to the linked list for the FID of flow #1. As illustrated in FIG. 15B, the BID of the second chunk 306 is added to the linked list for the FID of flow #1.

Figure 15C:
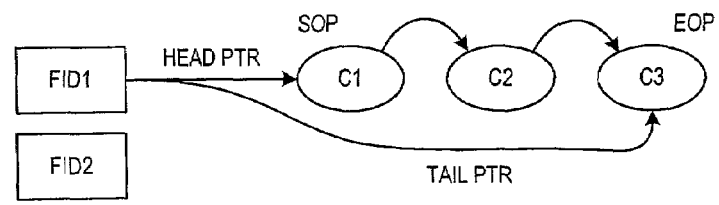

Next, the third 64-byte chunk 307 is received by the memory manager block 204. The same sequence of storing the chunks into payload memory and adding the BID to the linked list of flow #1 is carried out. FIG. 15C illustrates the per flow queue for flow #1 including pointers to these three chunks. In the case of chunk 307, this chunk is the last chunk of the packet as indicated by the EOP bit. The linked list for flow#1 is therefore complete.

FIG. 16 is a diagram of a memory location in FID dequeue memory 228 (see FIG. 10) that stores the head pointer for a flow. Per flow queue block 207 stores in the location, along with the BID head, other information it receives from memory manager block 204 relating to the chunk. This information includes an EOP bit that indicates whether the chunk is the last chunk of a packet, an SOP bit that indicates whether the chunk is the first chunk of a packet, and the ingress application type. Per flow queue block 207 also stores with the head pointer EFCI, CLP and OAM bits. These bits were extracted by lookup block 202 from the header. There is one memory location such as the one illustrated in FIG. 16 for each per flow queue. In the example of FIG. 15C, chunk C1 is pointed to by a head pointer in one such memory location.

FIGS. 17 and 18 are diagrams of two memory locations in FID enqueue memory 227 (see FIG. 10) that store a tail pointer. Per flow queue block 207 stores in these locations, along with a pointer to the BID tail, other information on the chunk including the output port number from which the data will eventually be output, the size of the per flow queue, and an indication of a time to live (a TTL bit). There is one such pair of memory locations for each per flow queue. In the example of FIG. 15C, chunk C3 is pointed to by information in a pair of two such memory locations.

FIG. 19 is a diagram of a memory location in SRAM 226 that stores the pointer for a chunk in a queue between the head and tail. Per flow queue block 207 stores in this location a pointer to the next BID in the per flow queue. The location also stores an EOP indication and an SOP indication. In the example of FIG. 15C, there is one such memory location for chunk C2.

In the example of FIG. 9, a second flow (flow #2) of a different traffic type (ATM cell) is received onto the same line card 101 that flow #1 was. In this example, flow #2 is also received via the same fiber optic cable 115 and is modulated onto the same wavelength channel that flow #1 was. The 53-byte ATM cell of flow #2 passes through the same optics module 119, serdes 121 and framer 123. Framer 123 removes the fifth byte (the "HEC" Header Error Control byte) of the ATM header and places the remaining 52-byte ATM cell onto the 16-bit SPI-4 bus 134. This information passes through classification engine 124 to SPI-4 bus 135 such that the 52-byte ATM cell is received onto the incoming SPI-4 interface block 201 of ingress MS-SAR 125 via sixteen SPI-4 input terminals 198 (see FIG. 10). Incoming SPI-4 interface block 201 receives the 52-byte ATM cell in multiples of 16-byte bursts, 16 bits at a time.

Figure 20:
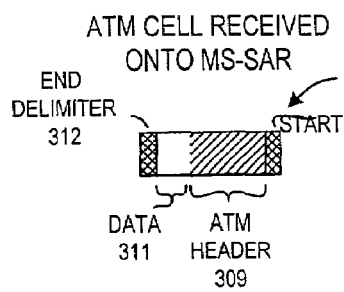
FIG. 20 is a diagram of an ATM cell of flow #2 in the example of FIG. 9.

FIG. 20 is a simplified diagram of the ATM cell 308 as received onto ingress MS-SAR 125. ATM cell 308 is 52-bytes long. ATM cell 308 includes an ATM header 309 and a data payload 311. An SPI-4 bus start delimiter 310 and end delimiter 312 frame the ATM cell. Incoming SPI-4 interface block 201 receives the ATM cell and supplies it to lookup block 202, sixty-four bits at a time, via 64-bit wide data bus 317.

The internal data path within the MS-SAR from incoming SPI-4 interface block 201, through lookup block 202, and to segmentation block 203 is 64-bits (8-bytes) wide. Incoming SPI-4 interface block 201 therefore adds a 4-byte pad 314 (see FIG. 21) to pad the 52-byte ATM cell up to 56-bytes (a multiple of 8 bytes) before sending the ATM cell to lookup block 202.

Figure 21:
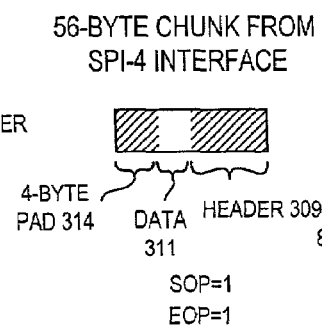
FIG. 21 is a diagram of a 56-byte chunk of flow #2 as output from the incoming SPI-4 interface block of the ingress MS-SAR in the example of FIG. 9.

FIG. 21 is a diagram of ATM cell 308 as it is output from incoming SPI-4 interface block 201 to lookup block 202. Because the entire ATM cell 308 is contained in one 64-byte chunk, the SOP and EOP signals output by the incoming SPI-4 interface block 201 indicate both the start of packet (in this case the packet is a cell) and end of packet (in this case the packet is a cell).

Lookup block 202 receives the 56-byte chunk for ATM cell 308, and from the logical input port number looks up the traffic type from the "port table" (see FIG. 14). The "port table" indicates that the traffic type is ATM cells. Lookup block 202 uses the traffic type to locate the 12-bit VPI and 16-bit VCI fields in the ATM cell header. The hash generator of lookup block 202 uses the located VPI and VCI information as a "hash key" to create a "hash index". This "hash index" is then used to lookup the FID and ingress application type in the "FID table" stored in external memories 215 and 216.

Once the FID and the ingress application type for flow #2 are determined, these values are passed from lookup block 202 to segmentation block 203 via 64-bit bus 318 along with the 56-byte chunk. Segmentation block 203 adds an additional 8-byte pad to pad the ATM cell up to 64-bytes, stores the 64-byte chunk into an SRAM (not shown) in segmentation block 203, and pushes a pointer to that chunk onto its FIFO of pointers for that input port. Memory manager block 204 pops the FIFO of pointers such that segmentation block 203 supplies the 64-byte chunk from its SRAM to memory manager block 203.

Figure 22:
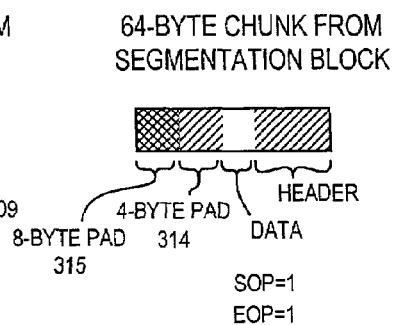
FIG. 22 is a diagram of a 64-byte chunk of flow #2 as output from the segmentation block of the ingress MS-SAR in the example of FIG. 9.

FIG. 22 is a simplified diagram of the 64-byte chunk as output from segmentation block 203 onto 128-bit bus 319. This 64-byte cell contains the 4-byte pad 314 added by the incoming SPI-4 interface block 201 and the additional 8-byte pad 315 added by segmentation block 203. When memory manager block 204 receives the 64-byte chunk, memory manager block 204 issues an enqueue command via command line 320 to per flow queue block 207, obtains in return a BID, and then stores the 64-byte chunk in payload memory 217 at the location identified by the BID. Per flow queue block 207 pops the free buffer queue, thereby removing the now-used BID from the free buffer queue, and adds the BID to a linked list for flow #2.

Figure 23:
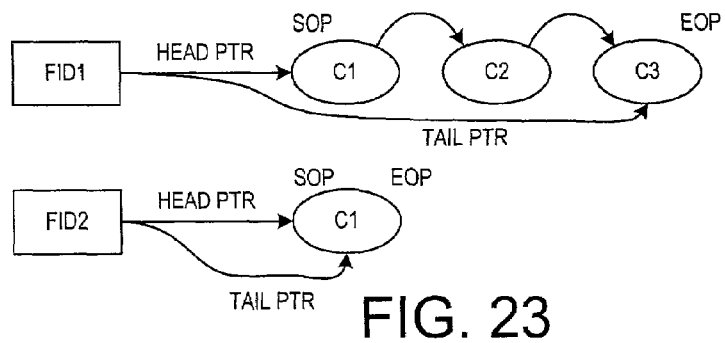
FIG. 23 is a diagram of a per flow queue for flow #2 of the example of FIG. 9.

FIG. 23 is a diagram that illustrates the two linked lists. The linked list for flow #1 (FID1) has BIDs for three chunks C1, C2 and C3, whereas the flow for flow #2 (FID2) has BIDs for one chunk C1. The chunk for the ATM cell is indicated as being both the "start of packet" as well as the "end of packet".

Once the linked lists (queues) for flow #1 and flow #2 are formed, the linked lists are popped (i.e., dequeued) in a particular way and order such that their associated chunks in payload memory 217 are output from ingress MS-SAR 125 in a desired fashion, taking into account user-programmable policing/metering parameters. User-programmable parameters may include, for example, burst size, peak cell rate, and sustainable cell rate.

The dequeue process starts with data base block 208 determining an output port to service using a port calendar. This port calendar is located within data base block 208. Once the output port to service is selected, data base block 208 supplies the output port to traffic shaper block 209 and to output scheduler block 210. The traffic shaper block 209 and the output scheduler block 210 supply flow IDs back to data base block 208. Data base block 208 selects one of the two flow IDs to dequeue for that port. Data base block 208 gives priority to traffic shaper output over output scheduler output such that only if the shaper has no FID to output for a given port will the output scheduler be allowed to schedule an FID for that port. Either traffic shaping is performed on an individual flow by traffic shaper block 209, or output scheduling is performed on the flow by output scheduler block 210.

Traffic shaper block 209 performs traffic shaping on a per flow basis for up to one million flows. On a particular flow, either a single leaky bucket shaping scheme is used, a dual leaky bucket shaping scheme is used, or no shaping at all is used. The shaper selects a peak rate or a sustained rate per flow ID depending on an accumulated credit. Up to 1024 different programmable rates can be shaped simultaneously. In one mode, the rate of incoming traffic with a particular flow ID is measured (i.e., metered) and the flow ID of a violator is marked if the measured rate is above a specific threshold programmed by CPU 106 for the flow ID. Up to 1024 different programmable thresholds can be metered simultaneously.

Output scheduler block 210 uses a weighted round-robin scheme to select a quality of service of the selected port. Once the quality of service is selected, a flow ID is selected based on a round-robin scheme.

When data base block 208 receives a flow ID from either traffic shaper block 209 or output scheduler block 210, data base block 208 generates a request to per flow queue block 207 to issue a dequeue command to dequeue the flow ID. Per flow queue block 207 accesses the per flow queue of the flow ID, determines the next BID to dequeue, and outputs the BID in the form of a dequeue command to memory manager block 204.

Per flow queue block 207 is programmable to cause the linked list of one flow to be output multiple times (i.e., multicast), each time with a different flow ID. Multicasting is performed by replicating the linked list of a flow, each replica linked list having its own flow ID. Per flow queue block 207 is also programmable to cause multiple flows to be combined into one flow (i.e., tunneling). Tunneling is performed by linking the tail of one linked list to the head of another so as to create one large composite linked list, the composite linked list having one flow ID.

In the present example, the linked list of flow #1 (see FIG. 22) is dequeued first. Per flow queue block 207 pops the BID of the first chunk C1 off the FID1 linked list for flow #1 and forwards that BID to memory manager block 204 in a dequeue command. The dequeue command contains the BID of the 64-byte chunk to be read out of payload memory 217, as well as the ingress application type, an EOP bit, an SOP bit, and the output port number (one of 64 logical output ports on SPI-4 bus 107). The dequeue command is sent via dequeue command line 323. The BID is sent via BID lines 321. Per flow queue block 207 adds the now available BID to the free buffer queue in external memory 226.

In response to receiving the dequeue command, memory manager block 204 retrieves the first chunk C1 identified by the BID and outputs that first chunk C1 to reassembly block 205 via 128-bit data bus 324. Memory manager block 205 supplies to reassembly block 205 other control information including the FID of chunk C1, the SOP and EOP bits, the ingress application type being performed on flow #1, and a logical output port ID (PID) identifying the one of the 64 logical output ports on SPI-4 bus 107 to which the chunk will be sent.

Reassembly block 205 uses the ingress application type to determine what type of action it should perform on the associated chunk. In the present example, flow #1 is processed in accordance with ingress application type 3. External memory 218 (see FIG. 10) contains a "header table" 327. For each FID, the CPU 106 has stored beforehand in header table 327 a switch header that reassembly block 205 is to append to the data of the chunk before sending the data on to the switch fabric. Accordingly, reassembly block 205 uses the FID to lookup in "header table" 327 the "switch header" placed there for this FID by CPU 106. The switch header can be either 8-bytes or 16-bytes depending on the requirements of the switch fabric. As explained above, the "switch header" contains the "virtual port number" of the particular egress line card that the switch fabric 105 wants the switch cell routed to. In the present example of FIG. 9, the egress line card is line card 103. Accordingly, CPU 106 has placed the "virtual port number" of line card 103 into the "switch header" associated with flow #1.

Reassembly block 205 also provides a special 4-byte "Azanda header". The Azanda header is embedded in the switch cell as the last four bytes of the switch header. This Azanda header contains information on how the switch cell should be processed by the particular egress MS-SAR that receives the switch cell (in this case MS-SAR 200). The Azanda header includes the egress application type to be used to process the switch cell in the egress MS-SAR. The Azanda header also includes the FID of the cell, an SOP bit, an EOP bit, and quality of service information.

When reassembly block 205 receives the 64-byte chunk from memory manager block 204, it stores the 64-byte chunk into a dual-port DATA_SRAM and stores the "switch header" (including the "Azanda switch header") into a HDR_SRAM. The DATA_SRAM (not shown) and the HDR_SRAM (now shown) are part of the reassembly block 205. A pointer that points to the data in DATA_SRAM and to the header in HDR_SRAM is pushed onto a queue for the particular logical output port. In the present example, where the MS-SAR is operating in the ingress mode, there is only one logical output port (i.e., the output of line card 101), consequently there is only one output port queue. The pointer is therefore placed on this queue. The output port queue is maintained in a Q_FIFO (not shown) that is also part of the reassembly block 205.

FIG. 24 is a conceptual diagram of a "port calendar" located in reassembly block 205. FIG. 25 is a diagram of a "port empty" register located in reassembly block 205. FIG. 26 is a diagram of a "port full" register located in reassembly block 205. Reassembly block 205 uses the port calendar and registers of FIGS. 24–26 to determine how to pop the output port queues in the Q_FIFO and move the associated chunks to an OUTPUT_DATA_FIFO. The OUTPUT_DATA_FIFO (not shown) is located within reassembly block 205 and serves as the interface through which data flows to outgoing SPI-4 interface block 206.

Outgoing SPI-4 interface block 206 periodically sends port full status information that is used to load the "port full" register to keep reassembly block 205 updated on how busy the various output logical ports are. Memory manager block 204 periodically sends empty status information that is used to load the "port empty" register to keep reassembly block 205 updated on whether there is any more information coming from the memory manager 205 for each of the various logical output logical ports. In each of the "port empty" and "port full" registers, there is one bit for each of the respective sixty-four logical output ports of ingress MS-SAR 125.

Reassembly block 205 steps through the rows of the port calendar of FIG. 24, one by one. For each row, reassembly block 205 reads the port ID (PID) from the last field of the row and examines the bit corresponding to that port ID in each of the "port empty" and "port full" registers. If the bits in these two registers indicate that the port is neither full (i.e., that port has all the data it can handle) nor empty (no data is available for that port), then reassembly block 205 pops the queue in Q_FIFO for that port ID. The popping of the queue causes reassembly block 205 to retrieve one 64-byte data chunk from DATA_SRAM and its associated header from HDR_SRAM. (In ingress mode, all chunks are 64 bytes but in egress mode EOP chunks can be less than 64 bytes). The header is then appended to the data chunk as the complete "switch cell" is pushed onto the OUTPUT_DATA_FIFO. Outgoing SPI-4 interface block 206 pops the OUTPUT_DATA_FIFO, thereby causing the "switch cell" to be supplied to outgoing SPI-4 interface block 206 in 64-bit pieces via 64-bit bus 325 (see FIG. 10). The logical output port is provided to outgoing SPI-4 interface block 206 along with the switch cell. Outgoing SPI-4 interface block 206 in turn outputs the switch cell onto SPI-4 bus 107 in 16-bit pieces via sixteen output terminals 326 of ingress MS-SAR 125. The SPI-4 bus 107 includes an SOP delimiter and an EOP delimiter between data bursts on the SPI-4 bus. Data bursts on the SPI-4 bus are transmitted in multiples of 16 bytes.

In this example, MS-SAR 125 is in the ingress mode, so there is only one logical output port. Consequently there is only one entry in the port calendar of FIG. 24. When a row entry is processed having a jump bit of "1", processing of rows returns to the first row. In the example of FIG. 24 where there is only one logical output port, there is a "1" in the jump column of the first row entry for port ID number one. Accordingly, the one and only output queue in the Q_FIFO is popped. The circular arrow in FIG. 24 illustrates this return in the present example where there is only one logical output port (PID 1).

FIG. 27 illustrates information flow for flow #1 out of ingress MS-SAR 125. The heavy upwardly pointing arrow represents the dequeuing operation being performed by per flow queue block 207 including the passing of BIDs and associated parameters to memory manager block 204. The heavy arrow extending from payload memory block 217 to the right represents the flow of 64-byte chunks through reassembly block 205 and to the switch fabric.

Per flow queue 207 continues issuing dequeue commands in the desired order such that the associated various 64-byte chunks of the two flows (see FIG. 23) are read out of payload memory 217 and such that corresponding switch cells are generated. The switch cells are output to switch fabric 105 from outgoing SPI-4 interface block 206 via SPI-4 bus 107.

Figure 28:
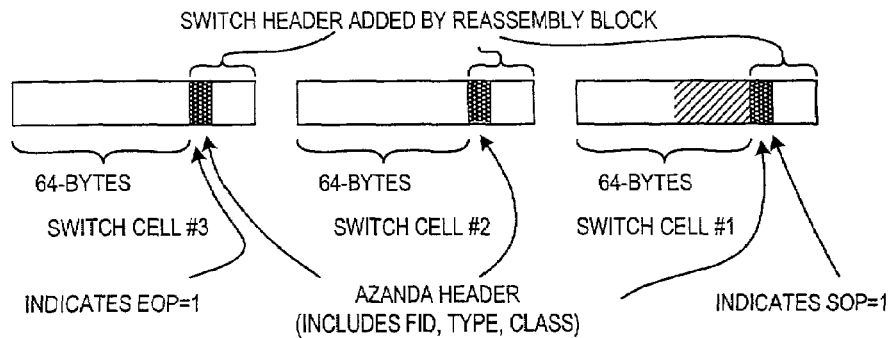
FIG. 28 is a diagram that illustrates the three switch cells of flow #1 in the example of FIG. 9.

FIG. 28 illustrates the three switch cells that correspond to 64-byte chunks C1, C2 and C3 of packet 300. The switch headers of each of the three cells contain the "virtual port number" of line card 103 to which the cells are to be routed. The Azanda header of each switch cell contains the egress application type (egress application type 11) that the egress MS-SAR 200 is to perform on the switch cells of flow #1.

Figure 29:
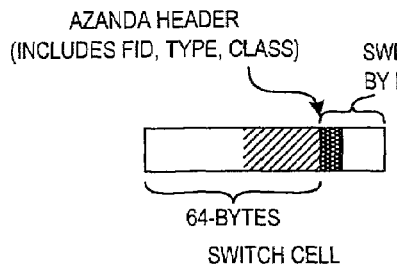
FIG. 29 is a diagram of the switch cell for flow #2.

FIG. 29 illustrates the switch cell that corresponds to the one and only 64-byte chunk for ATM cell 308. The switch header of this switch cell contains the "virtual port number" of line card 103 to which the cell is to be routed. The Azanda header of the switch cell contains the egress application type (egress application type 8) that the egress MS-SAR 200 is to perform on the switch cell of flow #2.

Switch fabric 105 receives the switch cells from SPI-4 bus 107 and uses the "virtual port number" embedded in the switch headers to route the switch cells to line card 103. The switch cells are received on the SPI-4 bus 110 (see FIG. 9) of line card 103. SPI-4 bus 110 is coupled to the SPI-4 bus input terminals (see input terminals 198 of FIG. 10) of egress MS-SAR device 200 of line card 103. Operation of egress MS-SAR 200 is explained below in connection with FIG. 10.

Figure 30:
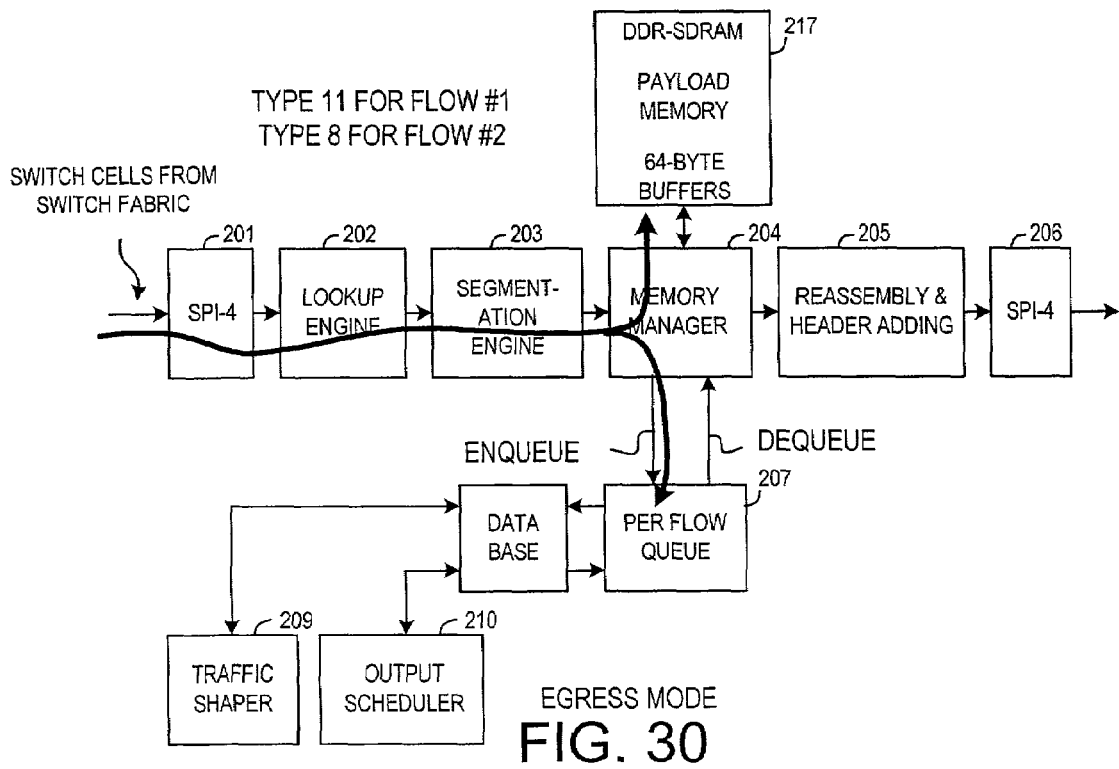
FIG. 30 is a diagram that illustrates the general flow of information into egress MS-SAR 200 in the example of FIG. 9.

FIG. 30 illustrates the general flow of information into egress MS-SAR 200. The first incoming switch cell of packet 300 is read into incoming SPI-4 interface block 201 and is passed to lookup block 202. Lookup block 202 need not, however, perform a lookup using hashing as was done in the ingress mode described above. Rather, because there is an Azanda header embedded in the switch cells, and because that Azanda header contains the FID and the egress application type to be performed by the egress MS-SAR, lookup block 202 merely locates this Azanda header and extracts the embedded information.

Figure 31:
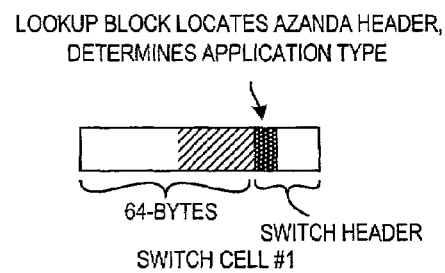
FIG. 31 is a diagram of the first switch cell for flow #1 in the example of FIG. 9.

FIG. 31 illustrates the first switch cell for packet 300 of flow #1. The Azanda header is the last four bytes of the switch header. Although the size of the switch header can differ from switch fabric to switch fabric, all switch cells for a given switch fabric have the same size. CPU 106 writes the size of the switch header for its switch fabric into a "number of bytes of switch header" field in each row of the "port table" (see FIG. 14). This number is the same for all rows of the "port table". Lookup block 202 in egress MS-SAR 200 reads the "number of bytes of switch header" field in the row of the port table in the egress MS-SAR 200 for the logical input port from which the switch cells were received. From this number of bytes of the switch cell, lookup engine block 202 locates the last four bytes which are the Azanda header. From the Azanda header, lookup block 202 retrieves the FID and the egress application type to be performed by egress MS-SAR 200. Lookup block 202 removes the switch header and passes the remaining 64-bytes to segmentation block 203 along with the FID and egress application type. The egress application type is supplied along with the 64-byte chunk so that the other blocks that receive the 64-byte chunk will perform the correct type of processing on the associated 64-bytes. The FID in the example of FIG. 9 is flow #1. The egress application type in the example of FIG. 9 for flow#1 is egress application type 11.

In accordance with egress application type 11, segmentation block 203 does not perform segmenting per se but rather forwards the 64-byte chunk to memory manager block 204 via the per-port FIFO mechanism described above. Memory manager block 204 issues an enqueue command via enqueue command line 320, and stores the 64-byte chunk in payload memory 217. Per flow queue block 207 adds the BID to the per flow queue for flow #1. The same process flow occurs for the second and third switch cells associated with flow #1.

The switch cell for the ATM cell (see FIG. 29) is received onto egress MS-SAR 200 (see FIG. 9) in similar fashion. As in the case for the switch cells for the packet, lookup block 202 uses the logical input port number supplied by incoming SPI-4 interface block 201 to access the appropriate row in the "port table" (see FIG. 14) in the lookup block 202. From the "number of bytes of switch header" field in that row, lookup block 202 locates the "Azanda header" in the incoming switch cell. The Azanda header contains the egress application type and the FID. Lookup block 202 removes the switch header, and forwards the remaining 64-byte chunk to segmentation block 203 along with the FID and egress application type to be performed by egress MS-SAR 200. The 64-byte chunk in this case contains the 4-byte ATM header, the 48-byte ATM payload, and twelve bytes of pad.

In the example of FIG. 9, the FID is flow #2. In the example of FIG. 9, the egress application type for flow #2 is egress application type 8. In accordance with egress application type 8, segmentation block 203 does not perform segmentation per se but rather passes the 64-byte chunk and the egress application type to memory manager block 204 via the per-port FIFO mechanism described above. Memory manager block 204 stores the 64-byte chunk. Per flow queue block 207 adds the BID for this chunk and parameters associated with the chunk to a per flow queue for flow #2.

Once the 64-byte chunks from the various switch cells are stored in payload memory 217 and the linked lists for flow#1 and flow #2 are built, then the linked lists can be popped (i.e., "dequeued") and the 64-byte chunks output in various orders. For example, output scheduler block 210 can schedule the popping of the queues to control flow to output ports on a flow ID basis.

Figure 32:
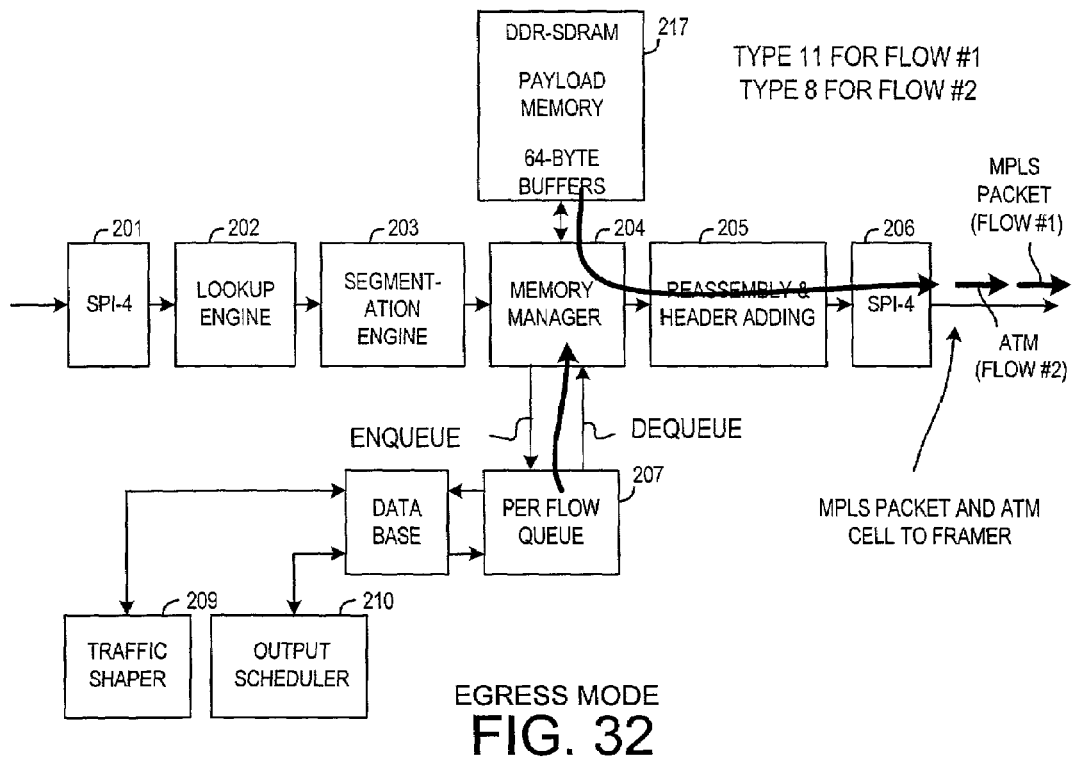
FIG. 32 is a diagram that illustrates the general flow of information out of egress MS-SAR 200 in the example of FIG. 9.

FIG. 32 illustrates the general flow of information out of egress MS-SAR 200 in one scenario when the linked lists for flow #1 and flow #2 are dequeued. As each BID is dequeued from a per flow queue, the associated 64-byte chunk is read from payload memory 217 and is supplied via 128-bit wide data bus 324 to reassembly block 205. As explained above in connection with the ingress mode, reassembly block 205 maintains one reassembly queue for each of the 64 logical output ports. If two flows share the same logical output port, then the entire linked list for one flow must be dequeued before the linked list for the next flow having the same logical output port is dequeued. In the example of FIG. 8, flow #1 and flow #2 have different logical output ports. The dequeue command as received by memory manager block 204 from per flow queue block 207 contains the port ID (PID) of the one of the 64 logical output ports of line card 103.

In the present example, the three-chunk linked list for flow #1 is dequeued first, one chunk at a time. Each 64-byte chunk is read into the DATA_SRAM of reassembly block 205 and a pointer to that chunk is stored in the Q_FIFO in the queue for the logical output port of flow #1. The first chunk contains the MPLS packet header. In an MPLS manipulation operation, reassembly block 205 can add (i.e., "push") MPLS labels to, or remove (i.e., "pop") MPLS labels from, the MPLS header found in the first chunk.

Consider the situation in FIG. 9 where a first MPLS label for communication across the network coupled to router 100 via fiber optic cable 115 is to be replaced with a second MPLS label for communication across the network coupled to router 100 via fiber optic cable 118. Reassembly block 205 determines the type of MPLS manipulation to perform using the FID to lookup MPLS information that CPU 106 stored previously in the external "header table" 327 (see FIG. 10) of the egress MS-SAR 200. For each FID, header table 327 contains MPLS manipulation information.

Figure 33:
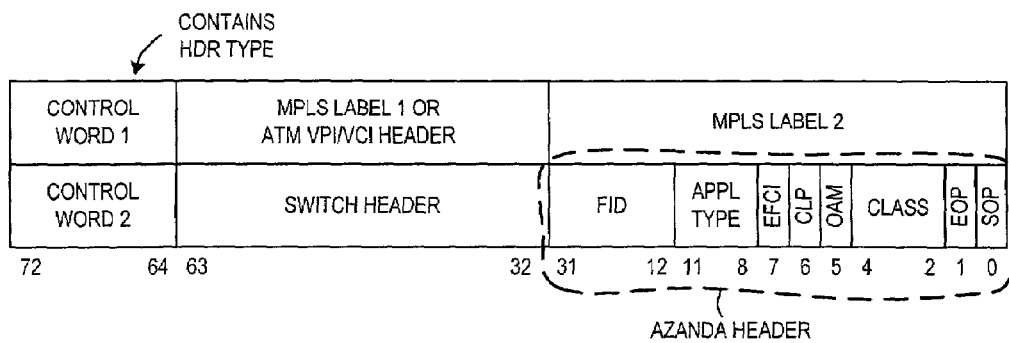
FIG. 33 is a diagram that illustrates the format of one FID entry in the header table of the MS-SAR.

FIG. 33 is a more detailed diagram of an entry for a FID in "header table" 327 of FIG. 10. The entry for each FID includes two 72-bit words. The first word contains an eight-bit control word CONTROL_WORD_1, a first 32-bit field that can contain either a first MPLS label or an ATM VPI/VCI header, and a second 32-bit field that can contain a second MPLS label. The second word contains a second eight-bit control word CONTROL_WORD_2, a first 32-bit field that can contain a switch header, and a second 32-bit field that holds the 32-bit Azanda header. The first two bits of CONTROL_WORD_1 indicate the header type: "00" indicates MPLS type, "10" indicates ATM type, and "01" indicates L2 Ethernet type. The next three bits of CONTROL_WORD_1 indicate the type of MPLS manipulation to perform: "000" indicates replace MPLS label and decrement the 8-bit MPLS time to live (TTL) field, "001" indicates push one MPLS label and decrement the original MPLS TTL, "010" indicates push two MPLS labels and decrement the original MPLS TTL, "011" indicates pop one MPLS label and decrement the original MPLS TTL, and "100" indicates pop two MPLS labels and decrement the original MPLS TTL. The next two bits of CONTROL_WORD_1 indicate the number of valid header words for that FID in the header table 327. The last bit of CONTROL_WORD_1 indicates that L2 stripping and CRC checking is enabled. The first five bits of CONTROL_WORD_2 indicate the number of L2 header bytes to remove if type is L2 Ethernet.

In the example of FIG. 9, the entry in header table 327 for flow #1 indicates that the header type is MPLS and that information in the MPLS field (see FIG. 33) determines the action. In the present example, the MPLS label is to be replaced. Reassembly block 205 therefore replaces the MPLS label in the first 64-byte chunk for flow #1 with the MPLS label found in an MPLS label field of the first word of the entry for flow #1 in header table 327. Reassembly block 205 also decrements the original TTL number.

As described above in connection with FIGS. 24–26, reassembly engine 205 cycles through the entries in its port calendar (see FIG. 24). The port calendar is provisioned beforehand by CPU 106 so that there is one entry for the port of flow #1 and another entry for the port of flow #2. If when reassembly block 205 services one of the rows of the port calendar the full and empty registers indicate that outgoing SPI-4 interface block 206 is ready for data for that output port, then the queue for that output port is popped such that one 64-byte chunk stored in DATA_SRAM is combined with a header from HDR_SRAM if appropriate and the result is pushed onto the OUTPUT_DATA_FIFO within reassembly block 205.

As the various 64-byte chunks of the packet are received from memory manager block 204, reassembly block 205 uses a CRC engine to calculate a CRC value on the data. The CRC value calculated on only part of the data is called a "partial CRC". The partial CRC value is changed as each additional piece of data passes through the reassembly block 205. When the last of the data (as indicated by the EOP bit) passes through the CRC engine, the CRC value is a "complete CRC". The complete 32-bit CRC is compared with the 32-bit CRC value found in the AAL5 trailer of the last 64-byte chunk of the packet. If the two CRC values match, then the data was not corrupted.

The AAL5 trailer also contains a sixteen-bit "length of payload" field that indicates the length of the payload of the packet being reassembled. Reassembly block 205 maintains a partial packet byte count value for the packet. As each 64-byte chunk of the packet is received from memory manager block 204, reassembly block 205 adds the number of bytes received to the partial packet byte count value. After the last 64-byte chunk for the packet has been received and the partial packet byte count value has been added to, reassembly block 205 compares the now complete packet byte count value with the "length of payload" value from the AAL5 trailer. The two should match.

After checking the CRC and the byte count, reassembly block 205 removes the trailer and any padding from the last 64-byte chunk, and pushes the last chunk onto the OUTPUT_DATA_FIFO.

Outgoing SPI-4 interface block 206 receives the pieces of the packet, piece by piece (each piece being 64-bytes), from OUTPUT_DATA_FIFO and supplies those pieces of the packet of flow #1 to framer 123. As framer 123 is ready to receive another piece of the packet being sent out on a particular output port, outgoing SPI-4 interface block 206 sends it one via 16-bit wide SPI-4 bus 141. Outgoing SPI-4 interface block 206 supplies bursts and start and end delimiters in accordance with SPI-4 protocol to demarcate the packet. Framer 142 receives the packet from SPI-4 bus 141 and uses the start delimiters and the end delimiters to frame the packet. The packet passes through transmit serdes 143 and optics module 144 and onto fiber optic cable 118. In this way, 64-byte chunks of the packet of flow #1 go through reassembly block 205 one by one, the header of the first chunk being modified in accordance with egress application type 11, the trailer on the last chunk being checked and then removed. Accordingly, the term "reassembly" here does not necessarily require that the entire packet exist in reassembled form in the reassembly block or even on the MS-SAR. Rather the reassembly block outputs the various chunks of the packet sequentially such that the packet is transmitted in assembled form on the fiber optic cable.

Figure 34:
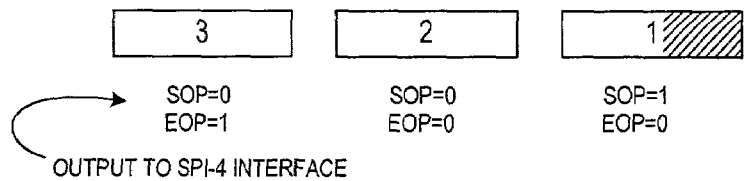
FIG. 34 illustrates three 64-byte chunks of flow #1 as the chunks pass from reassembly block 205 to outgoing SPI-4 interface block 206 in the example of FIG. 9.

FIG. 34 illustrates the three 64-byte chunks of flow #1 as passed through reassembly block 205 to outgoing SPI-4 interface block 206. The chunks are illustrated as 64-byte chunks rather than 64-bit pieces for ease of illustration.

Figure 35:
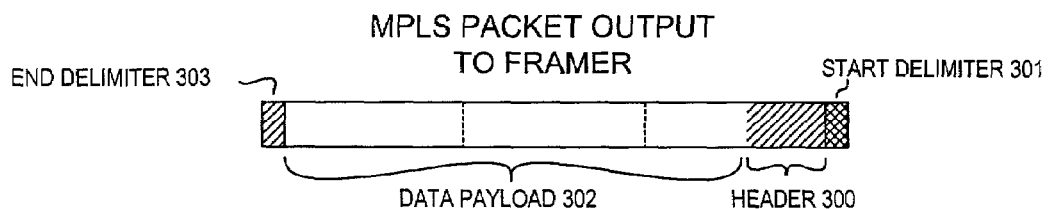
FIG. 35 illustrates the MPLS packet of flow #1 as output from framer 142 in the example of FIG. 9.

FIG. 35 illustrates the MPLS packet of flow #1 as output from SPI-4 interface block 206 to framer 142.

The 64-byte chunk for the ATM cell of flow #2 in this example is dequeued from payload memory 217 in similar fashion. Per flow queue block 207 issues a dequeue command to memory manager block 204 that indicates the BID of the chunk, and the logical output port from which the flow is to be transmitted. Reassembly block 205 uses the FID of flow #2 to access the FID entry in "header table" 327 (see FIG. 9). The header type bits of CONTROL_WORD_1 of the FID entry for flow #2 indicates that the header type is ATM. Reassembly block 205 therefore replaces (i.e., "translates") the VPI/VCI field in the ATM header of the chunk in HDR_SRAM with the VPI/VCI information stored in the FID entry for flow #2. Reassembly block 205 may also be programmed by information in header table 327 to change the CLP (Cell Loss Priority bit in the ATM header that indicates a high or low priority for the ATM cell).

Figure 36:
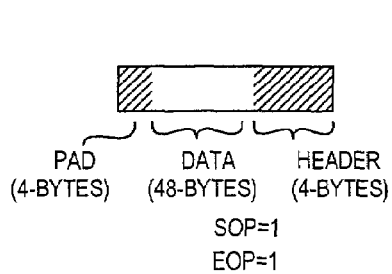
FIG. 36 illustrates the ATM cell of flow #2 as output from reassembly block 205 in the example of FIG. 9.

Reassembly block 205 receives the 64-byte chunk, stores it into DATA_SRAM, and pushes a pointer to the 64-bytes onto a queue for the logical output port for flow #2. Reassembly block 205 services the ports in its port calendar as explained above, combines the data portion in the DATA_SRAM with the translated ATM header portion in HDR_SRAM, and loads the completed ATM cell of flow #2 into the OUTPUT_DATA_FIFO in reassembly block 205. The last eight bytes of the 64 bytes in DATA_SRAM are a pad. Reassembly block 205 removes this 8-byte pad by not reading it into the OUTPUT_DATA_FIFO. Outgoing SPI-4 interface block 205 pops the OUTPUT_DATA_FIFO such that reassembly block 205 supplies the resulting 56-byte chunk to outgoing SPI-4 interface block 205. FIG. 36 illustrates the 56-byte chunk (ATM cell plus four bytes of pad) as output from reassembly block 205.

Figure 37:
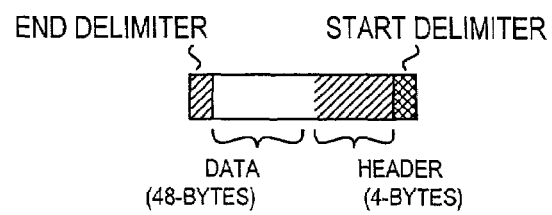
FIG. 37 illustrates the ATM cell of flow #2 as output form outgoing SPI-4 interface block 206 of egress MS-SAR 200 in the example of FIG. 9.

Outgoing SPI-4 interface block 206 removes the last four bytes of pad when sending the ATM cell out. It does this using byte enables. Outgoing SPI-4 interface block 206 outputs start and end delimiters to demarcate the 52-byte ATM cell in accordance with the SPI-4 bus protocol. The entire 52-byte cell is output in one burst. FIG. 37 illustrates the ATM cell of flow #2 as output from outgoing SPI-4 interface block 206 of egress MS-SAR 200 via 16-bit wide SPI-4 bus 141. Framer 142 receives the ATM cell from SPI-4 bus 141 and uses the start and end delimiters to frame the ATM cell. Framer 142 then supplies the ATM cell to transmit serdes 143. Serdes 143 in turn supplies the ATM cell in analog serial fashion to optics module 144. Optics module 144 outputs the ATM cell onto fiber optic cable 118. In the example of FIG. 9, there is only one physical output port (i.e., the fiber optic cable 118). Framer 142 therefore maps the logical output ports for flow#1 and flow #2 on SPI-4 bus 141 to the same serdes 143 for transmission on the same wavelength channel on the same fiber optic cable 118.

Figure 38:
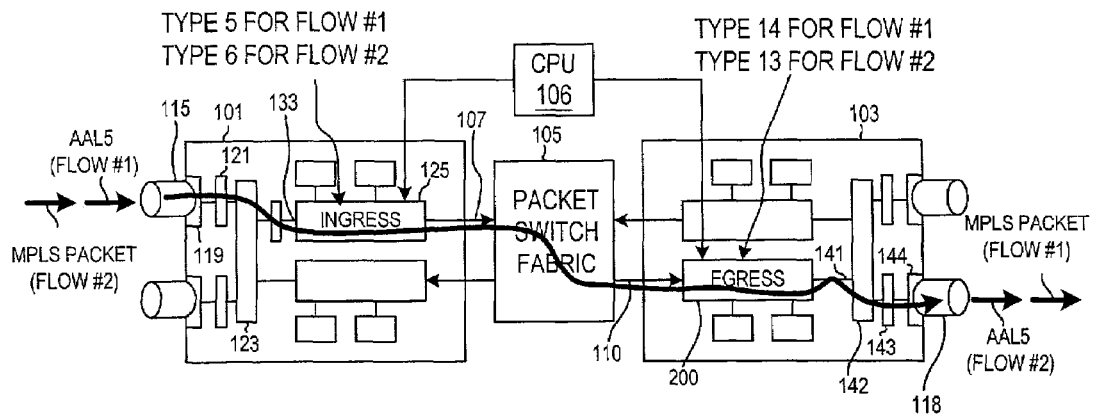
FIG. 38 illustrates an example of application types 5, 6, 14 and 13.

Example of Application Types 5, 6, 14 and 13:

FIG. 38 illustrates an example of how two flows of different types (flow #1 is a flow of three AAL5 cells, flow #2 is an MPLS packet) are received onto a first line card (in this example, line card 101), simultaneously pass through ingress MS-SAR 125 on the first line card, pass through switch fabric 105 (in this example switch fabric 105 is a packet-based switch fabric), pass onto a second line card (in this example, line card 103), simultaneously pass through egress MS-SAR 200 on the second line card 103, and are output by second line card 103. Flow #1 exits line card 103 as an MPLS packet, whereas flow #2 exists line card 103 as four AAL5 cells. In this example, flow #1 and flow #2 are both communicated to first line card 101 on the same wavelength channel transmitted on the same fiber optic cable 115. Similarly, flow #1 and flow #2 are both communicated from second line card 103 on the same wavelength channel and on the same fiber optic cable 118.

In FIG. 38, flow #1 is a flow of AAL5 cells flow passing into an ingress line card, where the ingress line card supplies a packet to a packet-based switch fabric. As indicated by the middle left example of FIG. 8, this type of flow is identified as ingress application type 5. The various blocks within ingress MS-SAR 125 therefore perform processing on flow #1 in accordance with ingress application type 5. In FIG. 38, flow #2 involves an MPLS packet flow passing into an ingress line card, where the ingress line card supplies a packet to a packet-based switch fabric. As indicated by the bottom left example of FIG. 8, this type of flow is identified as ingress application type 6. The various blocks within ingress MS-SAR 125 therefore perform processing on flow #2 in accordance with ingress application type 6.

Figure 39:
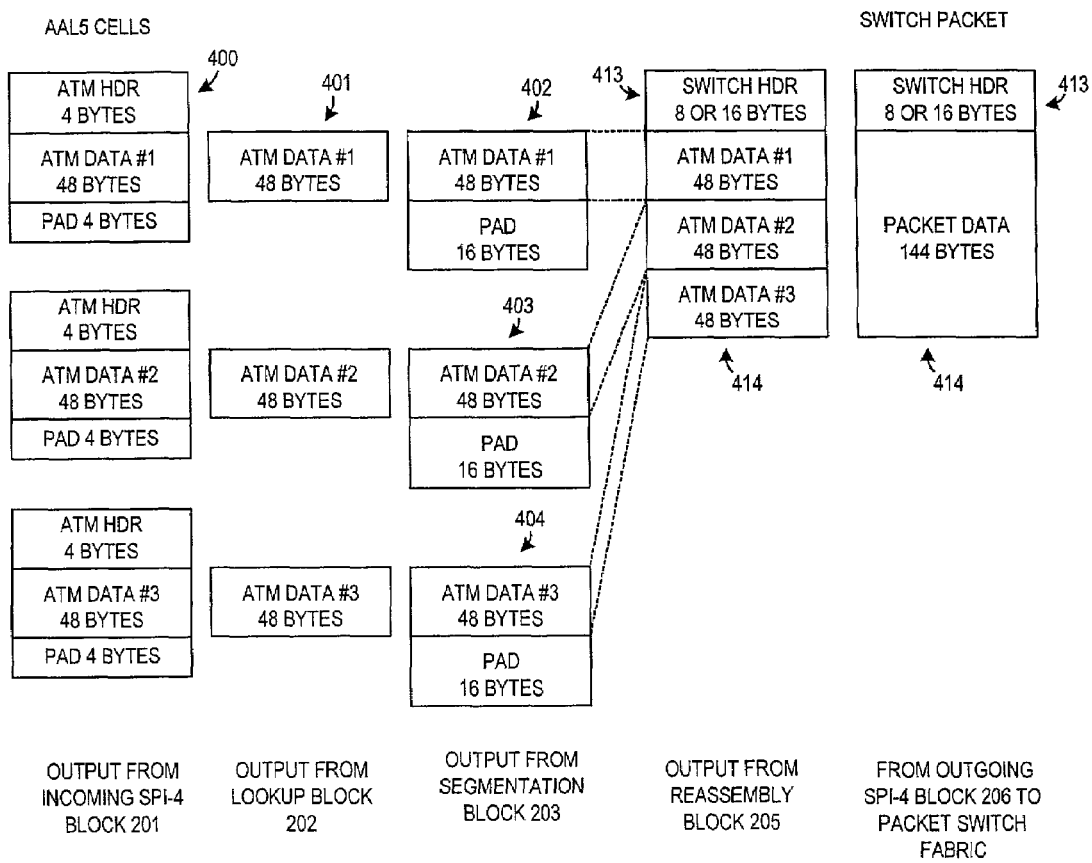
FIG. 39 illustrates the processing of flow #1 in accordance with ingress application type 5 in the example of FIG. 38.

Ingress application type 5 processing on flow #1 is explained in connection with FIGS. 38, 5, 39 and 10. The first AAL5 cell of flow #1 is received via fiber optic cable 115 (see FIG. 5) and passes through optics module 119, serdes 121, framer 123 and classification engine 124. The 52-byte AAL5 cell is received onto ingress MS-SAR 125 in 16-bit pieces via SPI-4 bus 135 via terminals 198 (see FIG. 10). The AAL5 cell includes a 4-byte ATM header and a 48-byte payload. Incoming SPI-4 interface block 201 appends a 4-byte pad to the end of the 52-byte AAL5 cell before forwarding the resulting 56-byte chunk 400 (see FIG. 39) to lookup block 202. FIG. 39 illustrates the 56-byte chunk 400 as it is output from incoming SPI-4 interface block 201.

As explained above in connection with the example of FIG. 9, lookup block 202 uses the input port type supplied via bus 317 to lookup the associated traffic type in the "port table" of lookup block 202. In this case, the traffic type is "ATM cells". From the traffic type, lookup block 202 locates the VPI and VCI fields in the ATM cell header. Lookup block 202 uses the VPI and VCI information to lookup in the "FID table" (in external memories 215 and 216) the FID and the ingress application type. Lookup block 202 forwards the FID and ingress application type to the other blocks of the MS-SAR. Lookup block 202 removes the 4-byte ATM header and the 4-byte pad, and forwards the remaining 48-byte chunk 401 of data to segmentation block 203 via bus 318. FIG. 39 illustrates the 48-byte chunk 401 as it is output from lookup block 202.

Segmentation block 203 adds a 16-byte pad to the 48-byte chunk to form a 64-byte chunk 402. Memory manager block 204 reads the 64-byte chunk 402 from segmentation block 203 and stores 64-byte chunk 402 into a buffer in payload memory 217 using the enqueue command mechanism set forth above in connection with the example of FIG. 9. The per flow queue for flow #1 at this point involves just one buffer. The other two AAL5 cells of flow #1 are processed in similar fashion such that corresponding 48-byte chunks 403 and 404 are queued in the per flow queue for flow #1.

Ingress application type 6 processing on flow #2 is explained in connection with FIGS. 38, 5, 40 and 10. The MPLS packet flow #2 is received via fiber optic cable 115 and passes through optics module 119, serdes 121, framer 123 and classification engine 124. The MPLS packet is received onto ingress MS-SAR 125 in 16-bit pieces via SPI-4 bus 135 via terminals 198 (see FIG. 10). The MPLS packet includes a four-byte MPLS header and a data payload. To illustrate operation of the ingress MS-SAR, the MPLS packet data payload in this example is 150 bytes.

Figure 40:
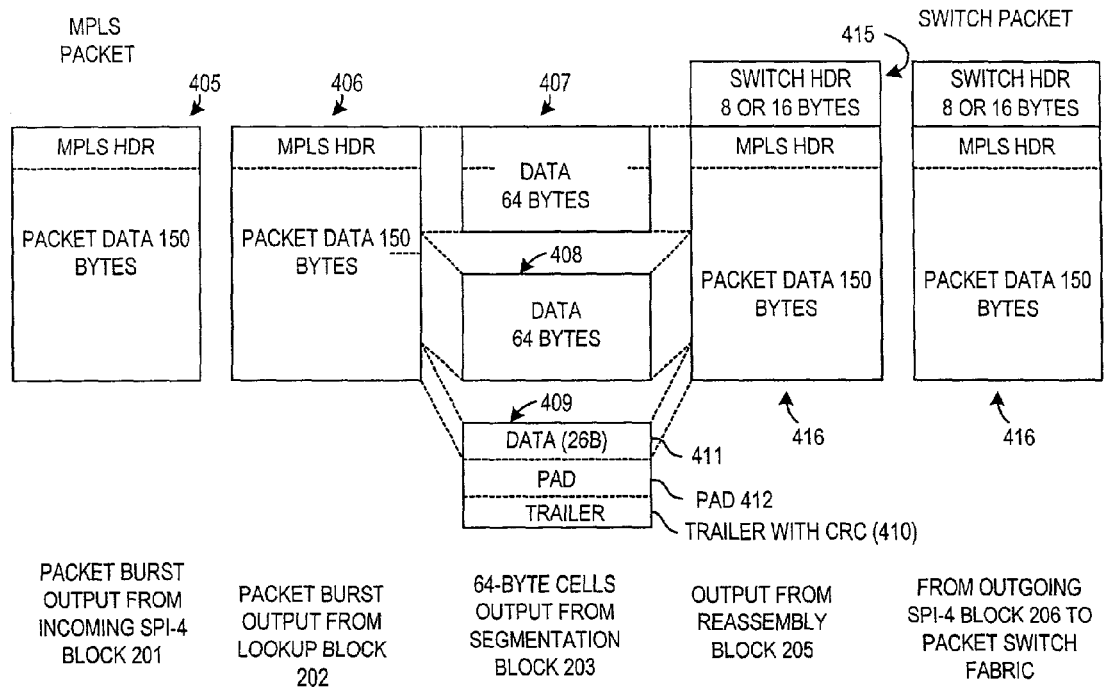
FIG. 40 illustrates the processing of flow #2 in accordance with ingress application type 6 in the example of FIG. 38.

Incoming SPI-4 interface block 201 (see FIG. 10) forwards the 154-byte packet 405 as 64-bit pieces to lookup block 202. FIG. 40 illustrates the 154-byte packet 405 as it is output from incoming SPI-4 interface block 201. As explained above in connection with the example of FIG. 9, lookup block 202 uses the input port type supplied via bus 317 to lookup the associated traffic type in the lookup block's "sport table". In this case, the traffic type is "MPLS packet". From the traffic type, lookup block 202 locates the 20-bit MPLS label within the MPLS header. Lookup block 202 uses the MPLS label to determine the FID and the ingress application type. Lookup block 202 forwards the FID and ingress application type to the other blocks of the MS-SAR. The packet 406 is forwarded in 64-bit pieces to segmentation block 203 via bus 318. Although all the 64-bit pieces of a packet for a given input port are supplied to segmentation block 203 before any other 64-bit pieces are received for that input port, 64-bit pieces for other input ports may be communicated from lookup block 202 in an interleaved fashion with the 64-bit pieces of packet 406. FIG. 40 illustrates the packet 406 as it is output from lookup block 202.

Segmentation block 203 "segments" the incoming packet 406 into 64-byte AAL5 like chunks. In the present example, there are three such chunks 407–409. The first chunk 407 contains the 4-byte MPLS header. Segmentation block 203 adds an AAL5 trailer 410 to the end of the last chunk 409. Any gap between the end of the 26-byte data payload 411 of the last chunk 409 and the trailer 410 is filled with a pad 412. The term "segmentation" here does not mean that segmentation block 203 in this embodiment necessarily breaks the incoming packet into 64-byte chunks. That has already been done in this embodiment by SPI-4 interface block 201. Rather, the term "segmentation" means that the packet leaves segmentation block 203 properly segmented into chunks in accordance with a segmentation scheme. In this example, segmentation block 203 calculates a cyclic redundancy check (CRC) value on the chunks of the packet and includes that CRC into trailer 410 of the last chunk 409.

Chunks of the packet are output from incoming SPI-4 interface block 201 in 64-byte chunks. Between the various chunks of a packet, other chunks from other flows may pass through the lookup block 202 and to the segmentation block 203. Segmentation block 203 therefore queues the 64-byte chunks 407–409 into a FIFO on a per port basis. The per port FIFO is located within segmentation block 203. As segmentation block 203 receives each chunk from an input port, segmentation block 203 reads a partial CRC for the port from a CRC table (not shown) within segmentation block 203. The partial CRC is modified as a function of the current chunk received, and the new partial CRC is written back into the CRC table entry for the appropriate port. When the EOP of a chunk indicates the chunk is the last chunk of a packet, then the final CRC is calculated and this CRC is inserted into the trailer.

Memory manager block 204 reads the 64-byte chunks from the per port FIFO in segmentation block 203 and stores the 64-byte chunks into buffers in payload memory 217 using the enqueue command mechanism set forth above in connection with the example of FIG. 9. The per flow queue for flow #2 in this case involves three buffers.

Once the 64-byte chunks for flow #1 and flow #2 are stored in payload memory 217, their per flow queues can be dequeued so as to carry out traffic shaping and/or output scheduling functions. In the event that the per flow queue for flow #1 is dequeued, 64-byte chunk 402 (see FIG. 39) is output from memory manager block 204 via 128-bit bus 324 (see FIG. 10). Reassembly block 205 uses the FID of chunk 402 to lookup a switch header 413 in the "header table" 327. In this case, CPU 106 has placed a switch header 413 appropriate for packet-based switch fabric 105 into the location for flow #1 in "header table" 327. Reassembly block 205 removes the 16-byte pad from the first chunk 402, adds the switch packet header 413 to the front to the chunk, and supplies the combination to outgoing SPI-4 interface block 206 using the port calendar mechanism explained above in connection with the example of FIG. 9. This outputting to outgoing SPI-4 interface block 206 can occur before all the other 64-byte chunks of the per flow queue are dequeued. In one embodiment of reassembly block 205, either the second 64-byte chunk of a per flow queue or an EOP chunk must be received before the first chunk can be output. The 64-byte chunks 403 and 404 are dequeued and processed by reassembly block 205 in similar fashion, except that no header is added to these chunks. The combination of the switch header 413 and the data portions of the three chunks 402–404 is a switch packet 414.

FIG. 39 shows this switch packet 414 as it is output from reassembly block 205 via 64-bit bus 325. The data portions of the three 64-byte chunks 402–404 together form the data payload of switch packet 414. FIG. 39 also illustrates switch packet 414 as it is output from outgoing SPI-4 interface block 206.

The 64-byte chunks 407–409 (see FIG. 40) of flow #2 are dequeued in similar fashion, the three chunks being processed through the per port queue in reassembly block 205 for the output port of this flow. Reassembly block 205 uses the FID of the first chunk to lookup a switch header 415 in "header table" 327. Reassembly block 205 adds switch header 415 to the front to the first 64-byte chunk. Reassembly block 205 calculates a CRC from the data payload of the three chunks 407–409 and checks to make sure that it matches the CRC found in the trailer 410 of the last chunk 409. After checking the CRC, reassembly block 205 removes the pad 412 and trailer 410.

First chunk 407 is processed and supplied to the outgoing SPI-4 interface block 206 along with switch header 415 before the remaining chunks 408 and 409 of the packet are dequeued. Reassembly block 205 does not store the entire packet in reassembled form on the MS-SAR, but rather processes and outputs the individual 64-byte chunks of the packet one at a time. In this embodiment, the OUTPUT_DATA_FIFO into which reassembly block 205 pushes processed chunks is only 256 bytes in size, a size inadequate to store the entire 160-byte switch packet.

Chunks of flow #2 are output from reassembly block 205 using the port calendar mechanism explained above in connection with the example of FIG. 9. The combination of the data portions of the three chunks 407–409 and the added switch header 415 together form switch packet 416. FIG. 40 shows switch packet 416 as it is output from reassembly block 205 via 64-bit bus 325. Switch packet 416 is output from outgoing SPI-4 interface block 206 to the packet switch fabric 105 in 16-bit pieces via terminals 326.

Switch packets 414 and 416 for flow #1 and for flow #2 are switched by the packet switch fabric 105 of router 100 such that they are supplied to line card 103. As described above in connection with the example of FIG. 9, router 100 uses a "virtual output port" number in the switch header to identify the particular destination line card to which the packets should be routed.

Figure 41:
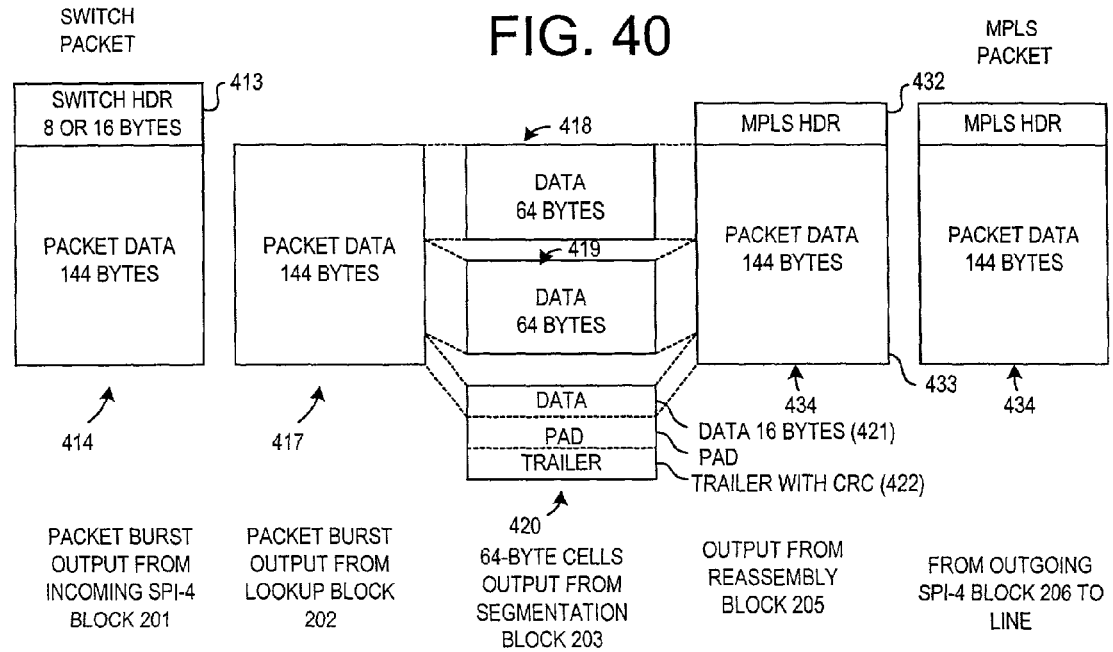
FIG. 41 illustrates the processing of flow #1 in accordance with egress application type 14 in the example of FIG. 38.

Processing by egress MS-SAR 200 on flow #1 is explained in connection with FIGS. 41, 5 and 10. Switch packet 414 from packet-based switch fabric 105 is received in 16-bit pieces onto SPI-4 bus 100 via terminals 198. Switch packet 414 includes 8 or 16 bytes of switch header in addition to the packet itself. FIG. 41 illustrates switch packet 414 as it is output from incoming SPI-4 interface block 201. Switch packet 414 is passed to lookup block 202 along with a PID indicating the logical input port.

In the example of FIG. 38, flow #1 through egress MS-SAR 200 is a flow from a packet-based switch fabric that is output as an MPLS packet. As indicated by the flow to the bottom right of FIG. 8, this is egress application type 14. The Azanda header (see FIG. 33) is the last four bytes of the switch header. This Azanda header contains both the FID as well as the egress application type to be performed on flow #1 by egress MS-SAR 200. Again, as explained above in connection with FIG. 8, only one traffic type is permitted on any one logical input port. Lookup block 202 uses the logical input port number supplied to it via 64-bit bus 317 (see FIG. 10) to locate the Azanda header in the information coming from the switch fabric. Lookup block 202 extracts the FID (FID1) and egress application type (egress application type 14). Lookup block 202 removes the switch header 413 and supplies the data payload of the packet via 64-bit bus 318 to segmentation block 203 along with the extracted FID and egress application type.

FIG. 41 illustrates the data payload 417 as it is output from lookup block 202. Payload 417, however, is passed to segmentation block 203 in 64-byte chunks. In the example of FIG. 38, the 144-byte payload of flow #1 contains enough information for there to be three such chunks. The first chunk 418 contains 64 bytes, the second chunk 419 contains 64 bytes, and the third chunk 420 contains sixteen bytes of data 421. Segmentation block 203 calculates a CRC on the data of the three chunks and adds a trailer 422 so that the trailer is located at the end of the third 64-byte chunk 420. Segmentation block 203 adds any necessary pad between the end of the data 421 of the last chunk and the trailer 422 of the last chunk. The three chunks 418–420 of FIG. 41 are queued on a per port basis into an SRAM in segmentation block 203 as explained above in connection with FIG. 40 and pointers to the chunks are pushed onto a FIFO in segmentation block 203. Memory manager block 204 pops the FIFO, reads the chunks, and stores the chunks into payload memory 217. FIG. 41 illustrates the three 64-byte chunks 418–420 supplied by segmentation block 203 to memory manager block 204. The enqueue command mechanism as outlined above is used such that a per flow queue of BIDs is formed for the chunks of flow #1.

Processing by egress MS-SAR 200 on flow #2 is explained in connection with FIGS. 42, 5 and 10. The switch packet 416 from packet-based switch fabric 105 is received in 16-bit pieces onto SPI-4 bus 100 via terminals 198. Switch packet 416 includes 8 or 16 bytes of switch header 415, 4 bytes of MPLS header, and 150 bytes of MPLS data payload.

Figure 42:
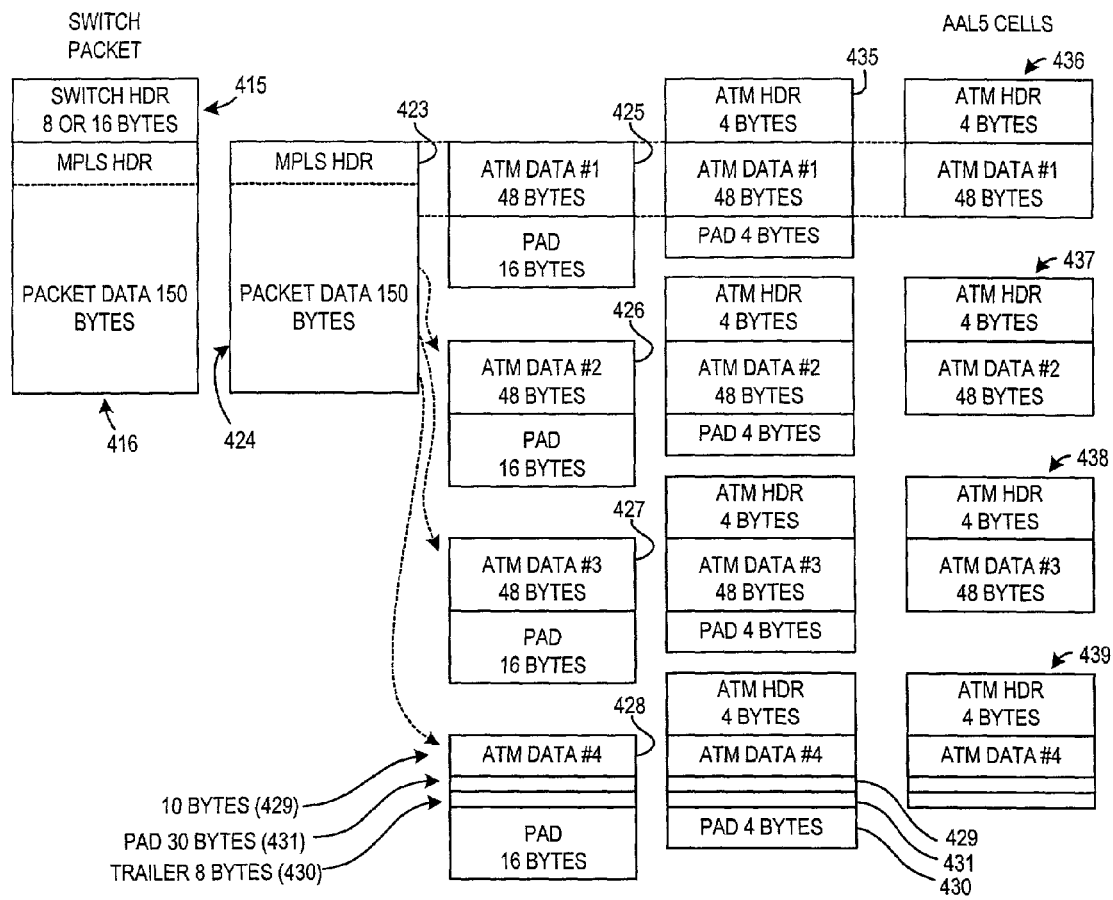
FIG. 42 illustrates the processing of flow #2 in accordance with egress application type 13 in the example of FIG. 38.

FIG. 42 illustrates switch packet 416 as it is output from incoming SPI-4 interface block 201. Switch packet 416 is passed to lookup block 202 along with the logical input port. The lookup block 202 uses the logical input port supplied to it via 64-bit bus 317 to locate the Azanda header in the information coming from the switch fabric. The lookup block extracts the FID and egress application type (egress application type 13). In the case of flow #2, information from a packet-based switch fabric is output from egress MS-SAR 200 as AAL5 cells. This corresponds to egress application type 13 as indicated in the middle right portion of FIG. 8. Lookup block 202 removes switch header 415 and supplies the remainder of the packet (MPLS header and MPLS payload) to segmentation block 203 along with the extracted FID and egress application type. FIG. 41 illustrates the MPLS header 423 and MPLS data payload 424 as supplied by lookup block 202 to segmentation block 203 via 64-bit bus 318.

In egress application type 13, segmentation block 203 "segments" the MPLS header 423 and MPLS data payload 424 into four 48-byte chunks 425–428, because each of these four chunks will be the data payload of an AAL5 cell to be output from egress MS-SAR 200. In this example, the fourth 64-byte chunk contains only ten bytes of data 429. Segmentation block 203 adds a trailer 430 so that the trailer 430 is located at the end of the first 48-bytes of the fourth 64-byte chunk. Any necessary pad 431 is added between the end of data 429 and the start of trailer 430. Segmentation block 203 adds a 16-byte pad to the end of each 48-byte chunk to pad each chunk up to the 64-byte size stored in payload memory-217. FIG. 42 illustrates the four 64-byte chunks as output from segmentation block 203. The mechanism for supplying the four chunks to memory block 204 involves a queue as explained above. Memory manager block 204 pops the queue, receives the 64-byte chunks from segmentation block 203, and stores the 64-byte chunks into 64-byte buffers using the enqueue command mechanism described above. A per flow queue for flow #2 is created.

The pointers in the per flow queues for flow #1 and flow #2 are then popped off in a desired order using the dequeue command. Here in this example of FIG. 38, we will consider the per flow queue of flow #1 being dequeued first. The three 64-byte chunks for flow #1 are received from payload memory 217 by reassembly block 205 and are pushed onto a queue in reassembly block 205 for the intended output port. The pad and trailer of the third 64-byte chunk 420 (see FIG. 41) are removed. Reassembly block 205 also computes a CRC on the combined data of the three chunks and verifies that the CRC in trailer 422 matches the newly computed CRC. For the first 64-byte chunk 418, reassembly block 205 uses the FID to lookup an MPLS header 432 in header table 327 (see FIG. 10). The MPLS header 432 was placed in header table 327 by CPU 106 before the lookup operation. Reassembly block 205 performs an MPLS manipulation operation if controlled to do so by control information in the header table.

FIG. 41 illustrates a simplified view of MPLS header 432 and the aggregated 144 bytes of data 433 as it is output from reassembly block 205. MPLS header 432 and data 433 together form an MPLS packet 434. Although shown here reassembled as a 144-byte block, the various 64-byte chunks of packet 434 are output from reassembly block 205 one by one, the first 64-byte chunk having the MPLS header appended to it. The chunks are output from reassembly block 205 using the port calendar and queue mechanism set forth above. Outgoing SPI-4 interface block 206 pops the Q_FIFO of reassembly block 205, receives the chunks of the MPLS packet 434 in 64-bit pieces via 64-bit bus 325, and supplies the pieces of the MPLS packet onto terminals 326. The pieces of MPLS packet 434 pass over SPI-4 bus 141 to framer 142, through framer 142, serdes 143, and optics module 144, and onto fiber optic cable 118. It is therefore seen that ATM cell information received onto the line card 101 passes through the packet-based switch fabric and exits line card 103 as an assembled MPLS packet.

The per flow queue for flow #2 is dequeued next in this example (see FIG. 42), the 64-byte chunks 425–428 of flow #2 being supplied to the appropriate output port queue in reassembly block 205. In egress application type 13, reassembly block 205 removes the 16-bytes of pad from each 64-byte chunk to recover the 48-bytes of data. Reassembly block 205 uses the FID of a chunk to lookup a 4-byte ATM header 435, adds the ATM header 435 to the 48-byte chunk of data, and adds a 4-byte alignment pad such that each chunk is 56-bytes. The data 429, pad 431, and trailer 430 of the fourth 64-byte chunk 428 form the data portion of the last 56-byte chunk as illustrated in FIG. 42. The ATM header 435 is the same for each of the four 56-byte chunks of this flow.

Reassembly block 205 performs ATM translation by using the FID to access the FID entry in "header table" 327 (see FIG. 10). Because the header type in CONTROL_WORD_1 of the FID entry is "ATM", reassembly block 206 replaces the PTI, CLP, EFCI and OAM bits in the ATM header using the incoming EOP, CLP, EFCI and OAM bits from memory manager block 204. The last AAL5 cell (marked EOP) is marked using the PTI field in the ATM header. The packet length is checked against the maximum MTU. Reassembly block 205 checks the length and CRC in AAL5 trailer 430. FIG. 42 illustrates the AAL5 cells 436–439 as output from reassembly block 205 in 64-bit pieces onto 64-bit bus 325. Outgoing SPI-4 interface block 206 pops the queue for the correct output port, retrieves each AAL5 cell, removes the 4-byte alignment pad, and outputs the resulting 52-byte AAL5 cells onto terminals 326 in 16-bit pieces. The AAL5 cells of flow #2 pass over SPI-4 bus 141, through framer 142, through serdes 143, through optics module 144, and onto fiber optic cable 118. It is therefore seen that MPLS packet information received onto the line card 101 passes through the packet-based switch fabric and exits line card 103 in AAL5 cell form.

Figure 43:
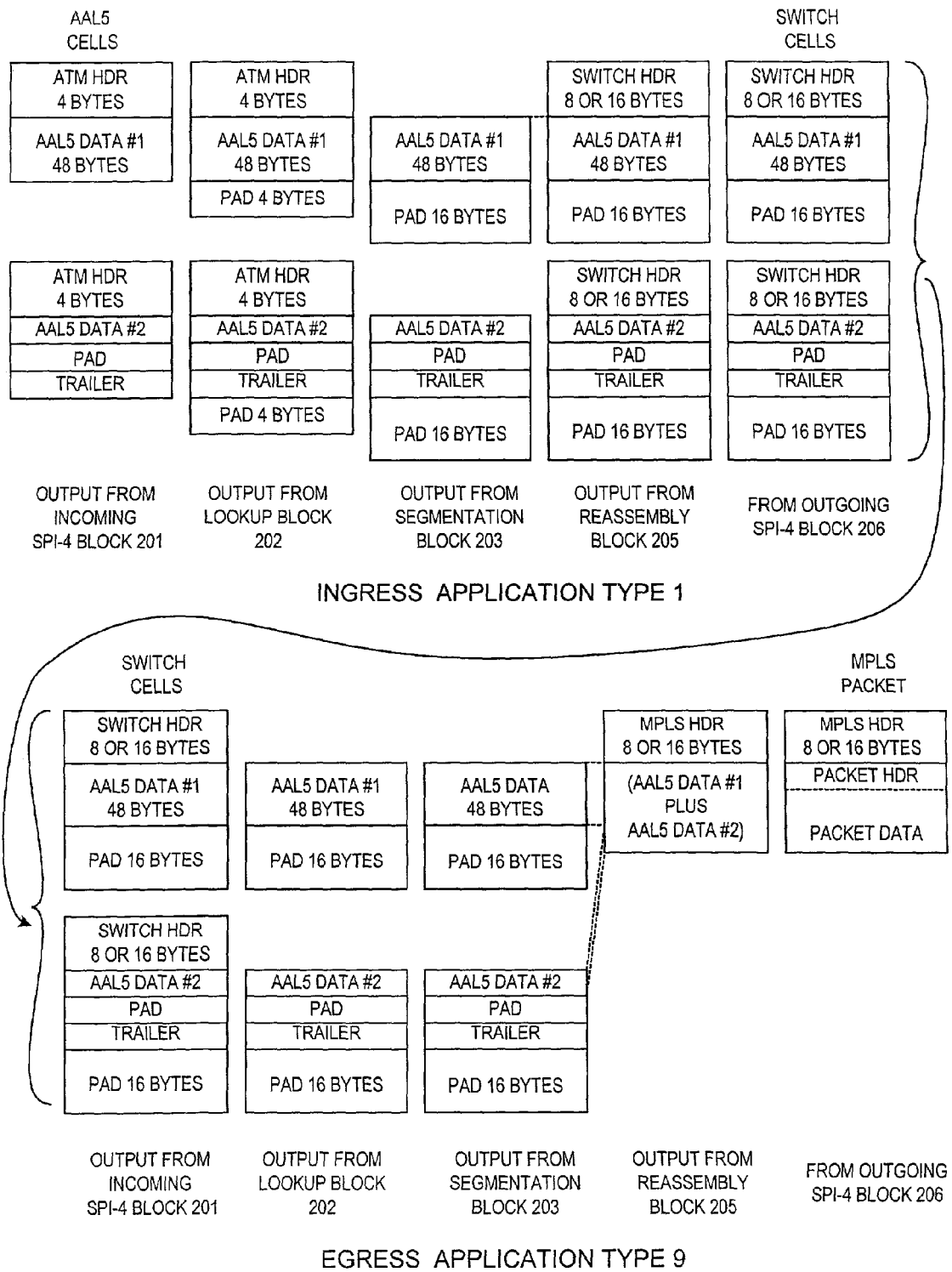
FIG. 43 illustrates an example wherein a flow is processed on an ingress MS-SAR in accordance with ingress application type 1 and is processed on an egress MS-SAR in accordance with egress application type 9.

Application Types 1 and 9:

FIG. 43 illustrates an example of ingress application type 1 and egress application type 9. The incoming data in this example is two AAL5 cells. These two 52-byte AAL5 cells are received onto ingress MS-SAR 125 via terminals 198. The two cells are output from the incoming SPI-4 interface block. The first cell contains 4 bytes of ATM header and 48 bytes of ATM data #1. The first part of the ATM data #1 in this example is a packet header (for example, an IP header). The second cell contains 4 bytes of ATM header and a small amount of data (ATM data #2). An AAL5 trailer is disposed at the end of the 52 bytes of the second cell, and a pad is disposed between the end of the AAL5 data #2 and the beginning of the trailer in accordance with the AAL5 protocol.

Incoming SPI-4 interface block 201 adds four bytes of pad to each cell prior to sending the cells to lookup block 202. The 4-byte pad is added because the data path from the incoming SPI-4 interface block to the segmentation block is 64-bits wide. Segmentation block 203 removes the 4-byte ATM header and adds an additional twelve bytes of pad for a total of sixteen bytes of pad. Memory manager block 204 passes the resulting two 64-byte chunks to payload memory 217 for storage. The two 64-byte chunks are read from payload memory and are passed to reassembly block 205. Reassembly block 205 does not in this ingress application check the CRC in the trailer of the second cell. Reassembly block 205 adds either 8 or 16 bytes of a switch header to each 64-byte chunk, and passes the resulting chunks to outgoing SPI-4 interface block 206 as illustrated. Chunks are, however, processed through reassembly block 205 one at a time. As illustrated, the packet header in the AAL5 data #1 is passed through the various blocks of the ingress MS-SAR to the outgoing SPI-4 interface block 206. The cells pass out of the ingress MS-SAR 125 as "switch cells", pass through the cell-based switch fabric, and to a line card having an egress MS-SAR. The arrow from the top portion of FIG. 43 to the bottom portion of FIG. 43 illustrates this passing through the switch fabric.

The two switch cells pass through the incoming SPI-4 interface block and to lookup block 202 of the egress MS-SAR 200 as illustrated. Lookup block 202 removes the switch headers. The resulting two chunks pass through segmentation block 203 and are passed to memory manager block 204 one at a time for storage. Segmentation block 203 in egress application type 9 does not perform segmentation. The two 64-byte chunks are read out of memory manager block 204 and pass to reassembly block 205. Reassembly block 205 maps AAL5 data #1 and AAL5 data #2 into one contiguous data portion. As each of the data portions passes into reassembly block 205, a CRC on the data is computed. The composite CRC is then compared with the CRC in the trailer of the last 64-byte chunk (in this case the second chunk) as that second chunk passes into reassembly block 205. Reassembly block 205 adds an MPLS header and if programmed to do so by control information in the header table, performs an MPLS manipulation operation on the MPLS header. The resulting packet (MPLS header and AAL5 data #1 and AAL5 data #2) is then sent out to the framer via the outgoing SPI-4 interface block 206.

Figure 44:
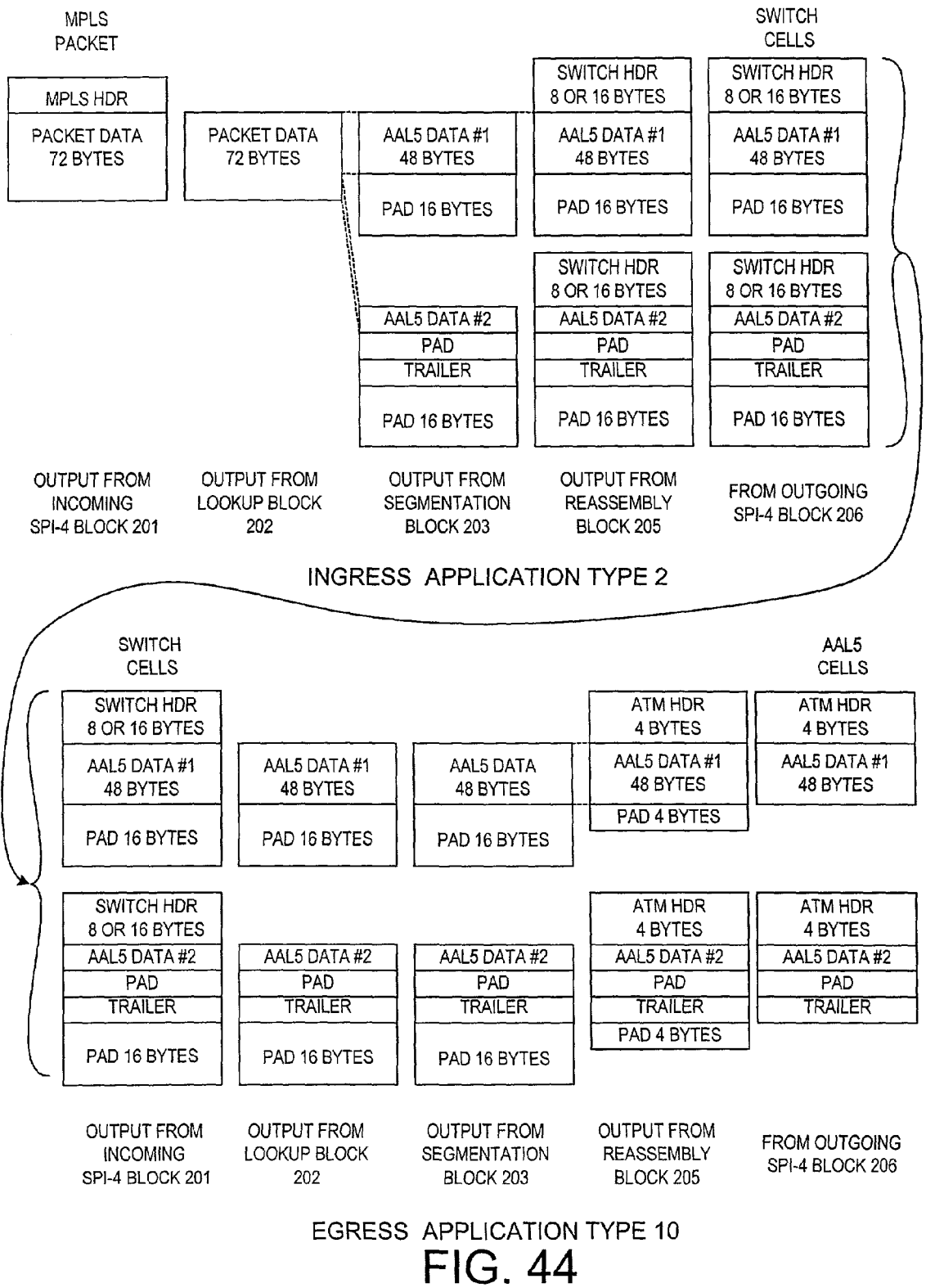
FIG. 44 illustrates an example wherein a flow is processed on an ingress MS-SAR in accordance with ingress application type 2 and is processed on an egress MS-SAR in accordance with egress application type 10.

Application Types 2 and 10:

FIG. 44 illustrates an example of ingress application type 2 and egress application type 10. In this example an incoming MPLS packet (MPLS header and 72 bytes of MPLS payload) is received onto the ingress MS-SAR 125 and passes through incoming SPI-4 interface block 201. Lookup block 202 performs a lookup and determines that the ingress application type is ingress application type 2. Segmentation block 203 outputs the packet as two 64-byte chunks such that the first 48 bytes of the first 64-byte chunk includes the MPLS header and a first part (AAL5 data #1) of the data payload. The remainder of the data of the MPLS packet (AAL5 data #2) is segmented into the second 64-byte chunk. Segmentation block 203 calculates a CRC on the 72 bytes of packet data and includes an AAL5 trailer into the second 64-byte chunk as illustrated so that the trailer is located at the end of the first 48 bytes of the second chunk. Segmentation block 203 appends 16 bytes of pad to the end of each 48-byte chunk so that each chunk is padded up to 64 bytes. The resulting two 64-byte chunks pass out of segmentation block 203 one at a time and are stored in memory manager block 204. The 64-bytes chunks are read out of payload memory and pass to reassembly block 205 one at a time. Reassembly block 205 performs a switch header lookup and adds a switch header to each 64-byte chunk. Reassembly block 205 does not perform any checking of the CRC in the trailer. The resulting switch cells are output via outgoing SPI-4 interface block 206 as illustrated.

The switch cells pass through a switch-based fabric and to an egress line card that includes the egress MS-SAR 200. The switch cells pass through the incoming SPI-4 interface block 201 of the egress MS-SAR 200. Lookup block 202 locates the Azanda header at the end of the switch header and determines the egress application type (egress application type 10) to be performed. Lookup block 202 removes the switch headers and passes the remaining two 64-byte chunks to the memory manager block 204 for storage into payload memory. The 64-byte chunks are read out of payload memory and are passed one at a time to reassembly block 205. Reassembly block 205 performs a header lookup and adds an ATM header to each 64-byte chunk. Reassembly block 205 removes 12 bytes of pad from the end of each chunk as illustrated in FIG. 44. The resulting chunks are passed to outgoing SPI-4 interface block 206. Outgoing SPI-4 interface block 206 last the remaining 4-bytes of pad from the end of each chunk and outputs the chunks as ATM cells to the framer of the egress line card.

Figure 45:
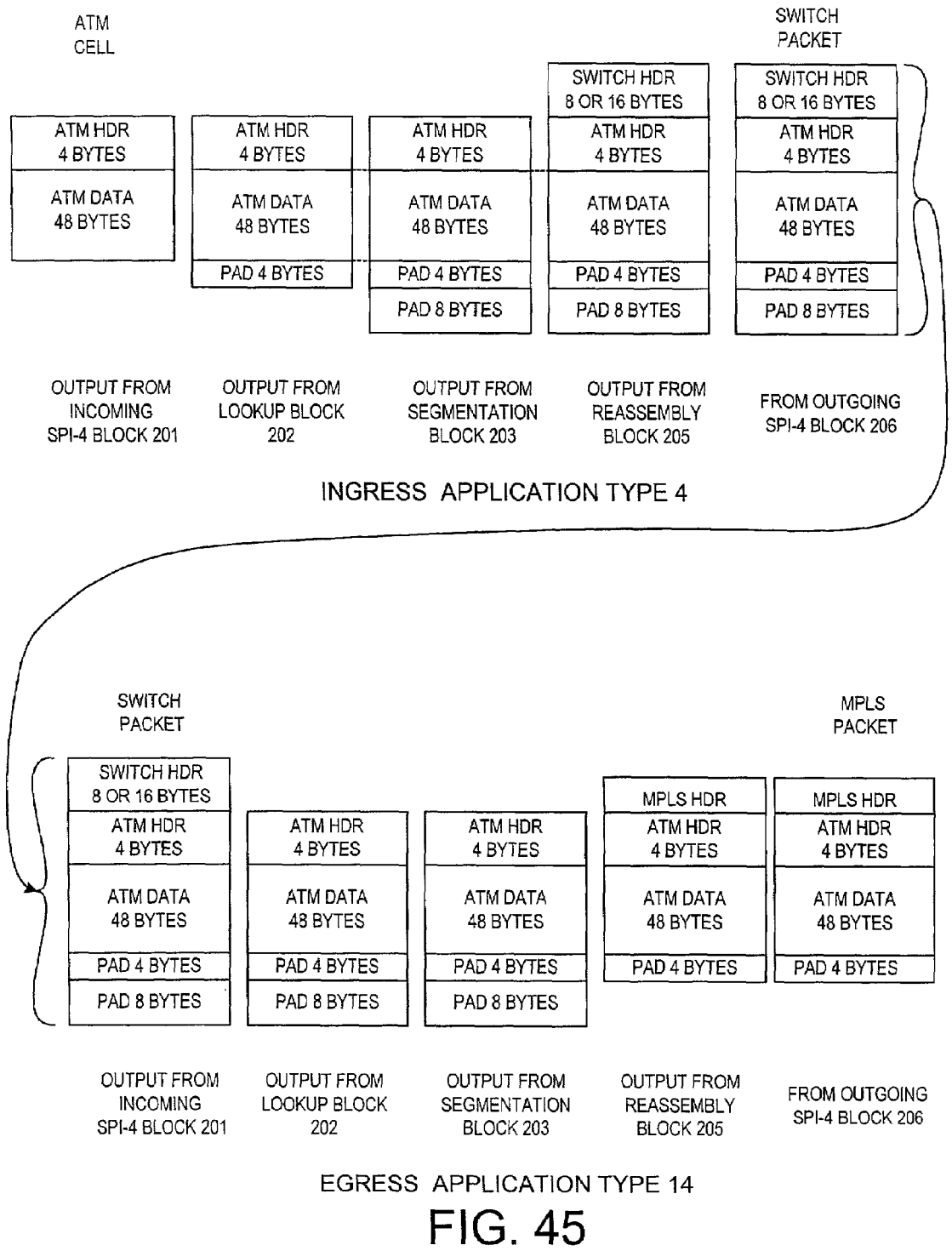
FIG. 45 illustrates an example wherein a flow is processed on an ingress MS-SAR in accordance with ingress application type 4 and is processed on an egress MS-SAR in accordance with egress application type 14.

Application Types 4 and 14:

FIG. 45 illustrates an example of ingress application type 4 and egress application type 14. In this example an incoming ATM cell (four bytes of ATM header and 48 bytes of ATM payload) is received onto the ingress MS-SAR 125 and passes through incoming SPI-4 interface block 201. Lookup block 202 performs a lookup and determines that the ingress application type is ingress application type 4. Lookup block 202 adds four bytes of pad as illustrated in FIG. 45 and passes the resulting 56 bytes to segmentation block 203. Segmentation block 203 generates neither a CRC nor a trailer. Segmentation block 203 adds an additional 8 bytes of pad as illustrated in FIG. 45. The resulting 64-byte chunk is stored by memory manager block 204 in payload memory. The 64-byte chunk is read out of payload memory and passes to reassembly block 205. Reassembly block 205 performs a header lookup and adds an 8 or 16-byte switch header to the 64-byte chunk. The resulting switch packet (8 or 16 bytes of switch header, four bytes of ATM header, 48 bytes of ATM data, and 12 bytes of pad) is passed to a packet-based switch fabric via outgoing SPI-4 interface block 206. The switch packet passes through the switch fabric and is received onto the appropriate line card and the ingress MS-SAR 200. Lookup block 202 locates the Azanda header and determines the egress application type (egress application type 14). Lookup block 202 removes the switch header and passes the remaining 64-bytes to segmentation block 203. Segmentation block 203 does not attach a trailer, but merely passes the 64-byte chunk to memory manager block 204 for storage in payload memory. The 64-byte chunk is retrieved from payload memory and is passed to reassembly block 205. Reassembly block 205 performs a header lookup, and appends an MPLS header as illustrated. Reassembly block 205 removes the last eight bytes of pad. The resulting "encapsulated" ATM cell (MPLS header, 4 bytes of ATM header, 48 bytes of ATM data, and 4 bytes of pad) is output as an MPLS packet to the framer of the egress line card via outgoing SPI-4 interface block 206.

Figure 46:
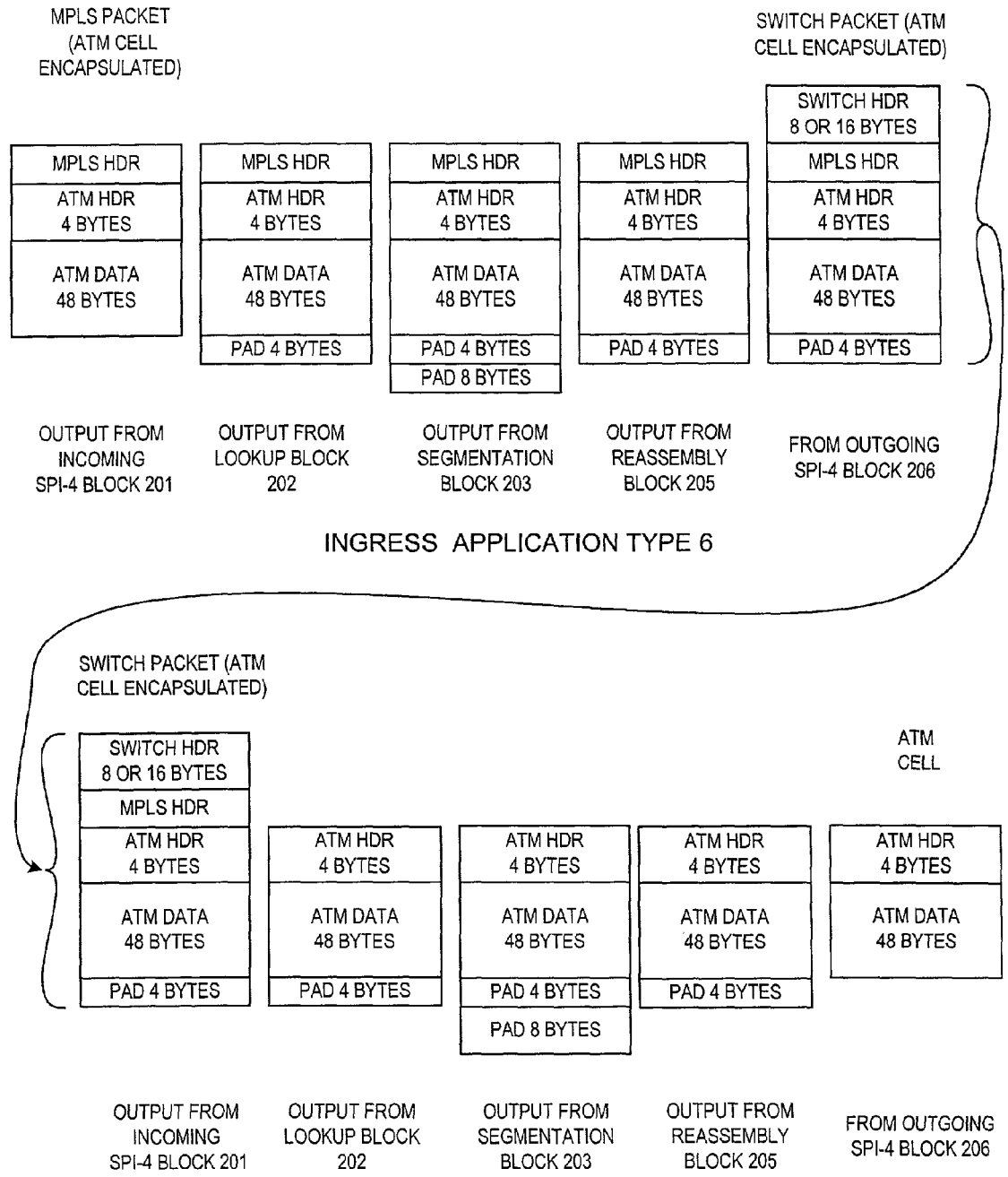
FIG. 46 illustrates an example wherein a flow is processed on an ingress MS-SAR in accordance with ingress application type 6 and is processed on an egress MS-SAR in accordance with egress application type 12.

Application Types 6 and 12:

FIG. 46 illustrates an example of ingress application type 6 and egress application type 12. In this example an incoming ATM encapsulated cell (four bytes of MPLS header, 4 bytes of ATM header, and 48 bytes of ATM payload) is received onto the ingress MS-SAR 125 and passes through incoming SPI-4 interface block 201. Lookup block 202 performs a lookup and determines that the ingress application type is ingress application type 6. Lookup block 202 adds four bytes of pad as illustrated in FIG. 46 and passes the resulting 56-byte chunk to segmentation block 203. Segmentation block 203 pads the chunk up to 64-bytes but generates neither a CRC nor a trailer. The 64-byte chunk is stored by memory manager block 204 in payload memory. The 64-byte chunk is read out of payload memory and passes to reassembly block 205. Reassembly block 205 performs a header lookup, adds an 8 or 16-byte switch header to the 64-byte chunk, and removes the last 8 bytes of pad. The resulting packet (8 or 16 bytes of switch header, four bytes of MPLS header, four bytes of ATM header, 48 bytes of ATM data, and 4 bytes of pad) is passed to a packet-based switch fabric via outgoing SPI-4 interface block 206. The switch packet passes through the packet-based switch fabric and is received onto the appropriate line card and the egress MS-SAR 200. In the egress MS-SAR, the lookup block 202 locates the Azanda header and determines the egress application type (egress application type 12). Lookup block 202 removes the switch header and MPLS header and passes the remaining 56-bytes (4 bytes of ATM header, 48 bytes of ATM data, and 4 bytes of pad) to segmentation block 203. Segmentation block 203 does not attach a trailer, but adds an additional 8-byte pad to pad the chunk up to 64 bytes. The 64-byte chunk is stored in payload memory, is read out of payload memory, and passes to reassembly block 205. Reassembly block 205 translates the ATM header. For example, if instructed so by control information in the header table, reassembly block 205 replaces the VPI/VCI information in the ATM header with VPI/VCI information retrieved from the header table. Reassembly block 205 removes the last 8 bytes of pad and passes the resulting ATM cell (4 bytes of ATM header, 48 bytes of data, and 4 bytes of pad) to outgoing SPI-4 interface block 206. Outgoing SPI-4 interface block 206 removes the last 4 bytes of pad and passes the resulting 52-byte ATM cell to the framer of the egress line card.

Application Types 6 and 14:

FIG. 47 illustrates an example of ingress application type 6 and egress application type 14. In this example an incoming MPLS packet (four bytes of MPLS header and 160 bytes of packet payload) is received onto the ingress MS-SAR 125 of a first line card and passes through incoming SPI-4 interface block 201. Lookup block 202 performs a lookup operation and determines that the ingress application type is ingress application type 6. Segmentation block 203 outputs the packet information as 64-byte chunks as illustrated in FIG. 47. In the example of FIG. 47, the 160 bytes of data payload of the packet is segmented so that the 4-byte MPLS header and 60 bytes of data is segmented into the first 64-byte chunk. The next 64 bytes of data is segmented into the next 64-byte chunk. The remaining 36 bytes of data 440 from the 160-byte payload is segmented into the third 64-byte chunk as illustrated. Segmentation block 203 calculates a CRC on the data payload and places the CRC calculated into a trailer 441 that is incorporated as the end of the last 64-byte chunk. Any space between the end of the data 440 and trailer 441 is filled with a pad 442. Segmentation block 203 may be outputting 64-byte chunks of a packet at the same time that it is receiving chunks of the same packet. The 64-byte chunks are stored by memory manager block 204 into payload memory. The 64-byte chunks are read out of payload memory and are supplied to reassembly block 205. Reassembly block 205 maps the data portions of the 64-bytes chunks into 160-bytes of packet data as illustrated. Reassembly block 205 calculates a CRC on the data as the various chunks of data pass into the reassembly block 205. When the data from the last 64-byte chunk is received onto reassembly block 205, reassembly block compared the final CRC with the CRC in the trailer of the last 64-byte chunk. Using the FID of the flow, reassembly block 205 performs a header lookup and attaches a switch header to the front of the data payload. The resulting switch packet (switch header, MPLS header, and packet data) is supplied to outgoing SPI-4 interface block 206 in pieces, one at a time. Although the packet data payload is illustrated in FIG. 46 as being reassembled by reassembly block 205, a first part of the switch packet may be flowing out of reassembly block 205 to outgoing SPI-4 interface block 206 at the same time that a second part of the data portion of the switch packet is being received onto reassembly block 205.

The switch packet of FIG. 46 passes through a packet-based switch fabric to a second line card having an egress MS-SAR. The arrow in FIG. 46 illustrates this flow of information. The switch packet (switch header, MPLS header, and 160 bytes of packet data in this example) is received onto the egress MS-SAR via incoming SPI-4 interface block 201. Lookup block 202 removes the switch header, locates the Azanda header, and determines from the Azanda header the egress application type to be performed (egress application type 14). Segmentation block 203 segments the packet as illustrated in FIG. 46 into 64-byte chunks. Segmentation block adds a trailer to the end of the last 64-byte chunk as explained above. The 64-byte chunks are supplied one by one to the memory manager block 204 and are stored one by one into payload memory. The 64-bytes are read out of payload memory one by one and are supplied, one by one, to reassembly block 205. When reassembly block 205 receives the first 64-byte chunk, reassembly block 205 performs a header lookup using header table 327. If instructed to by control information found in the header table 327, reassembly block 205 performs an MPLS manipulation operation on the MPLS header. For example, reassembly block 205 may replace the MPLS label in the MPLS header with an MPLS retrieved from header table 327. Reassembly block 205 maps the data portions of the three 64-byte chunks into one packet payload as illustrated in FIG. 46. As the data portion of the various 64-byte chunks pass through reassembly block 205, reassembly block 205 calculates a CRC on the data such that reassembly block 205 checks the final composite CRC with the CRC found in the last 64-byte chunk. The first part of the resulting MPLS packet can be output from reassembly block 205 at the same time that later 64-byte chunks for the packet are being received onto reassembly block 205. The resulting MPLS packet (MPLS header, and 160 bytes of packet data) is output to the framer of the egress line card via outgoing SPI-4 interface block 206.

Reassembly "On-the-Fly":

Where a segmented packet is received on an egress line card in the form of a plurality of individual cells (for example AAL5 cells), and where the data payloads of the individual cells are to be reassembled into the original packet, the data payloads of the individual cells are buffered in payload memory before any reassembly is done. Rather than doing reassembly before the cells are buffered, reassembly in the MS-SAR 200 is done on a per output port basis as the cells for a flow are being output (i.e., on-the-fly) from the egress MS-SAR. A packet being reassembled is not necessarily reassembled in the sense that the entire reassembled packet exists in reassembled form in reassembly block 205. Rather the individual 64-byte chunks making up the packet are processed by reassembly block 205 one at a time. It is, for example, possible that a first part of the packet has already passed out of the reassembly block 205 before the last part of the packet has been read out of payload memory 204.

In accordance with one embodiment, a "reassembly context" is maintained for each reassembly process going on. A reassembly context may, for example, include: 1) a 32-bit partial CRC value maintained for a reassembly process taking place on an output port, and 2) a 16-bit partial (i.e., running) packet length byte count (count of the total number of bytes received for the reassembly process taking place on the output port, including any padding bytes and any trailer bytes). Rather than maintaining such a reassembly context for each of the many flows coming into the egress MS-SAR (it is, for example, possible that each incoming flow would be AAL5 cells requiring reassembly), reassembly is done on a per output port basis after buffering in payload memory 217, thereby reducing the maximum number of reassembly contexts that have to be maintained to one per output port. There is at most one such packet reassembly process going on for each of the output ports that is configured and active. Reducing the number of reassembly contexts to be stored reduces the amount of memory necessary and thereby reduces line card costs.

Segmentation "On-the-Fly":

A packet received onto an ingress line card may, in accordance with an adaptation layer protocol, require segmentation into a plurality of pieces, where each of the pieces is the data payload of an individual cell. The AAL5 protocol is an example of one such protocol. The segmenting is done so that the individual cells can later be reassembled into the original packet. Rather than storing such a packet into payload memory, retrieving the packet, and then segmenting it as it is sent out to the switch fabric, segmentation in ingress MS-SAR 125 is done on a per input port basis as flows are received (i.e., on-the-fly) onto the ingress MS-SAR. Segmentation, as the term is used here, encompasses the one-by-one processing of segments of a packet such that the processed segments include information required by the segmentation protocol. A segmentation block may, for example, output a processed segment before the last part of the packet has even been received by the segmentation block.

In accordance with one embodiment, a segmentation context is maintained for each segmentation process going on. A segmentation context may, for example, include a 32-bit CRC value and a 16-bit packet byte count value. Because a packet to be segmented is received onto segmentation block 203 in segments, and because segmentation block 203 processes these segments one by one, the segmentation engine maintains a partial 32-bit CRC value for the packet and a partial packet byte count value. As each segment is processed, segmentation block 203 updates the partial CRC value and partial packet byte count value. After the last segment has been received onto the segmentation block as indicated by the EOP bit of the segment, then the partial CRC value is the complete CRC value for the packet. Similarly, the partial packet byte count value contains the number of bytes in the packet. The 32-bit complete CRC value and the 16-bit packet byte count value are included by segmentation block 203 into the AAL5-like trailer that the segmentation block appends to the last 64-byte chunk for the packet. Rather than maintaining such a segmentation context for each of the many flows going out of the ingress MS-SAR (it is, for example, possible that each outgoing flow is to be in the form of AAL5 cells), this segmentation process is done before buffering on a per input port basis, thereby reducing the maximum number of segmentation contexts that have to be maintained to one per input port. There is at most one such packet segmentation process going on for each of the input ports that is configured and active. Reducing the number of segmentation contexts to be stored reduces the amount of memory necessary and thereby reduces line card costs. If a separate counter or separate CRC engine is provided for each segmentation process, then reducing the number of segmentation processes going on at one time further reduces costs.

Figure 48:
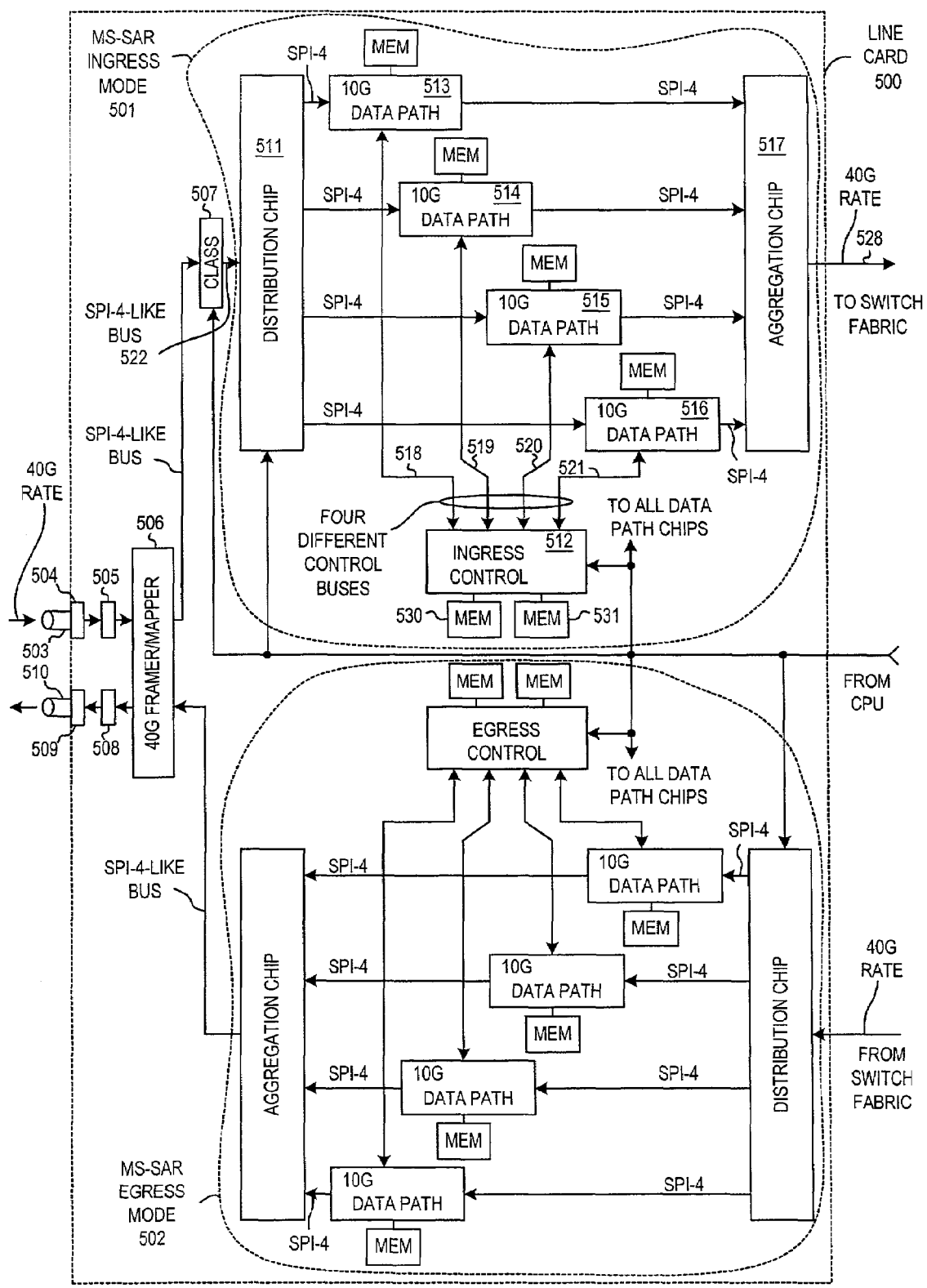
FIG. 48 is a diagram of an embodiment wherein MS-SAR functionality is partitioned into two integrated circuit chips (a data path integrated circuit and a control integrated circuit) such that multiple data path integrated circuits chips can be used with one control integrated circuit chip to increase data path throughput.

Multiple Data Path Chips to Increase Throughput Rate:

FIG. 48 illustrates a novel aspect wherein MS-SAR functionality is partitioned into a control integrated circuit and a data path integrated circuit such that system throughput can be increased by using multiple data path integrated circuits. This increase in system throughput is accomplished without having to redesign either the data path integrated circuit or the control integrated circuit. The data path integrated circuit and the control integrated circuit therefore make a versatile chip set. Where a lower throughput is required, cost is reduced by using just one data path integrated circuit with one control integrated circuit. Where a higher throughput is required, multiple data path integrated circuits are used with one control integrated circuit. Accordingly, the very same data path and control integrated circuits are useful for a wide range of throughput applications. As a result, larger production runs of each integrated circuit is likely and an associated reduction in per part cost is expected.

FIG. 48 illustrates a line card 500 having a first MS-SAR 501 configured in the ingress mode and a second MS-SAR 502 configured in the egress mode. Network information passing from fiber optic cable 503 to the switch fabric passes through optics module 504, serdes 505, framer/mapper 506 and classification engine 507 before it reaches ingress MS-SAR 501. In an egress path, network information passes from egress MS-SAR 502, through framer/mapper 506, serdes 508 and optics module 509 to fiber optic cable 510. The optics/serdes/framer circuitry of FIG. 48 is similar to the corresponding circuitry of FIG. 5, except that the circuitry in FIG. 48 can receive from and output to fiber optic cables 503 and 510 are higher data throughout rates. For example, where line card 101 of FIG. 5 may receive and output at OC-192 line rates (about 10 gigabits per second), line card 500 of FIG. 48 may receive and output at OC-768 line rates (about 40 gigabits per second).

How the partitioning of MS-SAR functionality facilitates handling higher data throughput rates is explained in connection with ingress MS-SAR 501 of FIG. 48. Ingress MS-SAR 501 includes a distribution integrated circuit 511, a control integrated circuit 512, four data path integrated circuits 513–516, and one aggregation integrated circuit 517. Control integrated circuit 512 includes the circuitry shown in FIG. 10 within dashed line 213. Each of the data path integrated circuits 513–516 includes the circuitry shown in FIG. 10 within dashed line 212. Although per flow queue block 207 in the embodiment of FIG. 10 has only one control interface for sending and receiving enqueue and dequeue commands, the control integrated circuit 512 of the embodiment of FIG. 48 has four such interfaces. Accordingly, ingress control integrated circuit 512 of FIG. 48 is coupled to data path integrated circuits 513–516 via control buses 518–521, respectively.

Operation of the circuit of FIG. 48 is explained in connection with an example of a high-speed stream of multiple packets being received from fiber optic cable 503 at OC-768 rates. The packets pass, one by one, through optics module 504, serdes 505, framer/mapper 506, and classification engine 507 to distribution integrated circuit 511. Distribution integrated circuit 511 receives the packets from classification engine 507 via an SPI-4-like bus 522. This bus 522 is like an SPI-4 bus, except that it is capable of operating at 40 gigabits per second rates. Each packet is framed by a start delimiter and an end delimiter.

Distribution integrated circuit 511 distributes each incoming packet to one of the four data path integrated circuits 513–516, the particular data path integrated circuit being chosen so as to distribute data path processing load evenly among the multiple data path integrated circuits. Any of many known load-balancing algorithms can be employed. Distribution integrated circuit 511 only outputs complete packets. In addition to distributing load, distribution integrated circuit 511 includes a sequence number along with each packet. In one embodiment, there is a sequence of sequence numbers for each flow. Distribution integrated circuit 511 employs a lookup block like lookup block 202 of FIG. 10. Lookup information is provisioned by the CPU beforehand as explained above in connection with lookup block 202 of FIG. 10. Distribution integrated circuit 511 receives a packet, identifies the flow, increments a sequence number for that flow, and adds the sequence number to the packet. Each respective packet of a flow therefore carries a sequence number that is one greater than the sequence number of the previous packet in that flow.

Figure 49:
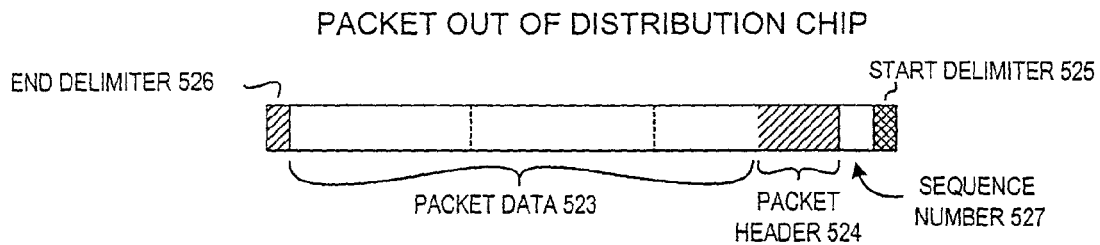
FIG. 49 is a diagram of a packet as it is output from the distribution integrated circuit of FIG. 48.

FIG. 49 is a diagram of a packet as output by distribution integrated circuit 511. The packet includes a data portion 523 and a header portion 524. The packet is framed by a start delimiter 525 and an end delimited 526. The sequence number 527 added by distribution integrated circuit 511 is disposed between the start delimited 525 and the packet header 524.

The various packets, after being marked with sequence numbers, flow into the various data path integrated circuits 513–516. The lookup block of the data path integrated circuit that receives the packet determines the flow ID of the packet as described above in connection with the embodiment of FIG. 10. In the embodiment of FIG. 48, the lookup block also extracts the packet sequence number. Both the flow ID and the packet sequence number are then supplied to the control integrated circuit 512 via the enqueue mechanism. Control integrated circuit 512 is therefore aware of which packets of which flows have been received onto which data path integrated circuits. In addition to performing the other traffic management, policing, shaping, and metering functions described above, control integrated circuit 512 issues dequeue commands to ensure that the various packets of a flow are supplied to aggregation integrated circuit 517 in the same order in which they were received onto distribution integrated circuit 511. To do this, control integrated circuit 512 maintains a "packet queue" for each flow.

Figure 50:
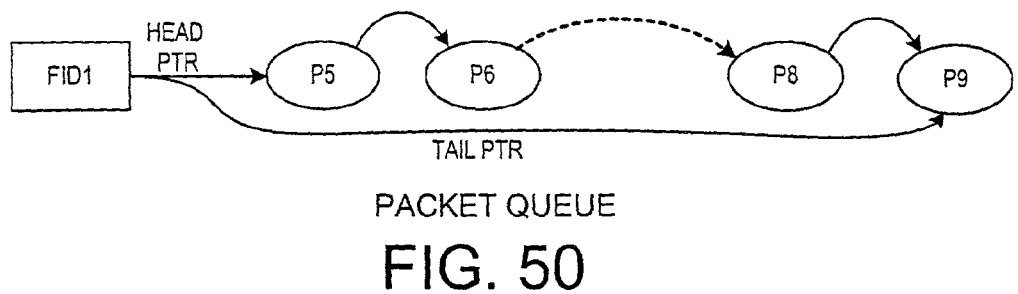
FIGS. 50 and 51 are diagrams that illustrate the building of a packet queue in connection with the operation of the embodiment of FIG. 48.
Figure 51:
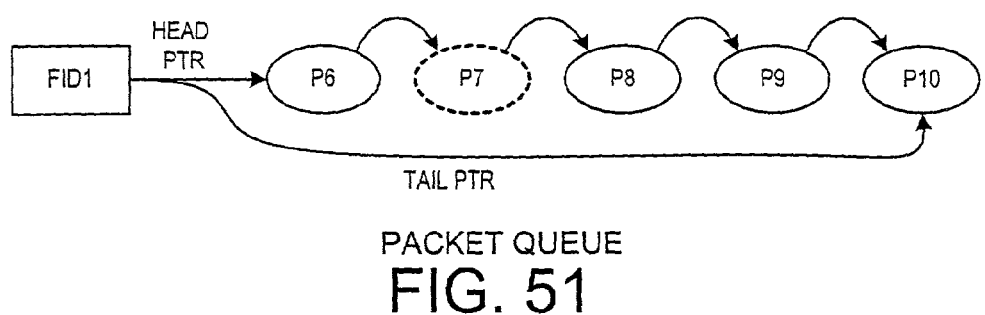

FIGS. 50 and 51 illustrate the building of such a packet queue. In FIG. 50, the packets of a flow (FID1) were sequence numbered P1, P2, P3 and so forth by distribution integrated circuit 511. Control integrated circuit 512 maintains a head pointer and a tail pointer for this packet queue. The first packets P1, P2, P3 in this flow have already been dequeued and sent through the aggregation integrated circuit 517 to the switch fabric. Consequently they do not appear in the packet queue. The next packet to be dequeued is packet P5. Control integrated circuit 512 will dequeue the various 64-byte chunks of this packet by dequeuing a per flow queue for this packet as explained above in connection with FIG. 10. In the example of FIG. 50, packet P7 of flow #1 has not been queued in the packet queue. Accordingly, control integrated circuit 512 will not dequeue packet P8, but rather will wait until packet P7 has been queued.

FIG. 51 illustrates the packet queue after packet P7 has been queued. Note that packet P7 has been linked into the queue in its proper place before packet P8 such that the dequeueing of the linked list will result in the packets of the flow being dequeued in the proper order. In the example of FIG. 51, packet P5 has been dequeued, and a new packet for this flow, packet P10, has been received and queued.

Control integrated circuit 512 dequeues the various packets in accordance with this scheme so that the various packets of each flow are output to aggregation integrated circuit 517 in the correct order. Aggregation integrated circuit 517 combines the packets in the order it receives them into one stream. That one stream is output to the switch fabric via SPI-4-like bus 528. Bus 528 is like an SPI-4 bus, except that it is capable of operating at 40 gigabits per second rates. It is therefore seen that one high throughput rate data path (40 gigabits/second) coming into the line card is processed using four lower throughput rate data path integrated circuits (10 gigabits/second), and that the outputs of the four lower throughput rate data path integrated circuits are combined to form one higher throughput rate data path (40 gigabits/second) to the switch fabric.

In the embodiment of FIG. 48, the incoming data path having the increased throughput rate is being controlled by only one control integrated circuit 512. The associated increase in processing required of control integrated circuit 512 may result in difficulties in accessing external memory.

Figure 52:
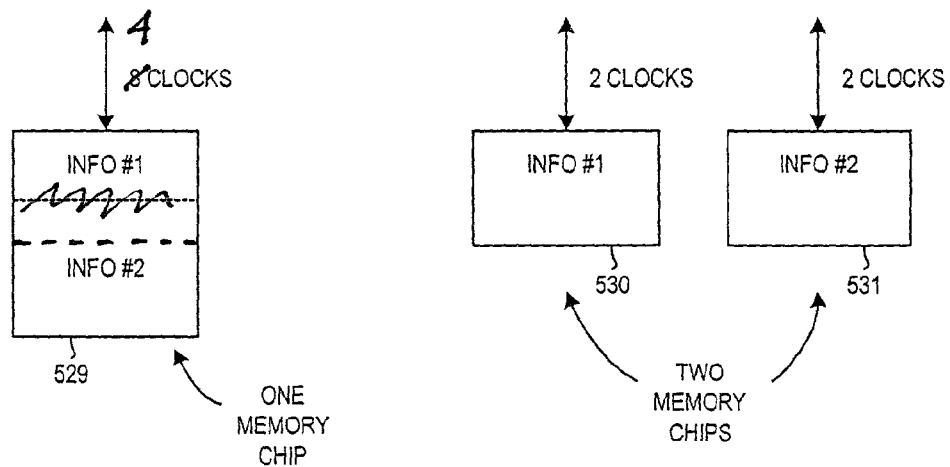
FIG. 52 is a diagram that illustrates a technique for accessing certain information stored in external memory in a reduced amount of time in connection with the embodiment of FIG. 48.

FIG. 52 is a diagram of an external memory device 529 that is coupled to a control integrated circuit. External memory device 529 may, for example, be external memory 225 of FIG. 10. External memory device 529 stores two types of information, information #1 and information #2, both of which must be accessed within a particular amount of time related to the rate of incoming information. Where the control integrated circuit is clocked by a clock signal, this particular amount of time can be referred to as four clock periods. In the example to the left of FIG. 52, each piece of information can be accessed in two clock periods. Both pieces of information are stored in the same external memory device requiring one to be accessed before the other. A total of four clock periods is therefore required to access both pieces of information.

If the circuit of FIG. 48 is now employed to handle OC-768 line rate information coming in from fiber optic cable 503, then this same information (information #1 and information #2) must be accessed in a smaller amount of time. Consider the example where both information #1 and information #2 must now be accessed within two clock periods. A memory may not be available that has fast enough access times to handle the accessing required within this fewer number of clock periods.

In accordance with one novel aspect, two external memories are used. Information #1 is stored in the first external memory 530 and information #2 is stored in second external memory 531. The two external memories are accessed at the same time in parallel. If external memories 530 and 531 are the same type of external memory 529, then these external memories have access times of two clock periods and both information #1 and information #2 are accessed within the required two clock periods. It is to be understood, of course, that the four and two in the example are used only to illustrate the technique of accessing memories in parallel to facilitate handling higher data throughput rates. The technique here is not limited to the numbers in this example. An example of information #1 is cell count information stored in the embodiment of FIG. 10 in PFQ STAT memory 225. An example of information #2 is packet count information stored in the embodiment of FIG. 10 in PFQ STAT memory 225. These two types of information are, in one embodiment of FIG. 48, stored in different external memory devices.

Although the operation of the embodiment of FIG. 48 is described in connection with a flow of packets, the same process is followed to handle flows of cells. The embodiment of FIG. 48 handles all the application types of FIGS. 7 and 8. It is also to be understood that the functionality of the circuit of FIG. 48 can be rearranged. For example, the distribution chip and the control integrated circuit may be combined onto one integrated circuit such that only one lookup block is required. Alternatively, the lookup function may be performed on the distribution chip such that results of the lookup are forwarded to the control integrated circuit. Various rearrangements of the functionality of FIG. 48 are possible without losing the benefit of the novel partitioning of the MS-SAR.

Backpressuring Using Serial Bus:

A router 600 involves a first line card 601 and a second line card 601. Each of the first and second line cards involves an MS-SAR operating in the ingress mode and an MS-SAR operating in the egress mode. The egress MS-SAR 603 on the second line card can become endangered of being overloaded if, for example, the ingress MS-SAR 604 on the first line card continues to send network information for a flow to the egress MS-SAR 603 on the second line card, but the egress MS-SAR 603 on the second line card is prevented from outputting that information, for example due to congestion at the framer 605. Consequently, more and more of the network information for the flow will end up having to be buffered by the egress MS-SAR 603 of the second line card (buffered in payload memory).

Figure 53:
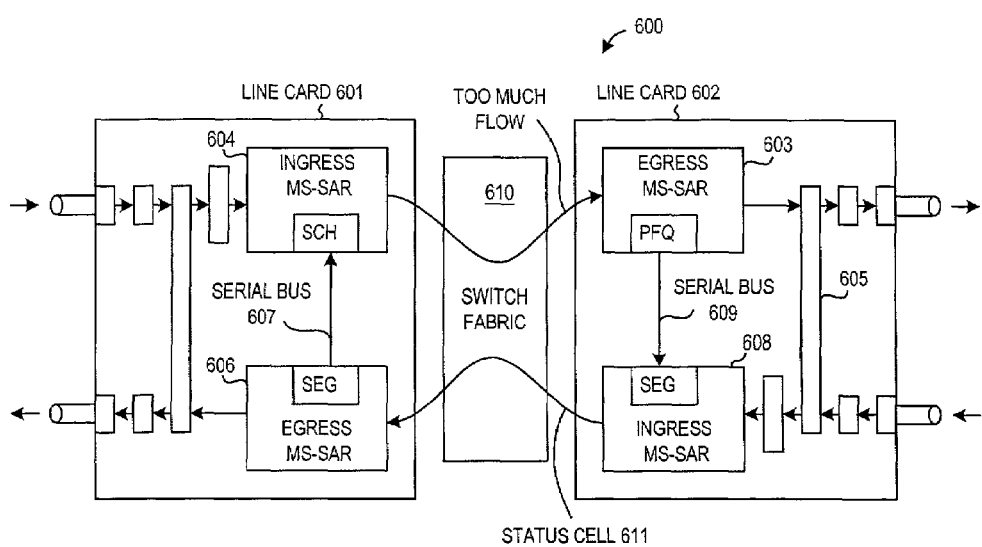
FIG. 53 is a diagram that illustrates a serial bus that couples an egress MS-SAR of a line card to an ingress MS-SAR of the same line card. The egress MS-SAR can use the serial bus to backpressure the sending ingress MS-SAR.

In one novel aspect, the ingress and egress MS-SAR devices 604 and 606 of the first line card 601 are linked by a serial bus 607 on the first line card, and the ingress and egress MS-SAR devices 603 and 608 of the second line card 602 are linked by a serial bus 609 on the second line card. If the egress MS-SAR 603 of the second line card is in danger of becoming overloaded, then the egress MS-SAR 603 of the second line card sends an indication of this situation to the ingress MS-SAR 608 of the second line card via the serial bus 609 on the second line card. In one embodiment, it is the per flow queue block of the egress MS-SAR 603 that detects that the size of the free buffer queue has decreased to an undesirably low level. The per flow queue block is therefore coupled to the serial bus 609 as illustrated in FIG. 53.

The ingress MS-SAR 608 of the second line card receives this indication from serial bus 609 and relays the indication to the first line card 601 by outputting a special status switch cell 611. The special status switch cell 611 is transported across the switch fabric 610 to the egress MS-SAR 606 of the first line card. The egress MS-SAR 606 of the first line card detects the special status switch cell, and relays the indication of the situation to the ingress MS-SAR 604 of the first line card via the serial bus 607 on the first line card. In one embodiment, it is the segmentation block that detects the special status switch cell. The segmentation block is therefore coupled to the serial bus 607 as illustrated in FIG. 53.

In response to receiving this indication from serial bus 607, the ingress MS-SAR 604 on the first line card slows or stops its outputting of the information that is overburdening the egress MS-SAR 603 on the second line card. In one embodiment, the output scheduler is able to slow or stop the outputting of information that is overburdening egress MS-SAR 603. Consequently, the serial bus 607 is coupled to the output scheduler block of ingress MS-SAR 604 as illustrated in FIG. 53.

Figure 54:
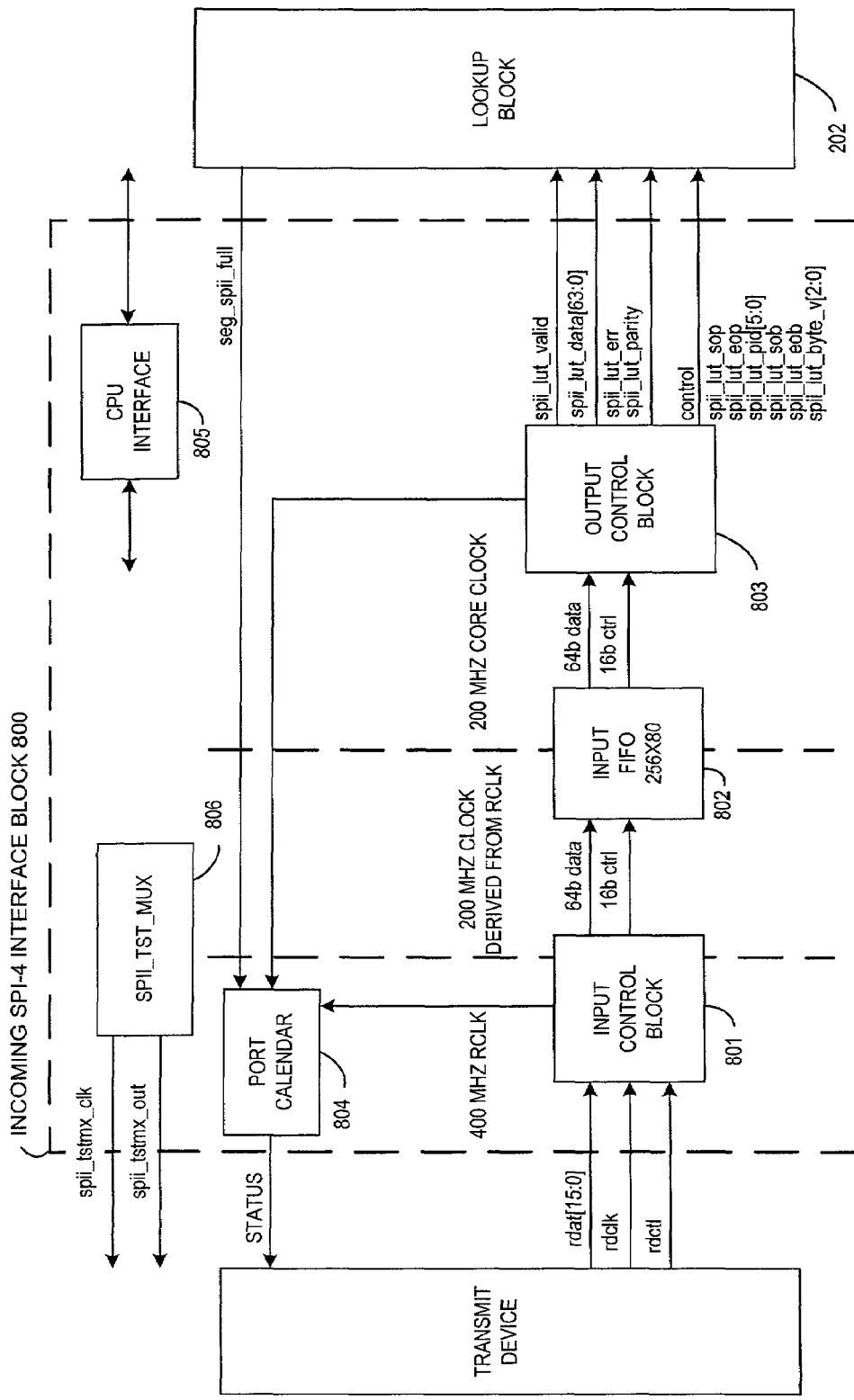
FIG. 54 is a block diagram on one particular embodiment of incoming SPI-4 interface block 201 of FIG. 10.
Figure 55:
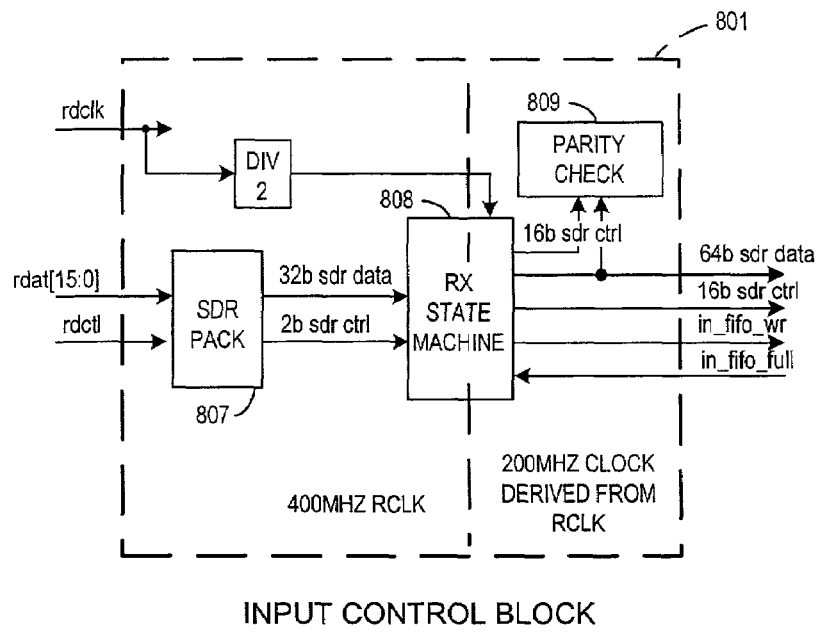
FIG. 55 is a diagram of input control block 801 of FIG. 54.
Figure 56:
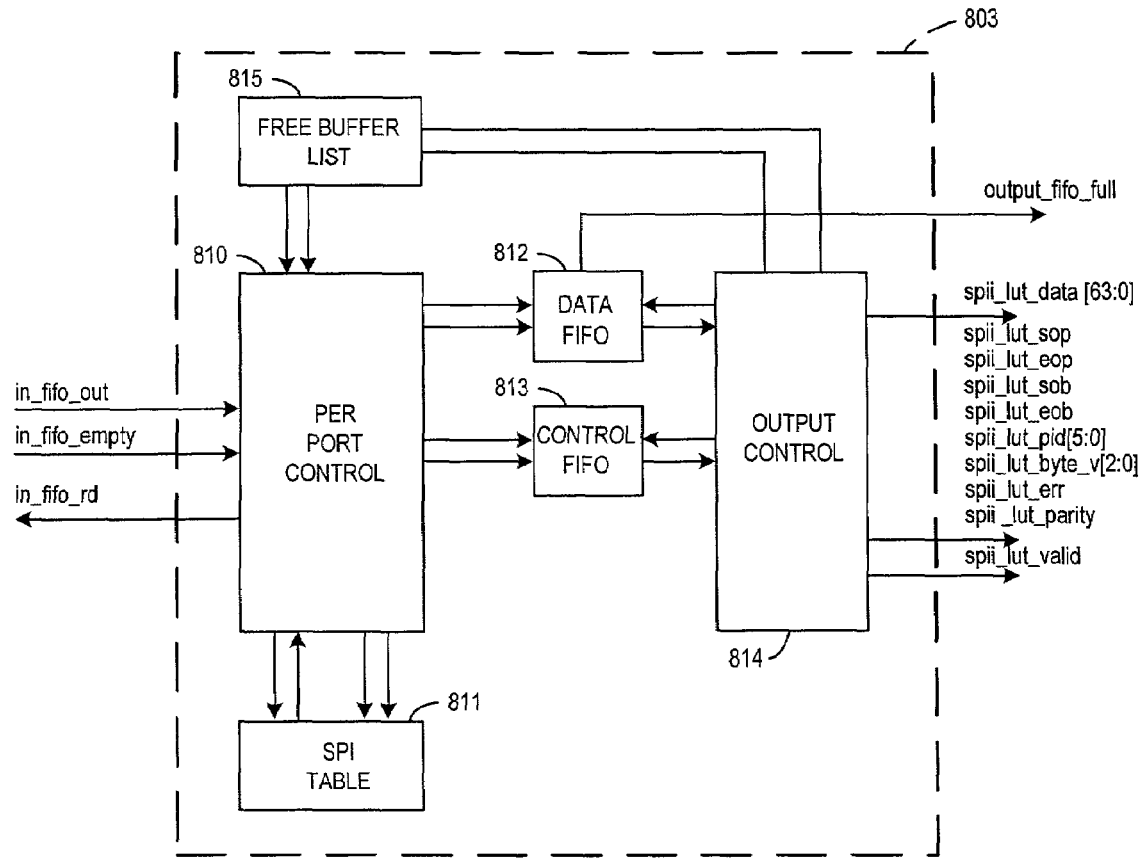
FIG. 56 is a diagram of output control block 803 of FIG. 54.

Incoming SPI-4 Interface Block in More Detail:

FIG. 54 is a block diagram of one particular embodiment 800 of incoming SPI-4 interface block 201 of FIG. 10. Incoming SPI-4 interface block 800 includes an input control block 801, an input FIFO block 802, an output control block 803, a port calendar block 804, a CPU interface block 805, and a test multiplexer block 806. As illustrated in FIG. 55, input control block 801 includes a single-data rate (SDR) pack block 807, a receive (RX) state machine block 808, and a parity checker block 809. As illustrated in FIG. 56, output control block 803 includes a per port control block 810, an SPI table SRAM block 811, a data FIFO 812, a control FIFO 813, an output control block 814, and a free buffer list block 815.

In operation, incoming SPI-4 interface block 800 receives 16-bit double data rate data at approximately 10 gigabits per second that is transmitted to the MS-SAR in accordance with the SPI-4, phase II, specification. Incoming SPI-4 interface block 800 packs the incoming data into 64-bit wide words, extracts in-band port control information (input port addresses, SOP, EOP, and error control codes), and then passes the data along with the extracted control information to lookup block 202 (see FIG. 10). SDR pack block 807 converts the 16-bit DDR data words into 32-bit SDR data words. The one-bit DDR control bit is converted into a two-bit SDR control word. The two-bit control word indicates which 16-bit word within a 32-bit word is the control word. Based on the two-bit control word, RX state machine 808 extracts the in-band port address, start/end-of-packet indication and error-control code from the data and control path and packs the data into 64-bit data words and pushes the 64-bit data and the 16-bit control into 80-bit wide input FIFO block 802.

Per-port control block 810 of FIG. 56 accumulates data on a per port basis and queues the control information into control FIFO 813 when it has accumulated a complete data buffer in data FIFO 812. Output control block 814 reads from control FIFO 813 and from data FIFO 812 and outputs the related data and control information to lookup block 202. As the data flows into per port control block 810, parity checker block 809 calculates four-bit Diagonal Interleaved Parity (DIP-4) and reports an error if the calculated DIP-4 is not equal to the one received with the control word.

More detailed operation of the various blocks of FIGS. 54–56 is now described. SDR pack block 807 of FIG. 55 converts the 16-bit 400 MHz DDR data into 32-bit 400 MHz SDR data. The RDCTL control signal is used to determine whether the high byte or the low byte of the 32-bit SDR data is control information. The RX state machine block 808 of FIG. 55 receives 32-bit words from SDR pack block 807 along with a two-bit indication of data or control. RX state machine 808 extracts the in-band control information and packs the data into 64-bit wide words. It also sends the data and control words to parity checker block 809 to check parity.

The incoming SPI-4 interface block 800 expects the control word be sixteen bits and to have a particular format. Bits 0–3 are a DIP-4 (Diagonal Interleaved Parity) value. Bits 4–11 are an 8-bit port address. Bit 12 is a start-of-packet (SOP) bit. Bits 13 and 14 are end-of-packet status bits. Bit 15 is a control word type. Such a 16-bit control word, when present in the data path, is aligned such that its MSB is sent on the MSB of the incoming data lines. A control word that separates two adjacent data burst transfers may contain status information pertaining to the previous transfer, the following transfer, or both transfers.

RX state machine block 808 operates in accordance with a state transition table, where transitions are based on the types of control words received. Parity checker block 809 calculates DIP-4 parity and compares the calculated parity with the one received in the control word.

Input FIFO block 802 (see FIG. 54) is a 256×80 bit dual-port FIFO running at 200 MHz that absorbs the incoming data and control information from input control block 801. Each 80-bit entry includes an SOP bit, an EOP bit, an SOB bit, an EOB bit, an error bit, a parity error bit, on reserved bit, five PID bits, three byte valid bits, and 64 data bits. The write operation is controlled by receive state machine 808. Read operation is controlled by the per-port control block 810 (see FIG. 56). Per-port control block 810 reads from input FIFO block 802 as long as input FIFO block 802 is not empty.

For each new data burst read from FIFO 802 (a burst of data is marked with SOP or SOB), per-port control block 810 obtains a pointer to a free buffer in data FIFO 812 from the free buffer list block 815. Free buffer list block 815 includes a 128×10 bit single port SRAM containing pointers to available locations in data FIFO 812. Per-port control block 810 also obtains temporary control information from SPI table block 811. SPI table block 811 is a table of sixty-four entries, one for each input port. The table contains control information for the incoming data burst for each port. Each 32-bit entry in SPI table 811 includes one SOP bit, one EOP bit, one error bit, one parity error bit, six PID bits, three byte valid bits, seven cell count bits, ten pointer bits, and two reserved bits.

After obtaining a pointer to a free buffer and after obtaining associated control information from SPI table block 811, per-port control block 810 accumulates the incoming data into the pointed to 80-byte buffer in data FIFO 812 (accumulates on a per-port basis, one buffer per port). The associated control information is only pushed into the control FIFO 813 when the buffer is full or when an EOP is received.

Data FIFO 812 is a dual-port FIFO that implements 128 buffers of 80 bytes each. The amount of data stored in a buffer is sixty-four bytes in ingress mode, and eighty bytes in egress mode when operating with a packet-based switch fabric. When operating in egress mode with a cell-based switch fabric, each incoming switch cell is a complete packet (i.e., there is an EOP for each incoming switch cell). Each buffer is used to store either seventy-two bytes or eighty bytes, depending on whether the switch header is eight or sixteen bytes long. When data from an 80-byte buffer is sent out to lookup block 202, output control block 814 returns the pointer to the buffer back to the end of the free buffer list stored in free buffer list block 815.

Port calendar block 804 receives per-port FIFO status information from segmentation block 203 via line SEG_SPII_FULL. Port calendar block 804 encodes this status as a two-bit status word and sends the status word back to the transmit device at the rate of one port per cycle in round robin fashion based on the port calendar. The "11" status word is reserved for in-band framing. A DIP-2 odd parity is sent at the end of each complete sequence, immediately before the "11" framing pattern. When memory usage exceeds fifty percent (i.e., more than 64 data buffers are used), then the incoming SPI-4 interface block 800 sends a FULL indication to all incoming ports. This FULL indication can also be triggered if a FULL indication arrives from the lookup block 202. The NOT-FULL indication is sent when the shared memory usage falls below twenty-five percent (i.e., less than 32 data buffers are used).

The CPU can write to any location in any memory within incoming SPI-4 interface block 800 by writing data to be written into registers in CPU interface block 805 and then writing an appropriate opcode with an address into a command register in CPU interface block 805. Alternatively, the CPU can read from any location in any memory by writing an appropriate opcode and address into the command register. The CPU interface block 805 reads the identified location and returns the data stored there to data registers in the CPU interface block 805. The CPU can then read the data from the data registers. The CPU can also cause the CPU interface block 805 to perform various diagnostic functions by writing particular opcodes into the command register. For example, a multiplexer in the test multiplexer block 806 can be controlled to couple a selected internal node in incoming SPI-4 interface block 800 to a particular output pin of the MS-SAR.

Figure 57:
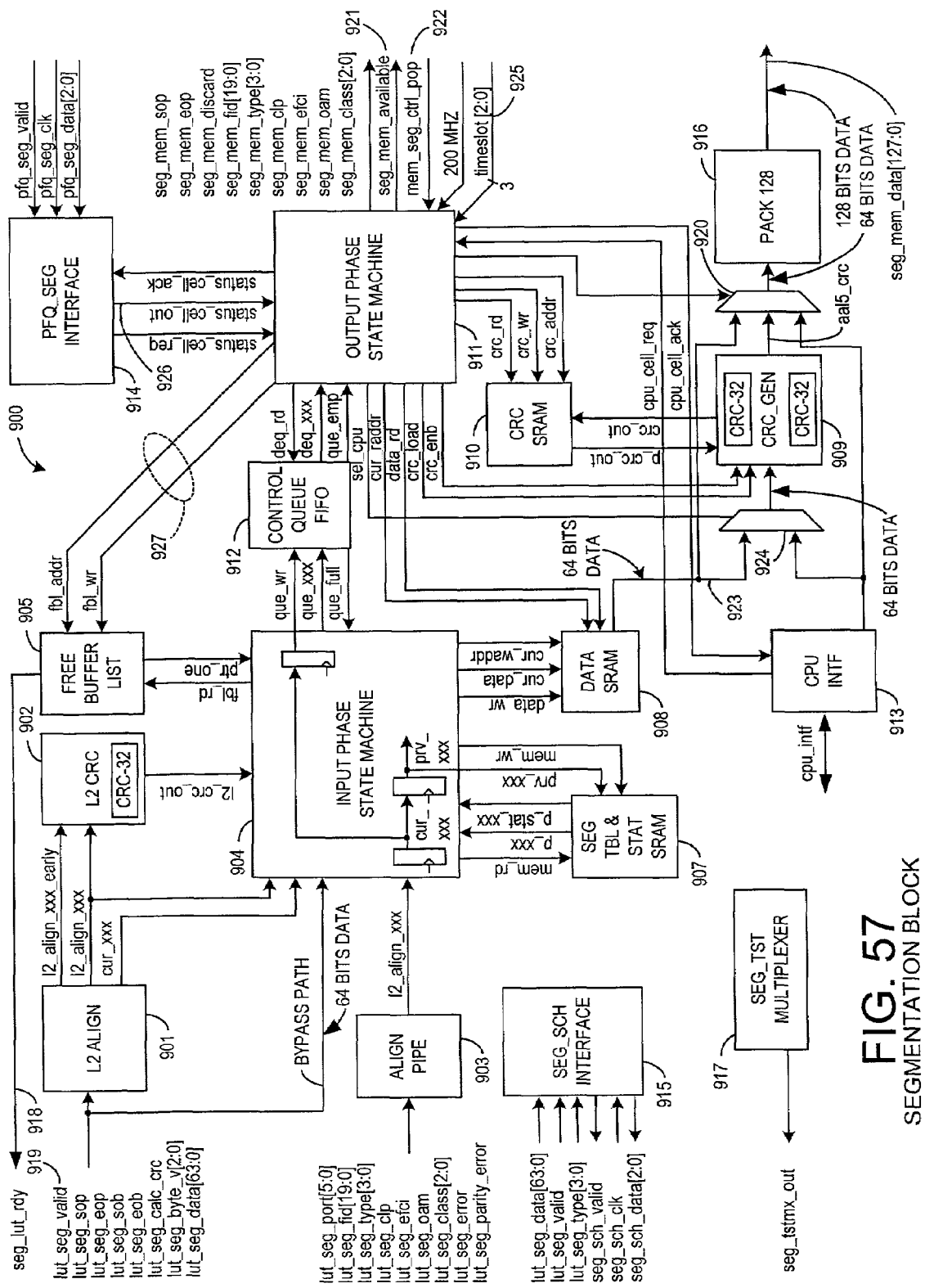
FIG. 57 is a block diagram of one particular embodiment of segmentation block 203 of FIG. 10.

Segmentation Block 203 in More Detail:

FIG. 57 is a block diagram of one particular embodiment 900 of segmentation block 203 of FIG. 10. Segmentation block 900 includes an L2 align block 901, an L2 CRC block 902, an align pipe block 903, an input phase block state machine 904, a free buffer list block 905, a segmentation table and statistics SRAM block 907, a data SRAM block 908, a CRC generator block 909, a CRC SRAM block 910, an output phase state machine block 911, a control queue FIFO block 912, a CPU interface block 913, a per flow queue-to-segmentation interface (PFQ_SEG) block 914, a segmentation-to-scheduler interface (SEG_SCH) block 915, a pack_128 block 916, and a segmentation test multiplexer (SEG_TST) block 917.

There is at least one 64-byte buffer for each input port (there are actually eighty such blocks whereas there are 64 possible input ports) in data SRAM block 908. There is one 74-bit entry in control queue FIFO 912 for each of the 64-byte buffers in data SRAM block 908. Consequently, there are eighty 74-bit entries in control queue FIFO 912. Control queue FIFO is a dual-port SRAM. As bursts of data flow into segmentation block 900 from lookup block 202 (see FIG. 10), the incoming data is stored in data SRAM block 908 whereas control information for the data is stored in control queue FIFO 912. There is a one-to-one correspondence between the 64-byte buffers in data SRAM 908 and the entries in control queue FIFO 912. Free buffer list block 905 stores a pointer that points to one pair of a 64-byte buffer in data SRAM 908 and its associated 74-bit entry in control queue FIFO 912. The pointer indicates whether the buffer is available or not.

One 74-bit entry in control queue FIFO 912 includes: 1) seven bits for the port ID, 2) four bits for the type of incoming traffic on the port, 3) one SOP bit which if set indicates the start of packet, 4) one EOP bit which if set indicates the end of packet, 5) one BAD bit which if set indicates an error condition and that the data should be discarded, 6) one CLP (Cell Loss Priority) bit which is valid only for ATM traffic, 7) one EFCI (Explicit Forced Congestion Indication) bit which is valid only for ATM traffic, 8) one OAM (Operation, Administration and Maintenance) bit, 9) one LAST AAL5 bit which if set indicates the last chunk of an AAL5 group of chunks, 10) one AAL5 TRAILER bit which indicates that the data in the current buffer has an associated trailer, 11) six "cell length" bits (also called "chunk length" bits) which indicate the number of valid bytes in the 64-byte chunk, 12) seven PTR bits which indicate the start address of the buffer in data SRAM 908, 13) three reserved bits, 14) twenty FID bits which indicate the flow ID of the incoming data on the port, 15) sixteen "packet length" bits which indicate number of bytes in the packet (only valid for packet traffic), and 16) three QOS (Quality Of Service) bits that indicate a quality of service.

Segmentation table and statistics SRAM block 907 actually includes two dual-port memories, a segmentation table memory and a statistics memory. For each input port, there is a 36-bit entry in the segmentation table memory that contains per port parameters. Each segmentation table entry includes: 1) one SOP bit which if set indicates a start of packet burst has been received for the port, 2) one EOP bit which if set indicates that an end of packet burst has been received for the port, 3) one BAD bit which if set indicates an error condition has been detected and that the associated data should be discarded, 4) seven PTR bits which indicate the start address of the associated 64-byte chunk in data SRAM 908, 5) the sixteen "packet length" bits which are used to keep track of the total number of bytes of the incoming packet that have been received on the port, 6) the six "cell length" bits (also called "chunk length" bits) which are used to keep track of the total number of bytes received for the associated 64-byte buffer in data SRAM 908, and 7) four reserved bits. The "cell length" value indicates how big the chunk is (in bytes) that is present in the associated 64-byte buffer. There are sixty-four such 36-bit entries, one for each of the sixty-four input ports.

For each input port, there is also an 80-bit entry in the statistics memory. Each statistics table entry includes: 1) a 32-bit "packet received" value which indicates the number of packets received on that port, and 2) a 48-bit "data received" value which indicates the number of bytes of data received on that port. There are sixty-four such entries, one for each input port.

Information coming into the MS-SAR is output from the incoming SPI interface block 201 in bursts. Each burst is a multiple of sixteen bytes. Some bursts can be longer than others. Each burst is received associated with one of the sixty-four possible input ports. The incoming SPI interface block 201 adds a start of burst (SOB) bit to the beginning of the burst, and adds an end of burst (EOB) bit to the end of the burst. The data of an MPLS packet or an ATM cell may be carried in multiple such bursts. Segmentation block 900 receives these bursts from lookup block 202. A burst from one input port can be followed by a burst from a different input port such that multiple bursts that comprise the data for one packet are received interspersed with intervening bursts for other packets.

In normal operation, if there is a 64-byte buffer available in data SRAM 908 to receive an incoming burst, then free buffer list block 905 outputs a seg_lut_rdy signal 918 to lookup block 202. Input phase state machine 904 waits for a lut_seg_valid signal 919 to be returned from the lookup block 202. The returned lut_seg_valid signal 919 indicates that there is valid control information and data information on the 64-bit bus 318 from lookup block 202. In this example, the lut_seg_valid signal 919 being asserted indicates that all signals whose signal names start with lut_seg are valid. Sixty-four bits of data are clocked in at once from lines lut_seg_data[63:0], the number of valid bytes in the sixty-four bits being indicated by lut_seg_byte_v[2:0].

As information is received from a given input port, the values in the segmentation table entry associated with the input port and values in the statistics table associated with the input port are updated. For example, as explained above, the segmentation table includes a six-bit "cell length" (also called "chunk length") field for storing the number of bytes in the chunk of data that is stored in the current 64-byte buffer in data SRAM 908. Because the data from multiple bursts can be placed into the current 64-byte buffer in data SRAM 908, and because traffic from other ports can be received onto the segmentation block 900 between these multiple bursts, segmentation block 900 keeps track of the segmentation table information and the statistics information between bursts. Accordingly, the first time a burst is received for a 64-byte buffer for a particular input port, input phase state machine 904 writes initial information into the entry in segmentation table memory. The SOP bit, for example, is set whereas the EOP bit is not. The "packet length" field and the "cell length" field are set to zero. If, on the other hand, a burst has already been received for that particular input port, then input phase state machine 904 reads the per-port parameters from the entries in the segmentation table memory 907 for that input port. Similarly, input phase state machine 904 reads the statistics in the statistics memory 907 for that input port. Input phase state machine 904 reads these values when the lut_seg_valid signal 919 is received from lookup block 202. More particularly, when the lut_seg_valid signal 919 is received from the lookup block 202, the input phase state machine 904: a) reads from the free buffer list SRAM block 905 to obtain a pointer to an available 64-byte buffer in data SRAM block 906, b) uses the port ID received from lookup block 202 to read segmentation table SRAM 907 to get the per-port parameters for that port, and c) uses the port ID received from lookup block 202 to read the statistics SRAM 907 to get the statistics for that port. The per-port parameters received from lookup block 202 with the burst are compared with those from segmentation table memory 907. Error conditions may be set. For example, if two consecutive SOP bursts are received without an intervening EOP burst, then an error has occurred. If an error condition is detected, then the BAD bit in the segmentation table SRAM entry is set to indicate that the associated data is bad and should be discarded.

In FIG. 57, input phase state machine 904 contains a signal labeled cur_xxx. This label represents many signals associated with the current burst. The label prv_xxx represents many signals associated with the previous burst. One of the current signals cur_xxx is the port ID associated with the current burst. This current port ID signal indicates the last port address processed. The port ID received from the bus 318 is compared to the current PID to see if the incoming burst is from the same port address. If so, then the data burst is a continuation to the one previously processed, and segmentation table and statistics information already in internal registers in input phase state machine 904 are used. The segmentation table and statistics SRAM 907 does not need to be accessed. If, on the other hand, the incoming burst is not from the same port, then the incoming data burst is for a new port ID and new segmentation table and statistics information is to be used. Segmentation table and statistics information for the last processed burst are therefore stored back into the segmentation table and statistics memory 907 before similar information for port of the new burst is loaded into the registers in the input phase state machine 904. There are three sets of internal registers (not shown) in input phase state machine 904 that store three sets of per-port segmentation table and statistics information: one for the last processed port (i.e. the current parameters); one for the port from lookup block 202 that comes with the valid signal; and one for the previously serviced port that needs to be written back to the segmentation and statistics memory 907.

There are two statistics counters in the input phase state machine 904, one that counts the number of packets received on the current port (32-bit "packet received" value) and one that counts the number of bytes received on the current port (48-bit "data received" value). The outputs of these counters are kept in the statistics memory 907 on a per port basis. The running count of bytes received and the number of packets received continue to accumulate and may roll over. The CPU of the router can read the two values at two different times, take the differences between the values at the two times, and thereby calculate how much traffic is being received on each port. The CPU reads these values via the CPU interface 913.

There is at most one segmentation process going on per port. Incoming burst data for a port is accumulated into a corresponding one of the 64-byte buffers in data SRAM 908. The maximum amount of data that can be stored in the 64-byte buffer (either 48, 56, or 64 bytes) is determined by the application type of the flow. The 64-byte format is used for packet data. The 48-byte format is used for AAL5 ATM data. The 56-byte format is used for non-AAL5 ATM data. Control information for the data in a 64-byte buffer is queued into a location in queue FIFO 912 that corresponds to the particular 64-byte buffer. Segmentation table and statistics information is written back to the segmentation table and statistics memory 907. Input phase state machine 904 contains a six-bit data byte counter (not shown) that increments the six-bit "cell length" (also called the "chunk length") count value (stored in segmentation table memory 907) upon receiving each incoming data byte for a 64-byte buffer. When the number of bytes in the 64-byte buffer reaches the maximum amount allowed by the format used, then the data in the 64-byte buffer is ready for transfer to memory manager block 204.

Input phase state machine block 904 also contains a 16-bit packet length counter that counts the number bytes in the current packet. The output of this packet length counter is the "packet length" field in the queue FIFO entry. This counter continues counting bytes until the EOP is reached. The output of this counter is incorporated into the AAL5 trailer if such a trailer is to be added.

Segmentation block 900 handles the alignment of data to 64-bit bus 318 (see FIG. 10) in the situation where lookup block 202 adds a L2 special header that does not line up with a 64-bit boundary. Align pipe block 903 is a pipeline used to align control information (including port ID (PID) and flow ID (FID)) so that the control information lines up with the 64-bits of data passing through the L2 align block 901. Block 902 is not used to calculate a CRC for an AAL5 trailer. Rather, block 902 is used only to calculate the CRC-32 for an L2 header in the special case where a packet is being broken up into multiple AAL5 cells that are being output in the egress mode. In such a case, the CRC bytes in the L2 header are replaced by new CRC bytes calculated by L2 CRC generator 902. If no L2 header modification is to be performed, then the data passes to the input phase state machine 904 via a bypass path such that no alignment is performed.

Free Buffer List block 905 is an 80×7 bit dual port internal SRAM. After power on reset, the CPU initializes the free buffer list using a CPU command called the "Init FBL" command. There are multiple CPU commands. The CPU can cause a CPU command to be performed writing a command opcode for a particular CPU command into a command register in CPU interface block 913. CPU interface block 913 involves a state machine that then carries out the command indicated by the opcode. There are commands by which the CPU can write information into any location in any of the memories within segmentation block 900 and there are commands by which the CPU can read any location in any of the memories within segmentation block 900. In the case of the "Init FBL" opcode, execution of the command takes approximately eighty cycles of the 200 MHz clock. No data passes through the segmentation block 900 until the initialization is completed.

CRC generator block 909 generates the CRC that covers the PDU (Protocol Data Unit) in the AAL5 format. CRC generator block 909 actually includes two CRC generators, one CRC-32 engine for 64-bit wide data input, and one CRC-32 engine for 32-bit wide data input. The CRC generator block 909 uses the port ID to read a partial CRC from CRC SRAM block 910. CRC SRAM 910 is a 65×32 bit dual-port SRAM that stores a partial CRC for each port. The partial CRC is loaded into the CRC-32 engine for 64-bit wide data and the CRC-32 engine for 64-bit wide data calculates the CRC as the data is output to memory manager block 204. All the data up to the AAL5 trailer is passed through this CRC-32 engine for 64-bit wide data input. The partial CRC output by this CRC-32 engine is then loaded into the second CRC engine for 32-bit wide data input. Then the four most significant bytes of the AAL5 trailer are sent through the CRC-32 engine for 32-bit wide data (two of these bytes are the packet length determined by the packet length counter of the input phase state machine block 904). The resulting CRC output by the CRC-32 engine for 32-bit wide data is then the final CRC for the AAL5 trailer. At the end of a packet, the final CRC is multiplexed out by multiplexer 920 to be the last four bytes of the AAL5 trailer.

Output phase state machine block 911 sends a seg_mem_available signal 921 to memory manager block 204 to indicate that a completed 64-byte buffer is available to transfer. Memory manager block 204 replies with the mem_seg_ctrl_pop signal 922 if it is ready to receive the completed 64-byte buffer. When the mem_seg_ctrl_pop signal is received from memory manager block 204, the output phase state machine block 911 reads control queue FIFO 912 for the control information entry for the available 64-byte buffer, reads the appropriate 64-byte buffer from data SRAM 908, and transmits the data from the 64-byte buffer along with the control information to memory manager block 204. Data SRAM 908 is sixty-four bits wide. Individual words of data pass via lines 923, through multiplexer 924, and to pack 128 block 916. Pack 128 block 916 converts two consecutive 64-bit words into one 128-bit word. The 128-bit word is then passed to memory manager block 204 via lines seg_mem_data[127:0]. There are eight time slots of the global 200 MHz clock that clocks the MS-SAR, the current time slot being indicated by a value timeslot[2:0] received via lines 925 from a timeslot generator. The output phase state machine block 911 only outputs information to memory manager block 204 in one predetermined time slot. Memory manager block 204 reads the data from a 64-byte buffer in four consecutive reads of the 128-bit bus.

As set forth above in connection with FIG. 53, egress MS-SAR 603 can serially communicate with the segmentation block of an ingress MS-SAR 608 via a serial bus 609 such that the ingress MS-SAR 608 is made to transmit a status cell 611 through the switch fabric 610. The lines pfq_seg_valid, pfq_seg_clk, and pfq_seg_data[2:0] are the serial bus 609 signals. PFQ_SEG interface block 914 receives a twelve-bit status cell in serial fashion via this serial bus. When a status cell is pending in the PFQ_SEG interface block 914, the PFQ_SEG interface block 914 generates a request to output phase state machine block 911. Output phase state machine block 911 then receives the status cell via lines 926 and transmits the status cell using one of the regular port accesses. The transmission of a status cell takes priority over the transmission of other 64-byte chunks to the memory manager block 204.

As seen in FIG. 53, status cell information received by egress MS-SAR 606 is communicated to ingress MS-SAR 604 via serial bus 607. In FIG. 57, SEG_SCH interface block 915 monitors the lut_seg_type[3:0] lines. If the type is "type 7" when lut_seg_valid signal 919 is asserted, then a status cell is present. The SEG_SCH interface block 915 reads the status cell via lut_seg_data[63:0], serializes the information, and outputs it as a twelve-bit value via the seg_sch_data[2:0] and seg_sch_valid lines. These lines and the seg_sch_clk clock line comprise the serial bus 607 that extends to the scheduler block of ingress MS-SAR 604.

The CPU can also inject a 64-byte chunk of information. The CPU does this via CPU interface block 913 and a "CPU inject" command. If CPU interface block 913 contains a 64-byte chunk of information that is ready for forwarding to memory manager block 204, then output phase state machine block 911 will output that 64-byte chunk provided there is no status cell pending. The output phase state machine block 911 will only output one CPU-injected chunk once in every sixty-four forwarded 64-byte chunks. When output phase state machine block 911 finishes outputting a 64-byte chunk to memory manager block 204, it returns the pointer to the buffer where the chunk was stored to the free buffer list block 905 via fbl_wr and fbl_addr lines 927.

The SEG_TST multiplexer block 917 is provided for test purposes. It multiplexes one of many test points within the segmentation block 203 onto test terminals (test pins) of the MS-SAR integrated circuit.

Figures 58, 58A, 58B:
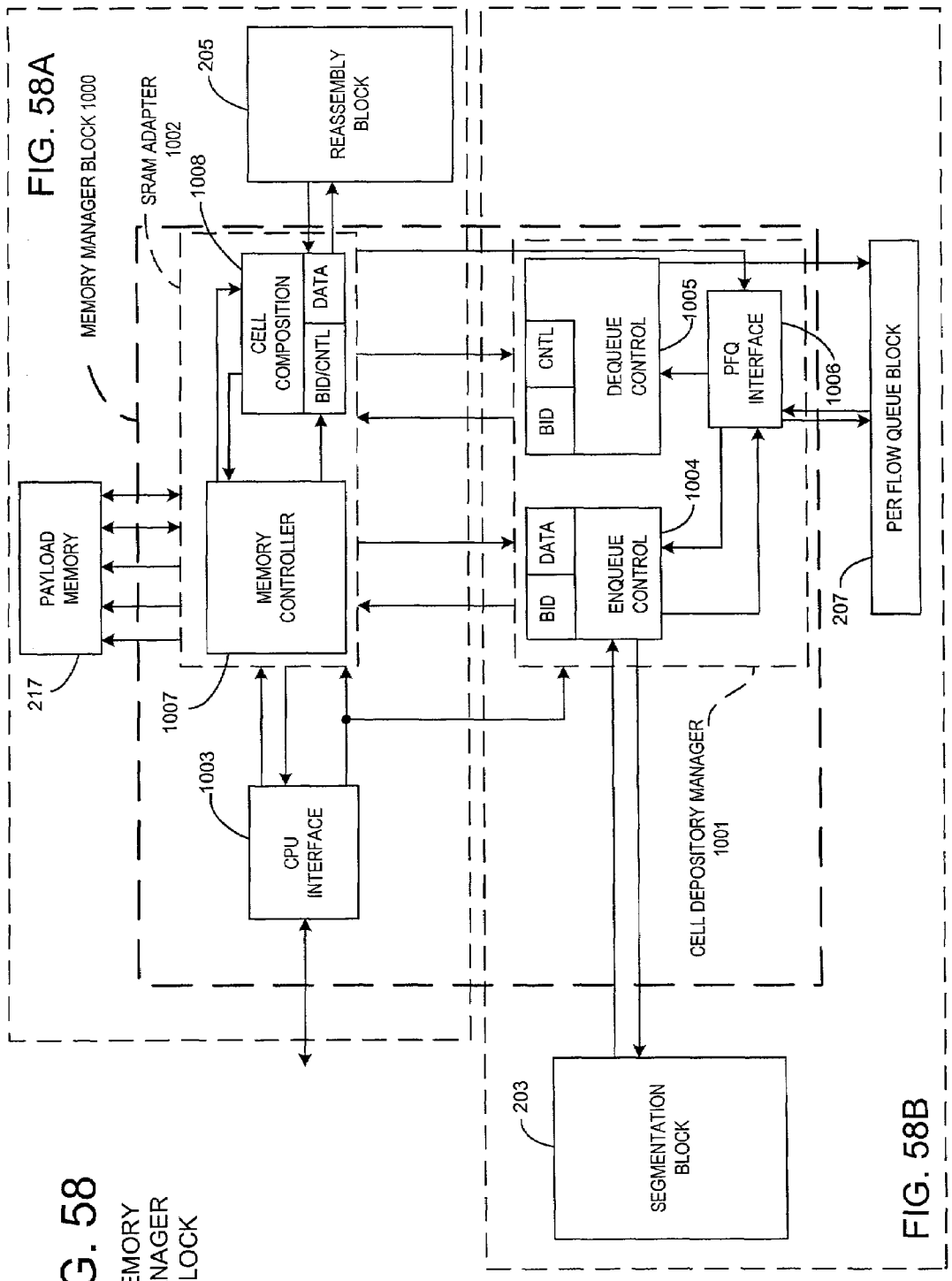
FIG. 58 is a block diagram of one particular embodiment of memory manager block 204 of FIG. 10.
FIGS. 58A and 58B together form a more detailed version of FIG. 58.
Figure 58A:
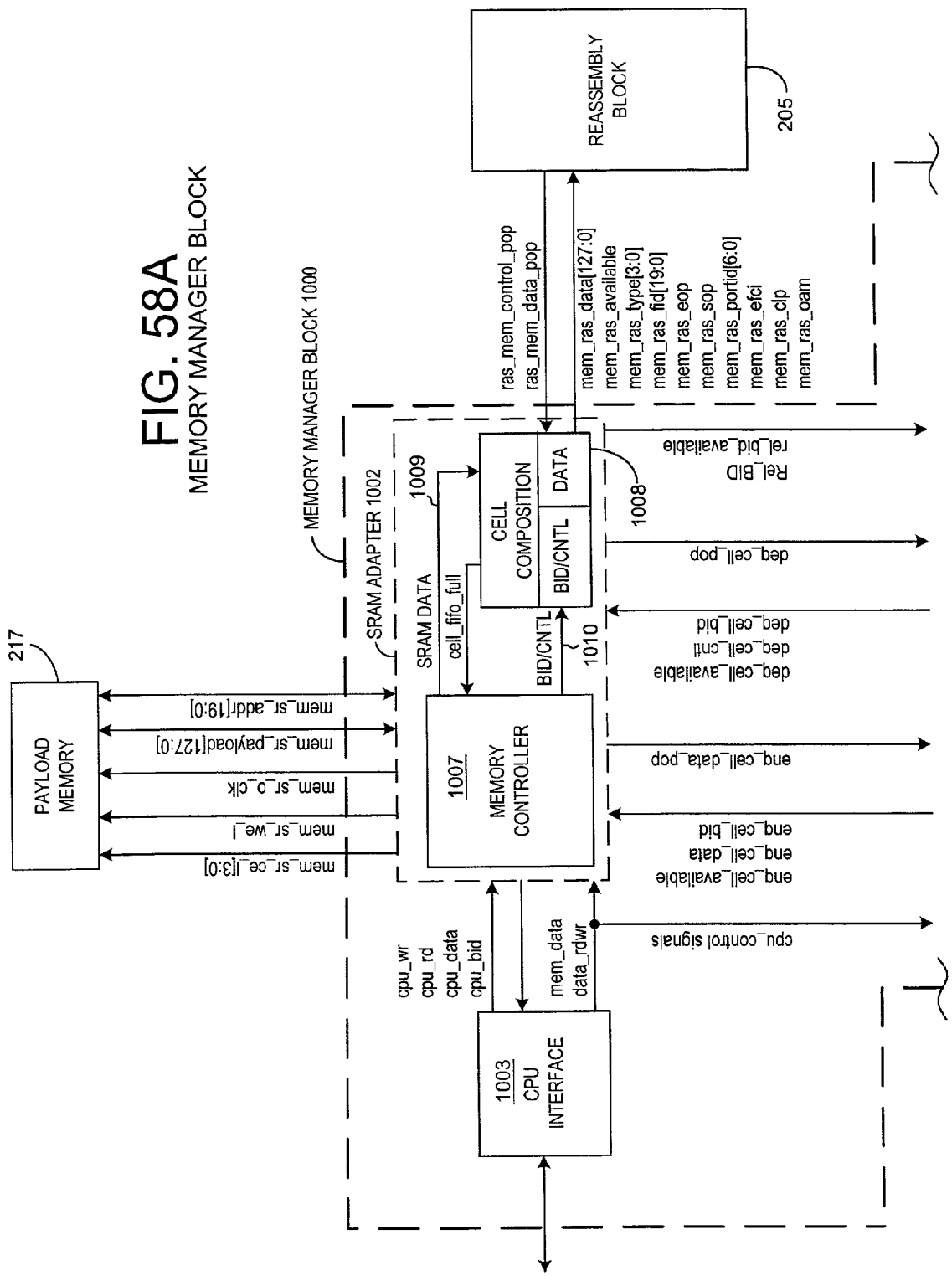
Figure 58B:
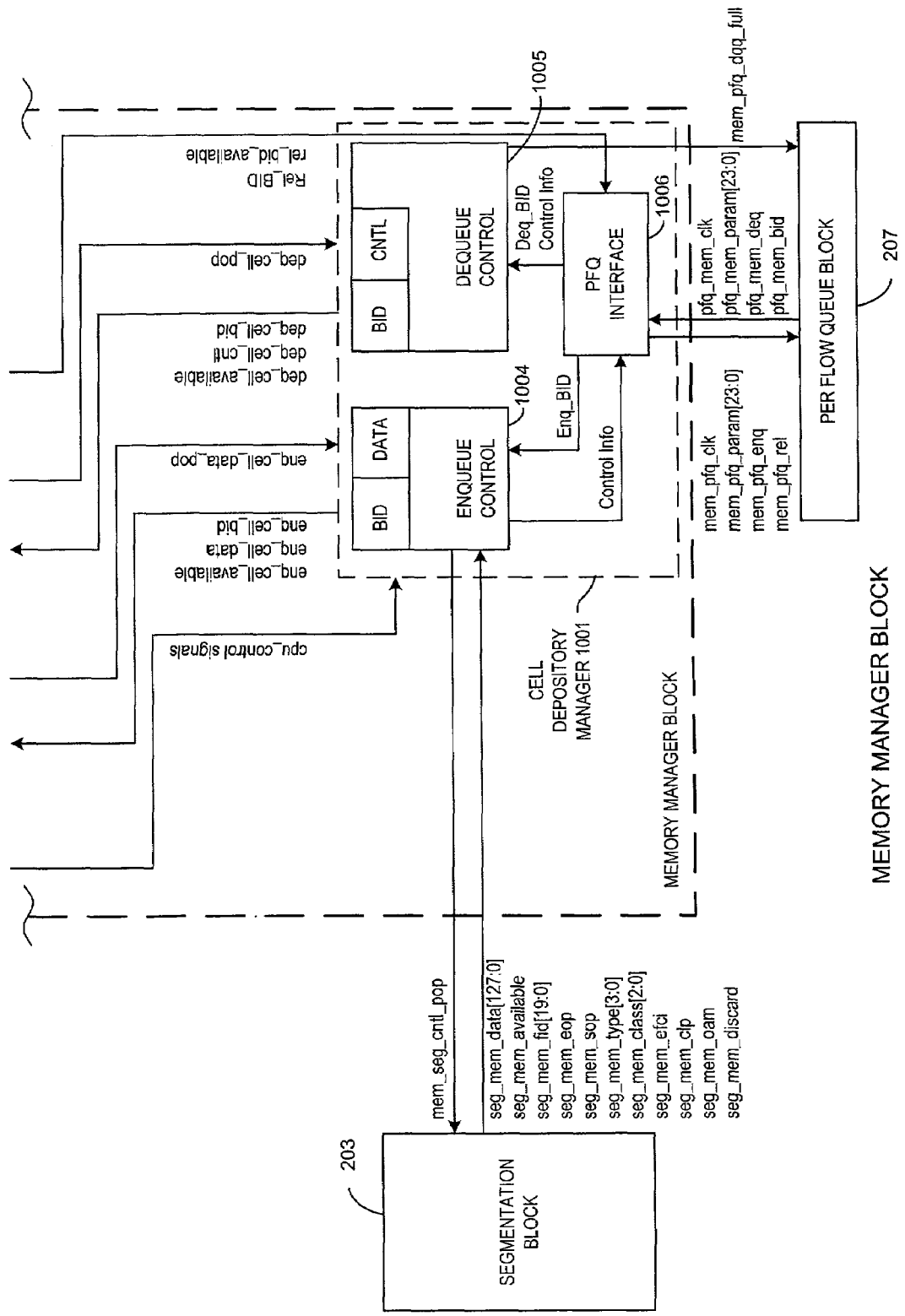
Figure 59A:
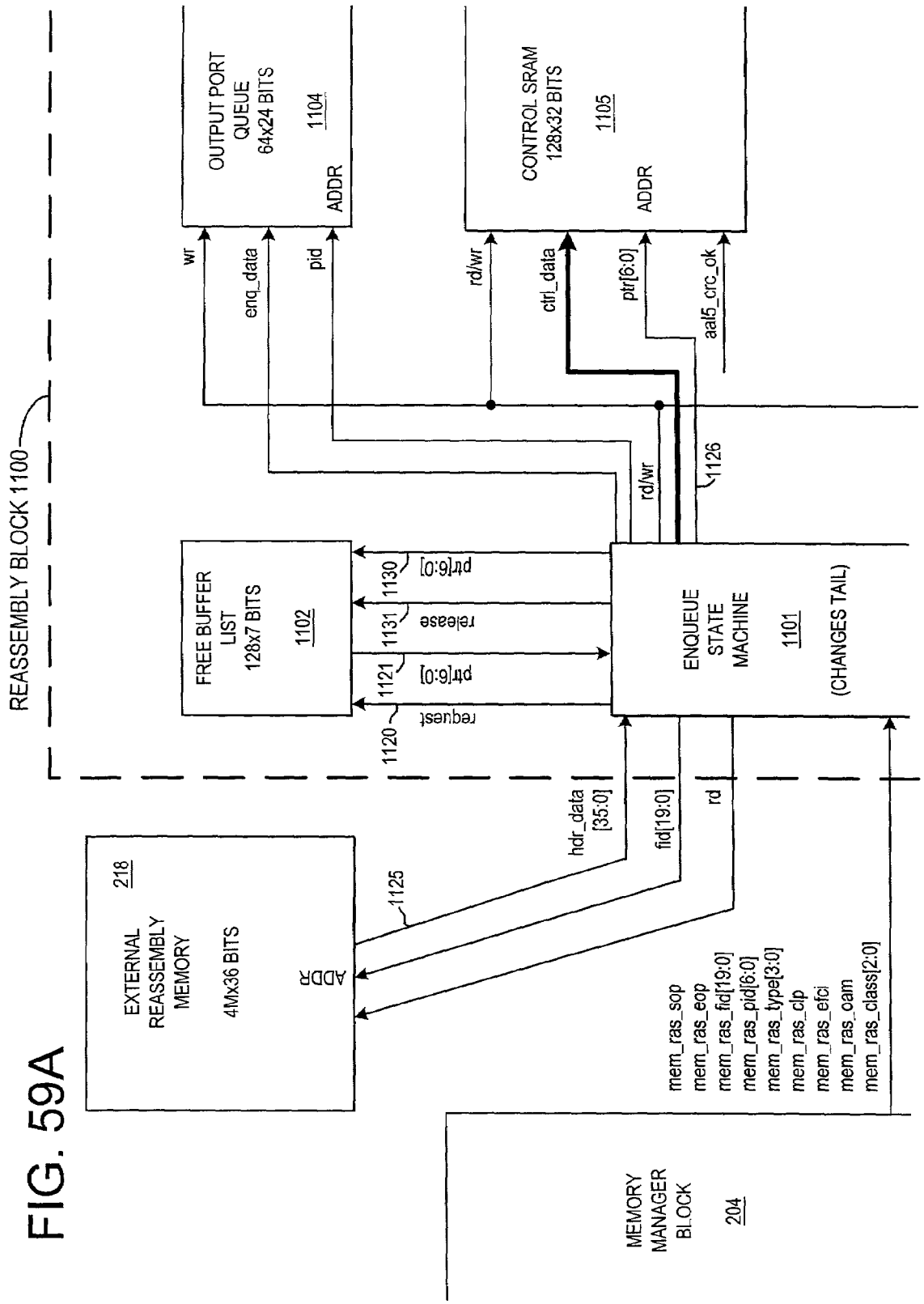
FIGS. 59A–59D together form a more detailed version of FIG. 59.
Figure 59B:
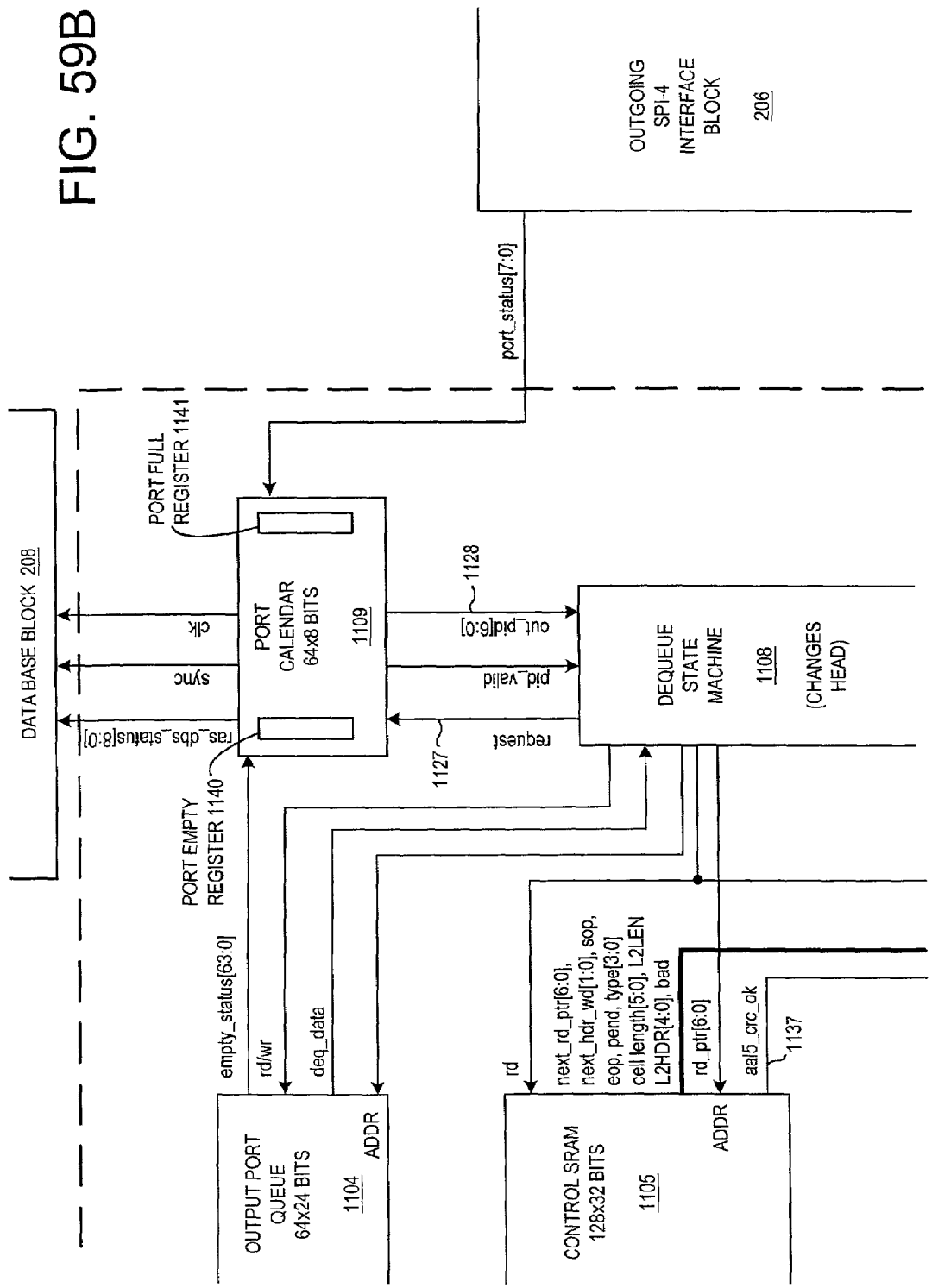
Figure 59C:
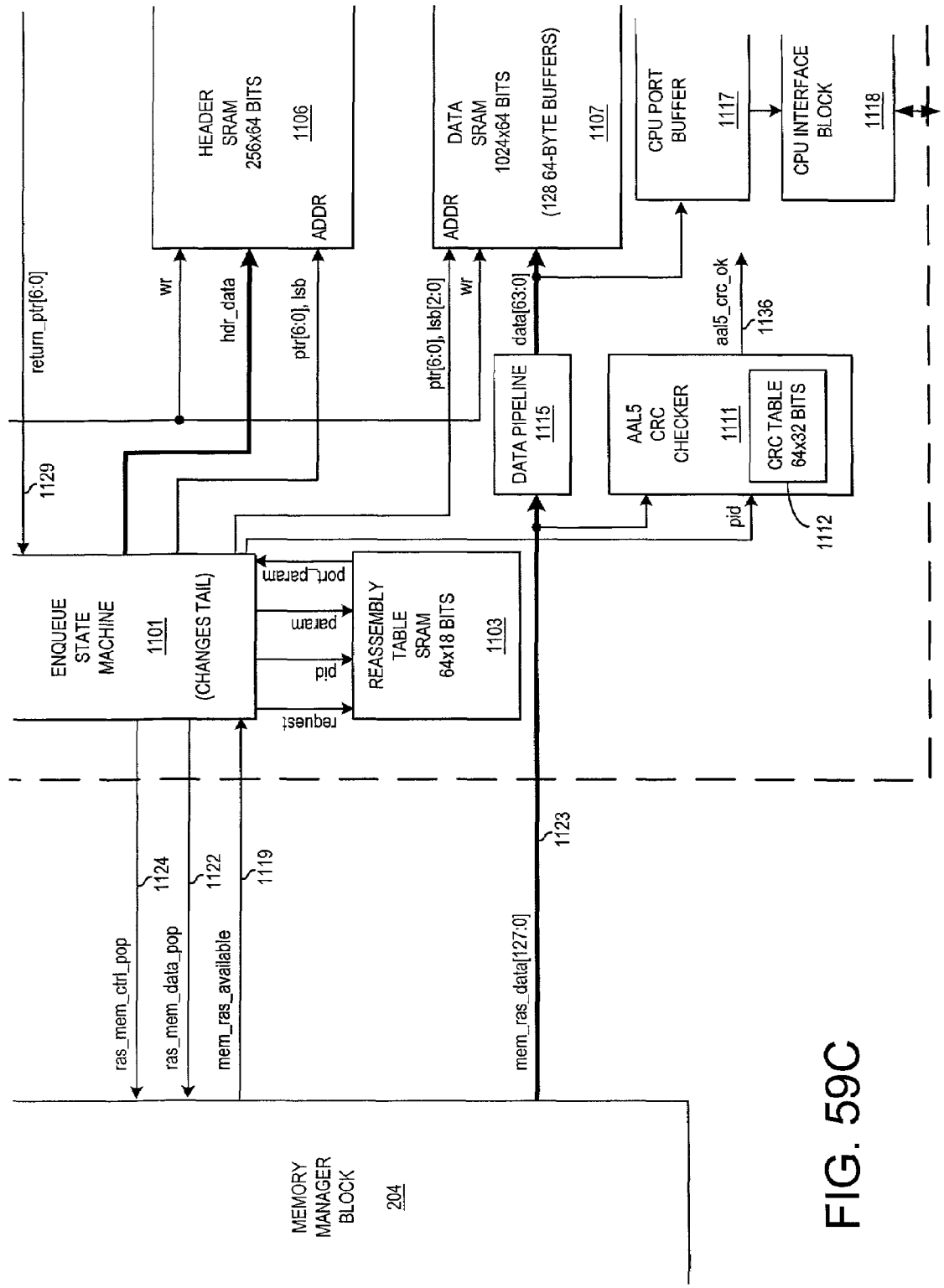
Figure 59D:
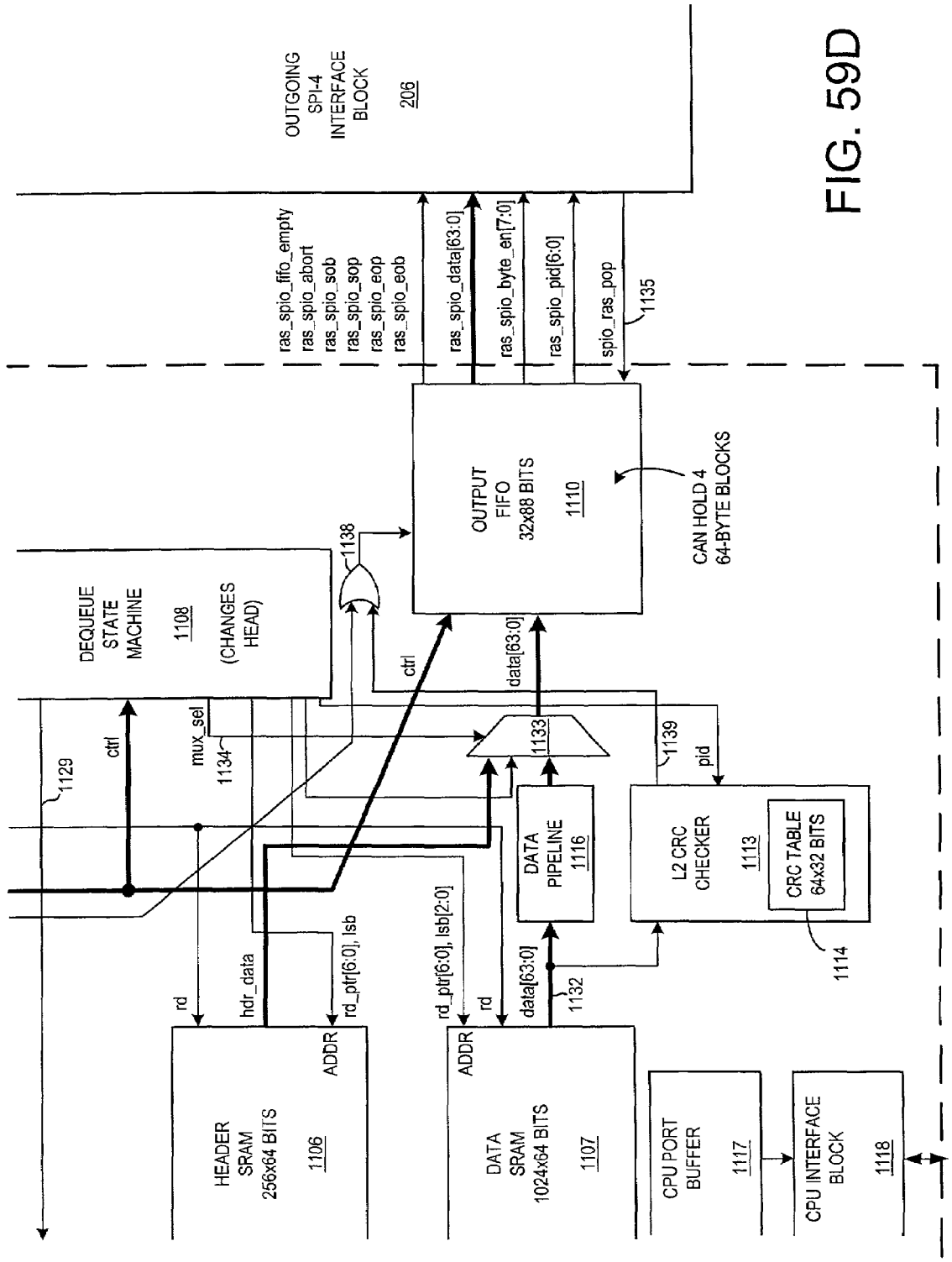

Memory Manager Block in More Detail:

FIG. 58 is a simplified block diagram of one particular embodiment 1000 of memory manager block 204 of FIG. 10. Memory manager block 1000 includes a cell depository manager block 1001, an SRAM adapter block 1002, and a CPU interface block 1003. Cell depository manager block 1001 includes an enqueue control block 1004, a dequeue control block 1005, and a per flow queue interface block 1006. SRAM adapter block 1002 includes a memory controller block 1007 and a cell composition block 1008.

When a 64-byte chunk is ready to be transferred from segmentation block 203 to payload memory 217, segmentation block 203 asserts a SEG_MEM_AVAILABLE signal to enqueue control block 1004. When enqueue control block 1004 detects the SEG_MEM_AVAILBLE asserted, it asserts the MEM_SEG_CNTL_POP signal back to segmentation block 203 in a predetermined time slot. Segmentation block 203 then sends control information including SEG_MEM_FID[19:0], SEG_MEM_TYPE[3:0], SEG_MEM_CLASS[2:0], SEG_MEM_EOP, and SEG_MEM_SOP, to enqueue control block 1004. Segmentation block 203 then sends sixty-four bytes of data to enqueue control block 1004 as four 128-bit transfers over SEG_MEM_DATA[127:0]. These four transfers occur in four predetermined time slots. The data is pushed onto a 128-bit by 64-bit deep data FIFO in enqueue control block 1004. The control information is formed into a control word which is supplied to per flow queue block 207 via per flow queue interface block 1006. Per flow queue interface block 1006 manages the passing of the control info from the clock domain of memory manager block 1000 to the clock domain of per flow queue block 207. The control information is passed via lines MEM_PFQ_PARAM[23:0] along with an enqueue request signal via line MEM_PFQ_ENQ.

Per flow queue block 207 returns a 20-bit buffer ID BID[19:0] via lines PFQ_MEM_PARAM[23:0]. The buffer ID indicates which 64-byte buffer in payload memory 217 will be used to store the 64-bytes of data. PFQ_MEM_DEQ indicates that the BID is being supplied as an enqueue command and not as a dequeue command. BID[19:0] passes via per flow queue interface block 1006 to enqueue control block 1004 where it is pushed onto a BID FIFO. The BID FIFO is twenty bits wide and sixteen bits deep. Each location in the BID FIFO is associated with four corresponding locations in the data FIFO where the corresponding data is stored. When a BID is present in the BID FIFO, enqueue control block 1004 asserts an available signal via an ENQ_CELL_AVAILABLE line to SRAM adapter block 1002. SRAM adapter block 1002 responds by popping the data FIFO four times and the BID FIFO once via line ENQ_CELL_DATA_POP such that the BID and associated data are transferred to memory controller block 1007. Memory controller block 1007 writes to payload memory 217 four times to store the sixty-four bytes of data into payload memory 217 starting at the location identified by BID[19:0]. In this embodiment, there is only port for interfacing to external memory 217. Memory manager block 1007 manages transferring the 64-byte chunk of data in multiple accesses to external memory 217 via this single port.

Although in this embodiment external memory 217 is ZBT (zero bus turnaround) SRAM, external memory 217 may in other embodiments be another type of memory such as, for example, DRAM. In some embodiments, bandwidth to external memory 217 is increased by realizing external memory 217 in multiple integrated circuit memory devices, where each is accessed via a different one of a plurality of interface ports controlled by the same memory controller block 1007. Memory controller 1007 in FIG. 58 is programmable to interface with pipelined memory. In one such embodiment, the four memory locations where a chunk of data is stored are read in sequence. Although the reading of the first of the four locations requires multiple clock cycles, pipelining is employed such that the other of the four locations are read, one location on each subsequent clock cycle.

After the 64-byte chunk of data is stored in a 64-byte buffer identified by BID[19:0], the 64-byte chunk is retrieved in response to a dequeue command. In a dequeue command, per flow queue block 207 sends a buffer ID BID[19:0] and associated control information to per flow queue interface block 1006 via lines PFQ_MEM_PARAM [23:0]. BID[19:0] indicates where in external memory 217 the data chunk is stored. The PFQ_MEM_DEQ signal is asserted to indicate the BID is supplied as part of a dequeue command. Per flow queue interface block 1006 pushes the BID[19:0] into a BID FIFO in dequeue control block 1005 and the control information into a control FIFO in dequeue control block 1005. Dequeue control block 1005 sends an available signal to memory controller block 1007 via the DEQ_CELL_AVAILABLE line. Memory controller block 1007 responds by popping the BID and control FIFOs in dequeue control block 1005 using the DEQ_CELL_POP signal. Memory controller block 1007 then uses the BID [19:0] to retrieve the identified 64-byte chunk from external memory 217.

The retrieved data is passed to cell composition block 1008 via SRAM data line 1009 whereas the associated control information is passed to cell composition block 1008 via BID/CNTL line 1010. Cell composition block 1008 realigns the control information and the associated data such that the control information and BID are stored at location in a BID/control FIFO that corresponds with four locations in a data FIFO where the data is stored. When corresponding locations in the BID/control FIFO and the data FIFO are loaded, cell composition block 1008 sends an available signal to reassembly block 205 via the MEM_RAS_AVAILABLE line. Reassembly block 205 responds by asserting a RAS_MEM_CONTROL_POP signal to pop the BID and control information from the BID/control FIFO and by asserting a RAS_MEM_DATA_POP signal four times to pop the data from the data FIFO.

The CPU can read or write any one of the 64-byte buffers in external memory 217 via CPU interface block 1003. CPU interface block 1003 contains sixteen 32-bit data registers and one 32-bit command register. Several bits in the command register indicate an opcode, whereas other bits indicate an address. For example, to write to a 64-byte buffer, the CPU writes the sixteen bytes of data into the sixteen 32-bit data registers. The CPU then writes to the command register, the opcode portion of the command register indicating a buffer write operation, the address portion of the command register indicating the BID of the buffer. Once the command register is written, CPU interface block 1003 reads the command register and executes the command. In the case of the write buffer command, the data from the sixteen data registers is written into external memory 217 by memory controller block 1107. CPU interface block 1003 also includes a memory manager configuration register. The CPU can configure memory manager block 1000 in one of numerous ways by writing a configuration word into this configuration register. In one specific embodiment, the configuration register contains: 1) a first multi-bit value which indicates how chip selects to the external memory 217 are to be generated, and 2) a second multi-bit value which indicates an access time of the external memories used to implement payload memory 217.

Reassembly Block in More Detail:

FIG. 59 is a simplified block diagram of one particular embodiment 1100 of reassembly block 205 of FIG. 10. Reassembly block 1100 includes an enqueue state machine block 1101, a free buffer list block 1102, a reassembly table SRAM block 1103, an output port queue block 1104, a control SRAM block 1105, an header SRAM block 1106, a data SRAM block 1107, a dequeue state machine block 1108, a port calendar block 1109, an output FIFO block 1110, an AAL5 CRC checker block 1111 containing a CRC table 1112, an L2 CRC checker block 1113 containing a CRC table 1114, a first data pipeline block 1115, a second data pipeline block 1116, a CPU port buffer block 1117, and a CPU interface block 1118.

In operation, 64-byte chunks and associated control information are received from memory manager block 204 via 128-bit bus 324 (see FIG. 10). Each 64-byte chunk is destined for one of sixty-four possible output ports. The particular output port is identified by an output port ID (PID) received via MEM_RAS_PID[6:0] lines from memory manager block 204. Reassembly block 1100 includes a dual-port SRAM that contains one hundred and twenty-eight 64-byte buffers for storing 64-byte chunks. There is a queue (i.e., a linked list) of pointers to these 64-byte buffers in the reassembly block for each of the active output ports. A 64-byte chunk of data received from memory manager block 204 is stored in a 64-byte buffer and a pointer to the buffer is pushed onto the queue for the particular output port. The output port is designated by MEM_RAS_PID[6:0] for that 64-byte chunk. The flow ID (FID) of the 64-byte chunk is used to lookup header information from header table 327 (see FIG. 10) stored in external reassembly memory 218 (see FIG. 59). The retrieved header information for the 64-byte chunk is stored in a location in header SRAM 1106 that is also pointed to by the same pointer. In this way, pointers to the 64-byte chunks and the associated header information are stored in reassembly block 1100 in per-port queues. Enqueue state machine 1101 handles the enqueueing operation. Dequeue state machine 1108 then pops a selected per-port queue to retrieve a pointer, reads the 64-byte chunk and the header information pointed to by the popped pointer, does processing on the 64-byte chunk in accordance with the application type of the 64-byte chunk, and pushes the processed 64-byte chunk onto output FIFO 1110. The particular per-port queue popped is determined by port calendar 1109. Outgoing SPI-4 interface block 206 pops output FIFO 1110 and the processed information is transferred to outgoing SPI-4 interface block 206.

More detailed operation of reassembly block 1100 of FIG. 59 is now described. Memory manager block 204 contains a first FIFO for storing 64-byte chunks of data. Memory manager block 204 also contains a second FIFO for storing control information associated with the 64-byte chunks of data in the first FIFO. The control information includes an SOP bit, an EOP bit, a twenty-bit flow ID (FID), a seven-bit output port ID (PID), a four-bit application type (TYPE), a CLP bit, an EFCI bit, an OAM bit, and a three-bit CLASS. If such a 64-byte chunk is available in memory manager block 204, then memory manager block 204 sends an available signal to enqueue state machine 1101 via the MEM_RAS_AVAILABLE line 1119. Enqueue state machine 1101 requests a pointer to a free 64-byte buffer via request line 1120. Free buffer list block 1102 returns a pointer to enqueue state machine 1101 via PTR[6:0] lines 1121. This pointer points to one of 128 buffers in data SRAM 1107, and also points to one of 128 pairs of locations in header SRAM block 1106, and also points to one of 128 locations in control SRAM 1105. The 64-byte buffer pointed to is "free" in that it is not used by any queue (i.e., is free).

Once enqueue state machine 1101 has a pointer to a free buffer, it sends a pop signal to memory manager block 204 to pop the FIFO containing the data via RAS_MEM_DATA_POP line 1122. A 64-byte chunk then passes via MEM_RAS_DATA[127:0] lines 1123 and data pipeline 1115 and into data SRAM block 1107 to be stored at the location indicated by the pointer. Enqueue state machine block 1101 sends a pop signal to memory manager block 204 to pop the FIFO containing the associated control information via RAS_MEM_CTRL_POP line 1124. Control information associated with the 64-byte block then passes to enqueue state machine block 1101 via lines MEM_RAS_SOP, MEM_RAS_EOP, MEM_RAS_FID[19:0], MEM_RAS_PID[6:0], MEM_RAS_TYPE[3:0], MEM_RAS_CLP, MEM_RAS_EFCI, MEM_RAS_OAM, and MEM_RAS_CLASS[2:0]. MEM_RAS_PID[6:0] designates the output port. MEM_RAS_TYPE[3:0] designates the application type to be performed on the chunk. MEM_RAS FID[19:0] designates the flow ID of the chunk.

Enqueue state machine block 1101 uses the flow ID to read the associated FID entry in the header table stored in external reassembly memory 218. FIG. 33 illustrates one such FID entry. The FID entry is read by enqueue state machine block 1101 via HDR_DATA[35:0] lines 1125 and is stored in header SRAM 1106 at a pair of locations pointed to by the pointer PTR[6:0]. Enqueue state machine block 1101 stores the control information for the chunk in a location in control SRAM 1105 pointed to by the pointer. The same pointer PTR[6:0] on lines 1126 points to the eight 64-bit locations in data SRAM 1107 that hold the 64-bytes of data, points to the two 256-bit locations in header SRAM 1106 that stores the FID entry, and points to the one 32-bit location in control SRAM 1105 that stores the control information.

Packet information, regardless of its length, is segmented and stored by the MS-SAR in 64-byte chunks as explained above. By convention, an indication of the length of the packet (in terms of number of valid bytes) is stored in a trailer at the end of the last 64-byte chunk. Accordingly, the last 64-byte chunk of such a packet could contain a little bit of data, followed by padding, and followed by the trailer. Where reassembly block 1100 is to remove the padding, the reassembly block 1100 must know how much padding there is. Reassembly block 1100 therefore maintains a "running packet length" count of the total number of bytes (the count includes valid data bytes, as well as any padding and the trailer) received for a packet, from 64-byte chunk to 64-byte chunk, up to and including the last chunk of the packet that has its EOP bit set. The "running packet length" count at the end of the last 64-byte chunk (the last chunk is the chunk with its EOP set) is the number of bytes in the packet. The number of bytes of padding is determined by recovering the packet length value (number of valid data bytes in the packet) from the trailer (the trailer by convention is at the end of the last 64-byte chunk), and subtracting this number of valid data bytes from the "running packet length" count, and then also subtracting the number of bytes of the trailer (the number of bytes of the trailer is a known and fixed number). Accordingly, reassembly block 1100 maintains one such 16-bit "running packet length" byte count for each of the 64 possible output ports. These 16-bit running packet length count values are stored in reassembly table SRAM 1103 on a per port bases. Before the data of a chunk is written to data SRAM 1107, enqueue state machine block 1101 uses the PID of the 64-byte chunk to read the 16-bit running "packet length" partial byte count from reassembly table SRAM 1103. It adds to this count in accordance with how many bytes (including any padding or trailer) there are in the current 64-byte chunk, and then before the next 64-byte chunk is read from memory manager block 204 writes the updated running "packet length" byte count value back into reassembly table 1103 at the location designated by the PID.

The per-port queues are maintained using entries in control SRAM 1105. Each 32-bit entry in control SRAM 1105 contains the following fields: 1) a one-bit PEND field, 2) a four-bit TYPE field which indicates the application type (type of processing to be done on the associated chunk), 3) a six-bit "cell length" field that indicates the number of valid data bytes in the associated 64-byte chunk, 4) an L2EN bit which indicates L2 header stripping and CRC checking is enabled, 5) an L2HDR bit which indicates the number of L2 header bytes to be stripped, 6) one BAD bit which indicates an error condition has occurred, 7) one SOP bit, 8) one EOP bit, 9) a seven-bit NEXT RD_PTR field which indicates a pointer to where the next 64-byte chunk in the per-port queue is stored in the reassembly block, 10) a two-bit NEXT HDR_WD field which indicates the number of header bytes for the next 64-byte chunk, and 11) a three-bit MPLS field which indicates what kind of MPLS operation that the reassembly block is to perform. By the use of the NEXT RD_PTR, the entry for one pointer can be made to point to another entry.

Output port queue block 1104 contains sixty-four 24-bit entries, one entry being for each output port. Each entry contains the following fields: 1) one EOP bit, 2) a seven-bit RD_PTR (head pointer) field that indicates where on the reassembly block the 64-byte chunk at the head of the per-port queue is stored, 3) a seven-bit WR_PTR (tail pointer) field that indicates where on the reassembly block the 64-byte chunk at the tail of the per-port queue is stored, 4) one empty status bit which indicates if there are no 64-byte chunks queued for that port, 5) one PEND bit which indicates if a 64-byte chunk is waiting to be queued to the output port, and 6) two HDR_WDS bits which indicate the number of header words for the next 64-byte chunk for that port to be sent to the outgoing SPI-4 interface block.

It is therefore seen that output port queue block 1104 stores, for each per-port queue, a head pointer that points to the head entry in control SRAM 1105 and a tail pointer that points to the tail entry in control SRAM 1105. If the empty bit in an output port queue is set, then the queue is empty. If the head pointer and the tail pointer are the same, then there is only one entry in the queue. If the head pointer points to an entry, the NEXT RD_PTR field of which points to the tail pointer, then there are two entries in the queue. To add a third pointer to a queue, the entry in control SRAM 1105 pointed to by the queue's tail pointer is modified so that its NEXT RD_PTR field points to the entry pointed to by the new third pointer. The tail pointer field for that port in output port queue block 1104 is then changed to be the new third pointer. A 64-byte chunk received from memory manager block 204 is therefore said to be "pushed" onto a per-port queue when the 64-byte chunk is stored in data SRAM 1107 and a pointer to the stored chunk becomes the new tail pointer.

Port calendar 1109 identifies an output port as explained above in connection with FIG. 24. Dequeue state machine 1108 sends a request to port calendar block 1109 via request line 1127 and port calendar 1109 responds by identifying an output port via OUT_PID[6:0] lines 1128. Dequeue state machine block 1108 then pops the per-port queue for that identified output port. It does this by reading the entry for that port in output port queue block 1104, retrieving the head pointer, and then using the head pointer to read: 1) the pointed to 64-byte chunk from data SRAM 1107, 2) the pointed to header information from header SRAM 1106, and 3) the pointed to control information from control SRAM block 1105. The popped head pointer is no longer the head pointer. Rather, the pointer to the next 64-byte block identified by the NEXT RD_PTR field in the control SRAM block 1105 is written into the entry in output port queue block 1104 to be the new head pointer. The old head pointer is communicated to enqueue state machine 1101 via RETURN PTR[6:0] lines 1129. Enqueue state machine 1101 causes this pointer to be "released" (i.e., be indicated as "free") by sending the pointer to free buffer list block 1102 via PTR[6:0] lines 1130 along with a release signal via RELEASE line 1131. The 64-byte chunk of data passes from data SRAM block 1107 via lines 1132, through data pipeline 1116, through multiplexer 1133, and into output FIFO 1110. Output FIFO 1110 is big enough to hold four 64-byte chunks at one time. The header for the 64-byte chunk that is stored in header SRAM 1106 is multiplexed via multiplexer 1133 into the output FIFO so as to be in the appropriate place with respect to the data. Dequeue state machine block 1108 controls multiplexer 1133 via HDR_SEL line 1134. Processing in accordance with the application type indicated by the value TYPE[3:0] read out of control SRAM 1105 is carried out. Which bytes in the 64-byte chunk are padding are indicated by an eight-bit value stored in output FIFO 1110 with each 64-byte chunk. There is one bit in this value RAS_SPIO_BYTE_EN[7:0] for each byte in the 64-byte chunk. Outgoing SPI-4 interface block 206 pops the output FIFO 1110 via line SPIO_RAS_POP. Any byte of the received data on lines RAS_SPIO_DATA[63:0] for which the corresponding bit in RAS_SPIO_BYTE_EN[7:0] is not set is not read into outgoing SPI-4 interface block 206. The byte of padding is therefore effectively removed.

There are two CRC blocks: 1) enqueue CRC generator block 1111 that generates the CRC for the AAL5 format, and 2) dequeue CRC generator block 1113 that generates the CRC for the L2 format. The polynomial used is CRC-32. There is a minimum of one clock delay in generating the CRC because the internal data path is sixty-four bits and the CRC polynomial is calculated thirty-two bits at a time. The CRC is generated in two stages, first the upper thirty-two bits and then the lower thirty-two bits. For AAL5 encapsulation, the CRC is checked during the enqueue process of writing the data into data SRAM block 1107. CRC generator block 1111 reads a partial CRC using the port ID as the address to CRC table SRAM 1112. CRC table SRAM 1112 stores one partial CRC for each of the sixty-four output ports. Enqueue CRC generator block 1111 loads the partial CRC and starts calculating as the data is coming in from memory manager block 204. When the complete 64-byte chunk is loaded in data SRAM block 1107, enqueue CRC generator block 1111 writes back the partial CRC into CRC table SRAM 1112, again using the port ID as the address. At the end of the last chunk of a packet (as determined by EOP), the CRC is compared to the CRC in the AAL5 trailer. If the compare fails, then the packet is marked as bad by setting a BAD bit in control SRAM 1105 via AAL5_CRC_OK line 1136. When this packet is sent out of reassembly block 1100 via output FIFO 1110, this bad bit is communicated to outgoing SPI-4 interface block 1100 via line 1137, OR gate 1138, the bad bit in output FIFO 1110 for the last 64-byte chunk of the packet, and signal RAS_SPIO_ABORT that is communicated to outgoing SPI-4 interface block 206.

For the L2 encapsulation, the CRC is checked during the dequeue process while reading the data out of data SRAM 1107. L2 CRCR checker block 1113 has a CRC table 1114 for storing one partial CRC for each of the sixty-four output ports. This CRC table 1114 is accessed on a per-port basis. The end of the data packet is determined by comparing the packet length calculated and stored in reassembly table SRAM 1103 with the actual packet length (valid bytes) recorded in the AAL5 trailer. Once the end of the data is located, the L2 CRC is checked at the calculated packet boundary to determine the integrity of the L2 CRC for that data packet. If L2 CRC checker block 1113 determines that the packet has a CRC error, then the error condition is sent to the outgoing SPI interface block 206 via line 1139, OR gate 1138, the bad bit in output FIFO 1110, and signal RAS_SPIO_ABORT.

CPU interface block 1118 is an interface by which the CPU can cause certain operations to be performed depending on which one of a plurality of opcodes the CPU writes into a 32-bit command register in CPU interface block 1118. Using this 32-bit command register and six other general purpose 32-bit registers, the CPU can read from and write to any of the memory locations in any memory in reassembly block 1100. Certain opcodes allow the CPU to read status and statistics information. For example, reassembly block 1100 in some embodiments includes a per port statistics memory (not shown) that includes sixty-four entries, one for each output port. In one embodiment, each entry is 112 bits long and includes: 1) a sixteen-bit TTL ERRORS field that accumulates a count of the total number of TTL timeout errors detected on that port as various packets are received on that port, 2) a sixteen-bit CRC_ERRORS field that accumulates a count of the number of CRC errors detected on the output port as the various packets are received on that port, 3) a 32-bit PKT_RCVD field that accumulates a count of the total number of cells or packets that are received on that output port, and 4) a 48-bit DATA_RCVD field that accumulates a count of the total number of valid bytes received on that output port as the various packets are received on that port. The CPU can read entries from this per port statistics memory via CPU interface block 1118.

In the embodiment of FIG. 59, the CPU can receive 64-byte data chunks through CPU interface block 1118 using a special output port (output port 65). Data for this special output port is buffered into CPU port buffer block 1117 so that reassembly block 1100 can reassemble the data into the proper configuration before the data is read by the CPU. If output scheduler block 210 sends such a CPU chunk, then reassembly block 1100 sets the CPU FULL status bit and waits for at least sixty-four cycles before clearing the bit. Output scheduler block 210 does not send another CPU chunk until the falling edge of the CPU FULL status bit. Once reassembly block 110 detects a 64-byte CPU chunk as determined by the PID, reassembly block 1100 writes the 64-bit control word for the CPU chunk into CPU port buffer block 1117. The data of the CPU chunk is then written into CPU port buffer block 1117. After one complete CPU chunk is received, CPU interface block 1118 reads the control word from the FIFO. Based on the type field, CPU interface block 1118 determines if another CPU chunk is required before the current CPU chunk can be supplied to the CPU. This would occur for packet traffic types when an EOP must be detected before the second to last cell can be sent. If another CPU chunk is required, then the CPU FULL status bit to the data base block 208 is cleared after a minimum of sixty-four cycles and scheduler block 210 sends another CPU chunk. Once the second CPU chunk is received and the control word has been read to determine whether it is an EOP or not, then the first chunk along with the associated control header is read out of CPU port buffer 1117 and is loaded into the general purpose registers in CPU interface block 1118. Once these registers are loaded, the CPU data bit in the status register is set informing the CPU that a chunk of data is available for reading. The CPU then issues a "GET CPU" command to read from the registers. If there is padding to be stripped based on the type, then the padding is stripped when the data is read out of CPU port buffer 1117 so that the padding is not loaded into the general purpose registers. The cell length field is used to determine how much padding is to be stripped from the end of the associated chunk. No header operation is performed on CPU chunks, so the only padding is at the end of the chunk.

Enqueue data pipe block 1115 converts data from 128-bit wide to 64-bit wide for entry into data SRAM 1107. Enqueue data pipe block 1115 also provides the appropriate delay necessary for enqueue state machine block 1101 to obtain the pointer needed to store the chunk into data SRAM 1107. Dequeue data pipe block 1116 delays data to the output FIFO block 1110 so that the header can be inserted and the CRC checked for L2 packets before the last word is sent. Header SRAM block 1106 is a 256×64 bit internal dual port SRAM that stores header information on a per-port basis. The memory is organized as 128 sixteen-byte buffers so that two sixteen-byte headers are stored for each output port. Output FIFO block 1110 is a 32×88 bit FIFO implemented using dual port memory. The output FIFO is large enough to store three maximum size chunks. The output FIFO has two full indications (Almost Full and Full) and two empty indications (Almost Empty and Empty). Almost Full is asserted when the FIFO has ten locations left. Full is asserted when the FIFO has nine or fewer locations left. By indicating that the FIFO is almost full when it has only ten locations left, the dequeue state machine block 1108 can then send one more complete chunk. When the FIFO is one word beyond Almost Full, then the Full signal is asserted thereby indicating that once the current chunk is completed that no more chunks are to be transferred until Full goes inactive. Almost Empty is asserted when one word is left in the output FIFO. Empty is asserted when the output FIFO is empty. Outgoing SPI interface block 206 ORs the two empty signals together to determine when to pop the output FIFO. Outgoing SPI interface block 206 also uses the two empty signals to determine when only one word is left in the FIFO. This is necessary because the minimum POP size is two clock cycles, but when only one word is left the FIFO only has valid data for the first read of the FIFO. If Empty is active but Almost Empty is inactive, then only one word is in the FIFO. Dequeue state machine block 1108 causes data to be loaded into output FIFO block 1110 as long as output port calendar block 1109 indicates chunks are available and output FIFO block 1110 is not full. If output FIFO block 1110 goes full, then the current chunk being transferred is completed before reassembly block 1100 stops sending data to output FIFO block 1110. Outgoing SPI interface block 206 pops data from the output FIFO block 1110 as long as FIFO block 1110 is not empty and outgoing SPI interface block 206 is not inserting control words into the data stream. FIFO block 1110 allows outgoing SPI interface block 206 to control the flow of data from reassembly block 1100 so it has time to add the control words into the output data stream (coming out of outgoing SPI interface block 206) between bursts.

External reassembly memory 218 (see FIG. 10) is 4M×36 bits of external SRAM that stores the header control information on a per-FID basis. External reassembly memory 218 includes the appropriately programmed new header for the particular flow and/or the necessary MPLS manipulation control information for that flow. Reassembly memory 218 supports 1 M flows with sixteen bytes of header and two bytes of control information per flow. In one embodiment, the MS-SAR operates without any external reassembly memory 218. In such an embodiment, only the Azanda switch header is added in the ingress mode and no MPLS translation occurs in the egress mode. The Azanda header is obtained from side band signals coming from memory manager block 204 and any L2 stripping information is obtained from the control register. For AAL5 type traffic, lookup block 202 (see FIG. 10) adds the appropriate ATM header and reassembly block 1100 passes the ATM header on without translation.

Dequeue state machine block 1108 performs any MPLS manipulation required pursuant to requirements of the application type. The FID entry in the header table in external memory 218 contains the MPLS label operation instruction and new labels. Three bits in the first control word contain encoded instructions for what MPLS operation to perform. In the embodiment of FIG. 59, the operation is either: 1) replace the MPLS tag, 2) push the MPLS tag once or twice, or 3) pop the MPLS tag once or twice. After each MPLS operation, the original MPLS TTL value is decremented. If the TTL value is one before being decremented, then the packet is dropped. This is done by not pushing the packet onto output FIFO 1110 and by dropping subsequent chunks from the flow until the EOP is reached. If two labels are being pushed, then label #1 is pushed on first and label #2 is pushed on second. If one label is pushed, then label #1 is used. If two labels are popped, then the third label is the one remaining on the top. If one label is popped, then the second label remains on top.

Although the simplified diagram of FIG. 59 illustrates many of the important interconnections between the various sub-blocks within the specific embodiment of reassembly block 1100, there are multiple other interconnections not shown in FIG. 59 that are used to implement various details of the processing carried out by reassembly block 1100 in accordance with the multiple application types. These many interconnections are omitted from FIG. 59 in order to clarify the above explanation of the general operation of reassembly block 1100. Reassembly block 1100 is implemented, in accordance with one embodiment, by describing the functionality to be performed in accordance with each of the application types using a hardware description language such as Verilog. Once the functional of the reassembly block has been described in Verilog, circuitry is synthesized from that description using commonly available software tools.

FIGS. 60A–60J illustrate functionality of the reassembly block in certain application types. Because reassembly block operation in several application types is similar, functional description of the reassembly block 1100 is simplified by describing reassembly block operation in eight different reassembly types.

Figure 60A:
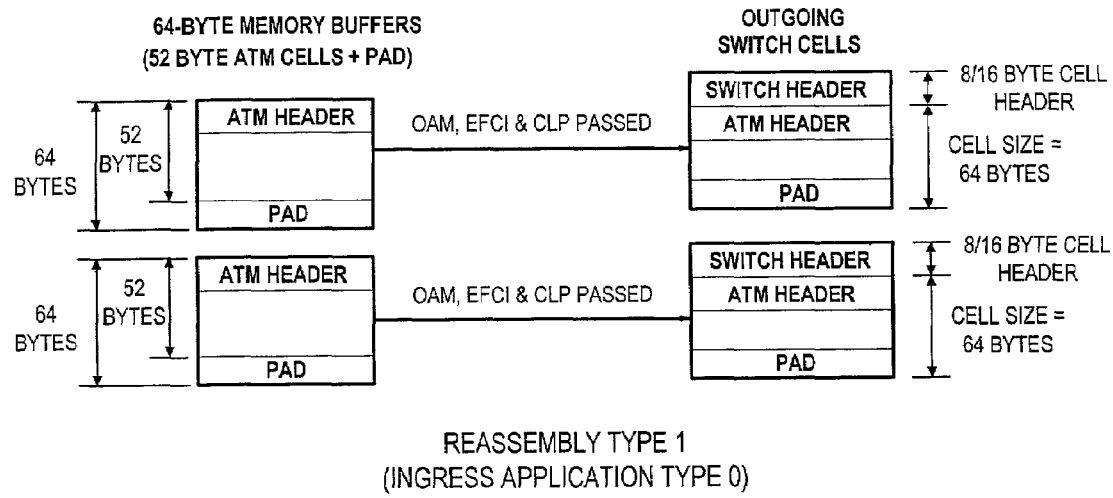
FIGS. 60A–60D are diagrams that illustrate reassembly types carried out by the reassembly block of FIG. 59. The function of the reassembly block in each of these reassembly types can be described at the functional level in Verilog, and hardware circuitry realized from the Verilog using hardware synthesis software.
Figure 60B:
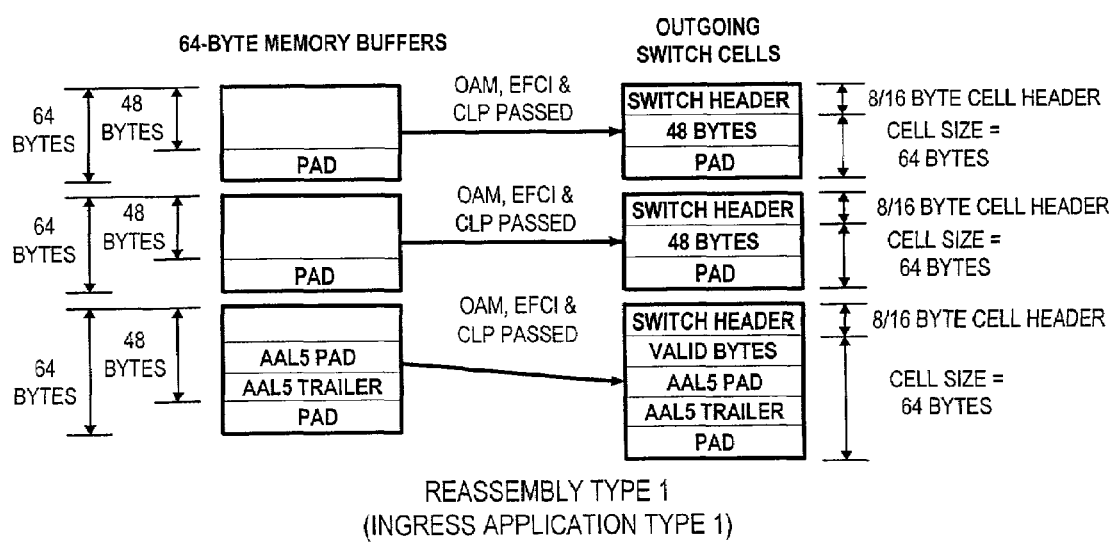
Figure 60C:
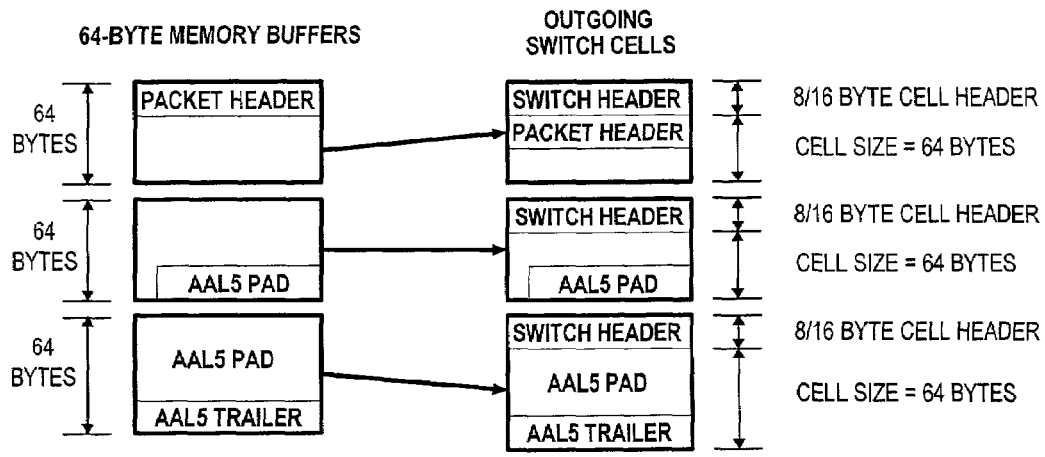

FIG. 60A illustrates reassembly type 1 processing. In reassembly type 1, 64-byte chunks in payload memory 217 are mapped into switch cells by adding a switch header. Reassembly type 1 handles reassembly processing for application types 0–3 and 7. FIG. 60A shows a one-to-one mapping of ATM cells stored in 64-byte memory buffers into switch cells. The switch header added is eight or sixteen bytes long with the Azanda header being the last four bytes. Reassembly block 1100 in reassembly type 1 informs the SPI interface of the number of valid bytes in each eight-byte word and, for packet traffic, indicates which chunk is the SOP and which chunk is the EOP. For AAL5 cells, the cells are stored in payload memory as 48-byte AAL5 cells with an AAL5 trailer at the end and padding to fill each 64-byte buffer up to sixty-four bytes. For packet traffic, the 64-byte chunks are stored in payload memory as 64-byte chunks with an AAL5-like trailer added to pass on the packet length information. FIG. 60B shows AAL5 encapsulated cells. FIG. 60C shows pseudo-AAL5 encapsulated packets. For all ingress traffic manager types, the CLASS, OAM, EFCI and CLP bits from memory manager block 204 are inserted into the Azanda four-byte header. For application types 0 and 1, the CLASS, OAM, EFCI and CLP bits are whatever was in the ATM header. For application types 2 and 3, the CLASS, OAM, EFCI and CLP are always zero coming from memory manager block 204.

Figure 60D:
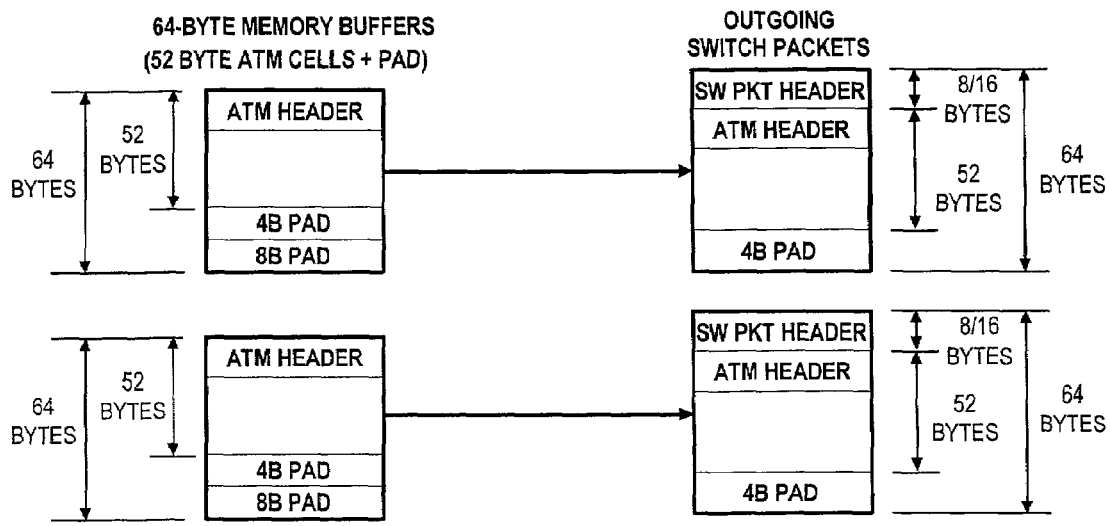

FIG. 60D illustrates reassembly type 2 processing. In reassembly type 2, 52-byte ATM cells stored as 64-byte chunks are mapped into packets and a packet header is added before the packet is sent on to the outgoing SPI-4 interface block. Only one ATM cell is mapped into each packet. Eight of the twelve bytes of padding at the end of each 64-byte chunk is removed before the packet is sent out. This allows a 64-byte packet to be sent out that includes eight bytes of header. If the switch packet header is sixteen bytes, then the packet is seventy-two bytes long. The CLASS, OAM, EFCI and CLP bits are passed in the Azanda header portion of the switch packet header.

FIG. 60E illustrates reassembly type 3 processing. In reassembly type 3, 48-byte ATM cells stored in payload memory are mapped into packets by stripping the sixteen bytes of padding from each 64-byte chunk and then optionally stripping the L2 packet header and optionally adding a switch packet header before sending the resulting switch packet on to the outgoing SPI-4 interface block. Reassembly block 1100 checks the L2 CRC before stripping the L2 header to ensure packet integrity before sending the packet on to the switch fabric. Reassembly block 1100 also checks against the maximum MTU and the length and CRC in the AAL5 trailer and removes the AAL5 encapsulation. The CLASS, OAM, EFCI and CLP bits are passed in the Azanda header portion of the switch packet header. The L2 CRC being sent out is now incorrect due to the removal of the L2 header and must be replaced by the egress MS-SAR when it adds a new L2 packet header. Lookup block 202 replaces the L2 header and segmentation block 203 calculates the new CRC. For the L2 stripping case, the special header required by lookup block 202 in the egress MS-SAR is added by the switch fabric.

FIG. 60F illustrates reassembly type 4 processing. In reassembly type 4, reassembly block 1100 maps AAL5-like switch cells stored in payload memory into packets, checks against the maximum MTU, removes the AAL5 encapsulation, and may add an eight or sixteen-byte switch packet header. The CLASS, OAM, EFCI and CLP bits are passed in the Azanda header portion of the switch packet header. Reassembly type 4 can also be carried out with a lookup operation.

Figure 60G:
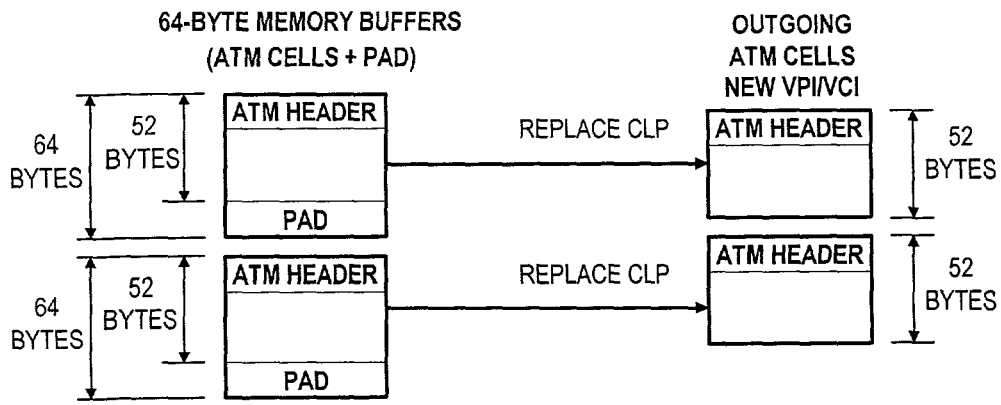

FIG. 60G illustrates reassembly type 5 processing. In reassembly type 5, reassembly block 1100 translates the ATM header by replacing the 28-bit VPI/VCI and then replacing the CLP bit with the logical OR of the CLP coming from the memory manager block 204 and the CLP already in the ATM header before the cell is sent out. The PTI field is left unchanged. The extra twelve bytes of padding from the end of each ATM cell is stored as 64-byte chunks in payload memory. This padding is stripped by the outgoing SPI-4 interface block using byte enables. The remaining information is sent out as a 52-byte ATM cell.

Figure 60H:
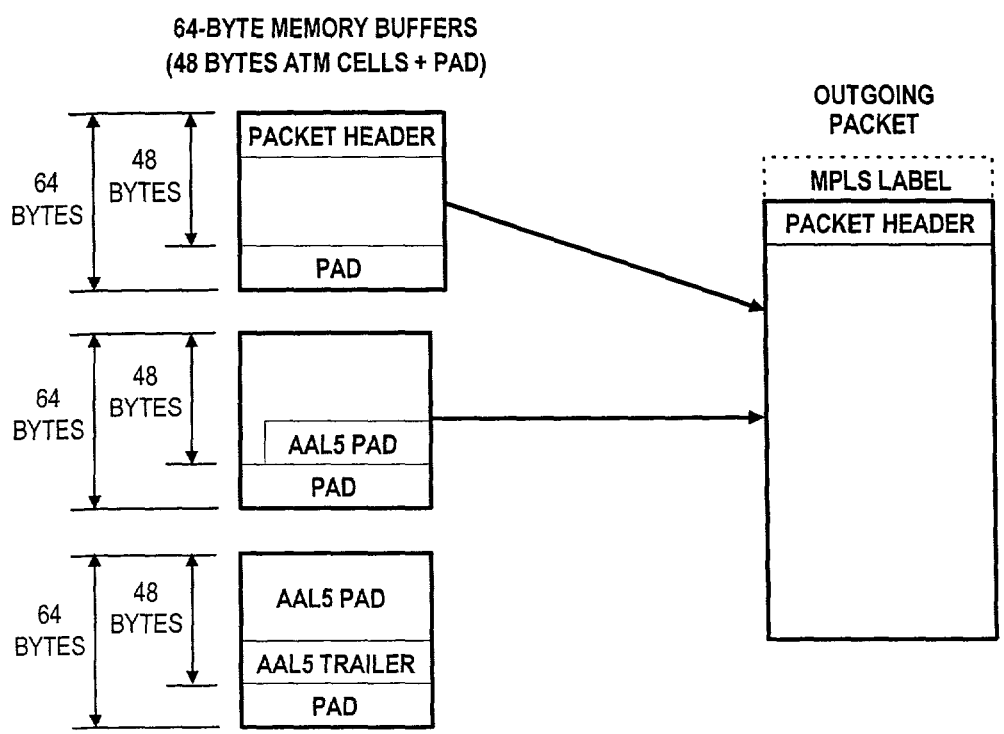

FIG. 60H illustrates reassembly type 6 processing. In reassembly type 6, reassembly block 1100 maps the 48-byte AAL5 encapsulated ATM cells stored as 64-byte chunks in payload memory into packets by stripping the sixteen bytes of padding from each chunk and then performing an MPLS operation based on the contents of the external reassembly memory 218. The resulting packet is then sent on to the outgoing SPI-4 interface block. Part of the MPLS operation is decrementing the MPLS TTL. If the MPLS TTL is one before being decremented, then the packet is dropped. Reassembly block 1100 also checks against the maximum MTU and the length and CRC in the AAL5 trailer before removing the AAL5 encapsulation.

Figure 60I:
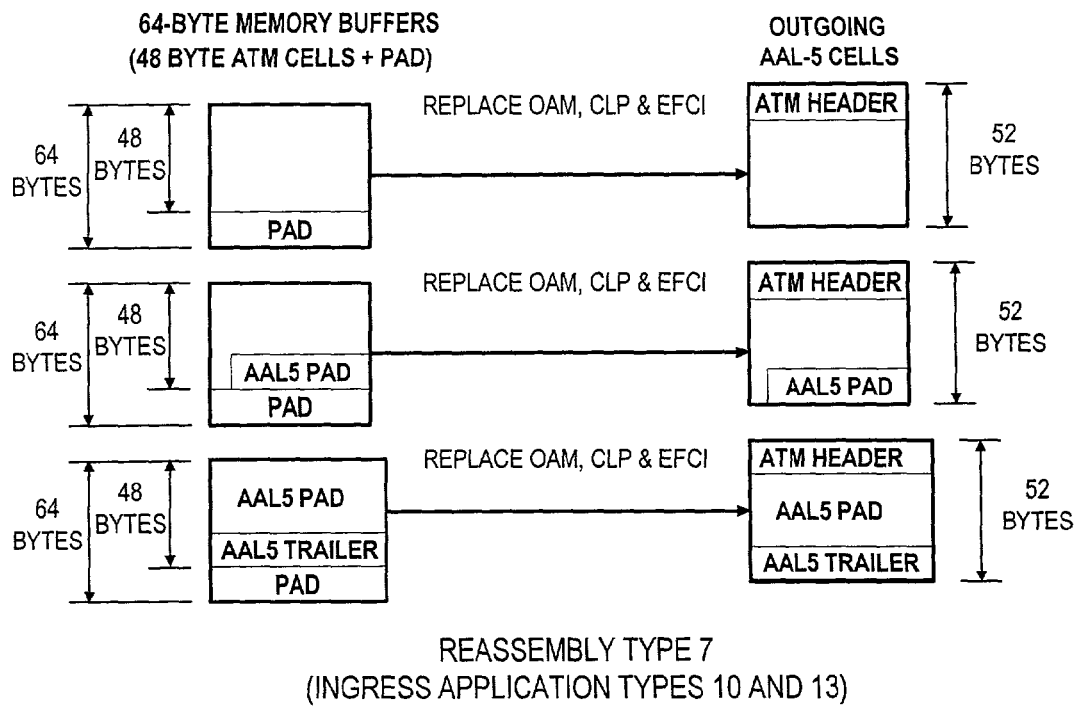

FIG. 60I illustrates reassembly type 7 processing. In reassembly type 7, reassembly block 1100 adds the four-byte ATM header along with four bytes of padding, so the data is eight-byte word-aligned to the 48-byte AAL5 encapsulated ATM cells stored in payload memory as 64-byte chunks. Reassembly block 1100 strips the sixteen bytes of padding, replaces the PTI and CLP bits in the ATM header using the incoming EOP, OAM, CLP and EFCI bits from memory manager block 204, and then transmits the chunks as AAL5 cells. The four bytes of alignment padding are stripped using the byte enables when transmitting to the outgoing SPI-4 interface block. The EOP AAL5 cell is marked using the PTI field in the ATM header. The packet length is checked against the maximum MTU. The length and CRC in the AAL5 trailer are checked.

Figure 60J:
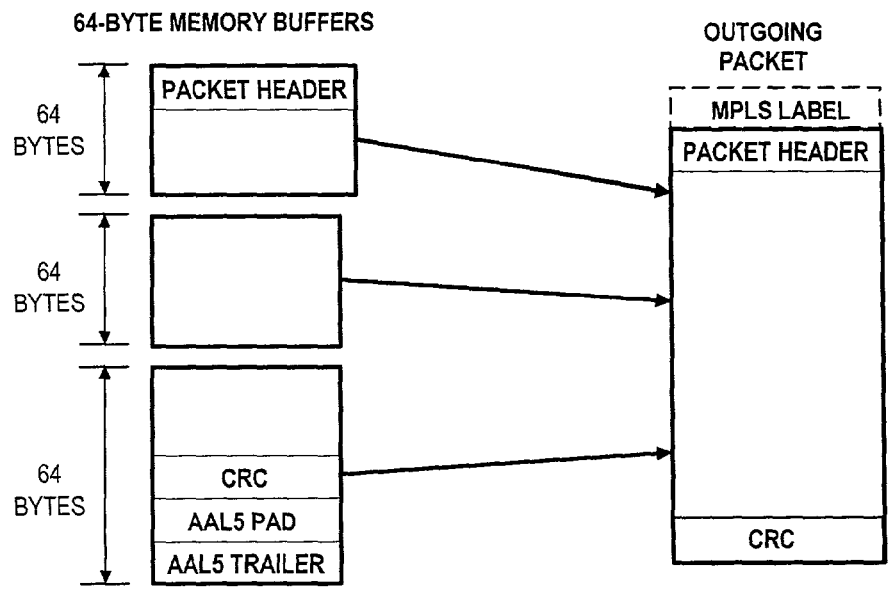

FIG. 60J illustrates reassembly type 8 processing. In reassembly type 8, reassembly block 1100 maps the AAL5 like switch cells stored in payload memory into packets and performs an MPLS operation based on the contents of external reassembly memory 218. Part of the MPLS operation is decrementing the MPLS TTL. If the MPLS TTL is one before being decremented, then the packet is dropped. Reassembly block 1100 also checks the packet length against the maximum MTU. The length and CRC in the AAL5 trailer are checked before removing the AAL5 encapsulation.

Outgoing SPI-4 Interface Block in More Detail:

FIG. 60 is a simplified block diagram of one particular embodiment 1200 of outgoing SPI-4 interface block 206 of FIG. 10. Port calendar state machine 1201 utilizes a port calendar memory 1202 to identify an output port that can receive data. Reassembly block 205 supplies data and control information at a 200 MHz rate via RX state machine 1203 and per port FIFO 1204 to data FIFO 1205. TX state machine 1206 causes the data and control information to be output from data FIFO 1205 at a 400 MHz double data rate. The data flows through 64-to-16 unpack engine block 1207 which unpacks the 64-bit data words to form 16-bit data words. Data parity generation block 1208 calculates a four-bit diagonal interleaved parity (DIP-4) on the data. TX state machine block 1206 combines the DIP-4 bits with the control information read out of data FIFO 1205 to form 16-bit control words. Multiplexer 1209 multiplexes the control words and data words in accordance with the SPI-4 specification and the resultant 16-bit flow of information passes out of the MS-SAR and onto an external 16-bit, 400 MHz DDR bus. Signal names in FIG. 60 are descriptive of their information content and function. Operation of port calendar 1201 is similar to the operation of the port calendar described in connection with FIG. 24.

CPU Interface Block in More Detail:

FIG. 61 is a simplified diagram of one particular embodiment 1300 of CPU interface block 211 of FIG. 10. CPU interface block 1300 provides a general purpose CPU interface port for the MS-SAR integrated circuit The CPU interface port has a 32-bit data bus. The various registers within the CPU interface blocks of the various other blocks of the MS-SAR are accessible by the CPU through CPU interface block 1300. CPU interface block 1300 receives a ten-bit address from the CPU and decodes it. Three bits of the ten-bit address identify one of the blocks within the MS-SAR whereas the other seven bits identify a register within that block. CPU interface block 1300 generates block select signals that are supplied to each of the other blocks of the MS-SAR.

There are also registers within the CPU interface block 1300 that can be read from and/or written to by the CPU. These registers include a read-only version register, a mode register, a soft reset register, and an input/output disable register. The mode register includes: 1) a six bit value which indicates the port number of the MS-SAR when the MS-SAR is in the ingress mode, 2) a one-bit value which indicates whether the MS-SAR is in the ingress mode or in the egress mode, 3) a one-bit value which indicates whether or not the MS-SAR is operating with an external reassembly memory 218, and 4) a four-bit value which selects the test multiplexer of one internal block, the output of which is coupled to the MX1_TEST_OUT[31:0] output test port. Each of these test multiplexers has a thirty-two bit output bus. Test multiplexer 917 of FIG. 57 is an example of one such test multiplexer. CPU interface block 1300 controllably multiplexes the 32-bit output bus of one of these test multiplexers onto 32-bit output test bus MX1_TEST_OUT[31:0].

The soft reset register allows the CPU to soft reset any individual block within the MS-SAR. The input/output disable register contains bits which indicate for each of the blocks of the MS-SAR whether the input of the block is enabled or disabled, and whether the output of the block is enabled or disabled.

CPU interface block 1300 also generates a global synchronization signal GSYNC that is supplied to all blocks. GSYNC is a pulse signal that is asserted once every 520 cycles of the global 200 MHz clock. GSYNC is used to synchronize communication between the various blocks of the MS-SAR. Each block uses GSYNC to generate the three-bit time slot count value (a three-bit value that has eight as its maximum count value) by counting the GSYNC signal.

Although the present invention is described in connection with certain specific embodiments for instructional purposes, the present invention is not limited thereto. Although the bus protocol by which the incoming bus interface block communicates off-chip and the protocol by which the outgoing bus interface communicates off-chip are the same (SPI-4) in the above-described embodiments, they need not be the same. Only one or neither of the interface blocks need communicate off-chip in accordance with the SPI-4 protocol. The SPI-4 bus is mentioned just as an example. More than one incoming bus interface block can be provided so that the MS-SAR can interface to either of two different types of buses. Although the lookup block is disposed in the data path between the incoming bus interface block and the segmentation block, this need not be the case in all embodiments. The lookup block may, for example, analyze data passing from the incoming bus interface to the segmentation block without acting as a buffer in the data path between the incoming bus interface block and the segmentation block. In some embodiments, the segmentation block does buffer an entire packet before segmenting it, rather than receiving the packet in smaller pieces and then processing those smaller pieces one by one. Similarly, the reassembly block in some embodiments does reassemble an entire packet before sending the reassembled packet out to the outgoing bus interface block. Although in the embodiments described above the incoming network data is stored in payload memory in buffers that all have the same size, this need not be the case. Multiple different buffer sizes are employed in some embodiments. The data of packets could, for example, be stored in one size of buffer whereas the data of ATM cells could be stored in another size of buffer. Although the Azanda header is described here as being embedded in the switch header, this is not the case in all embodiments. In one embodiment, the Azanda header is provided in the switch cell after the payload. The Azanda header is intended to provide a general-purpose vehicle for the communication of information from an ingress MS-SAR to an egress MS-SAR. Information other than FID and egress application type can be included in such an Azanda header. The specific format for the Azanda header provided above is provided to illustrate the general concept. The architectural concepts disclosed are not limited to any particular protocol, but rather are generally applicable to other protocols. Other application types can be supported, where the various functional blocks of the MS-SAR operate on a flow in a particular way determined by the application type of the flow. Accordingly, various modifications, adaptations, and combinations of various features of the described embodiments can be practiced without departing from the scope of the invention as set forth in the claims.

What is claimed is:

1. A multi-service segmentation and reassembly (MS-SAR) integrated circuit, comprising:
    a first bus interface;
    lookup circuitry;
    segmentation circuitry;
    reassembly circuitry;
    a second bus interface; and
    a data path extending from the first bus interface to the lookup circuitry, and from the lookup circuitry to the segmentation circuitry, and from the segmentation circuitry to the reassembly circuitry, and from the reassembly circuitry to the second bus interface, wherein both cell-protocol traffic and packet-protocol traffic pass over the data path from the first bus interface, through the lookup circuitry, through the segmentation circuitry, through the reassembly circuitry and out of the integrated circuit from the second bus interface, the lookup circuitry analzying the cell-protocol traffic and outputting information that causes the cell-protocol traffic to be processed in a first way by the segmentation circuitry and the reassembly circuitry, the lookup circuitry analyzing the packet-protocol traffic and outputting information that causes the packet-protocol traffic to be processed in a second way by the segmentation circuitry and the reassembly circuitry.

2. The integrated circuit of claim 1, wherein the integrated circuit is operable in a first ingress mode such that traffic is output from the integrated circuit to a cell-based switch fabric via the second bus interface, and wherein the integrated circuit is operable in a second ingress mode such that traffic is output from the integrated circuit to a packet-based switch fabric via the second bus interface.

3. The integrated circuit of claim 1, wherein the integrated circuit is operable in a first egress mode such that traffic is received onto the integrated circuit from a cell-based switch fabric via the first bus interface, and wherein the integrated circuit is operable in a second egress mode such that traffic is received onto the integrated circuit from a packet-based switch fabric via the first bus interface.

4. The integrated circuit of claim 1, wherein the cell-protocol traffic is ATM traffic, and wherein the packet-protocol traffic is MPLS traffic.

5. The integrated circuit of claim 1, further comprising:
  memory manager circuitry, wherein the data path extends from the segmentation circuitry to the reassembly circuitry via the memory manager circuitry.

6. The integrated circuit of claim 1, wherein the cell-protocol traffic involves an ATM cell, and wherein the packet-protocol traffic involves a packet, the ATM cell being temporarily stored in one of a plurality of buffers of a memory, all of the buffers being of equal size, the packet being segmented into a plurality of chunks, and each of the chunks being temporarily stored into a corresponding one of the buffers.

* * * * *